United States Patent [19]

Taniguchi et al.

[11] Patent Number: 4,755,845
[45] Date of Patent: * Jul. 5, 1988

[54] FLASH PHOTOGRAPHY SYSTEM

[75] Inventors: Nobuyuki Taniguchi, Tondabayashi; Masaaki Nakai, Nara; Takanobu Omaki, Sennan; Hiroshi Hosomizu, Nara; Masatake Niwa, Sakai; Toru Inoue, Toyonaka; Minoru Sekida, Sakai, all of Japan

[73] Assignee: Minolta Camera KK, Japan

[*] Notice: The portion of the term of this patent subsequent to Dec. 17, 2002 has been disclaimed.

[21] Appl. No.: 801,303

[22] Filed: Nov. 25, 1985

Related U.S. Application Data

[62] Division of Ser. No. 544,870, Oct. 24, 1983, Pat. No. 4,558,939.

[30] Foreign Application Priority Data

Oct. 22, 1982 [JP] Japan ................. 57-186640
Oct. 29, 1982 [JP] Japan ................. 57-190996
Dec. 14, 1982 [JP] Japan ................. 57-219565

[51] Int. Cl.[4] .................... G03B 7/00; G03B 15/01
[52] U.S. Cl. ...................... 354/416; 354/145.1; 354/127.13; 354/127.11
[58] Field of Search ........... 354/127.1, 127.11, 127.13, 354/129, 145.1, 416, 465, 471, 472, 474, 475, 421

[56] References Cited

U.S. PATENT DOCUMENTS

| 4,258,991 | 3/1981 | Kuraishi | 354/127.13 |
| 4,297,011 | 10/1981 | Adams, Jr. | 354/416 |
| 4,422,744 | 12/1983 | Maida | 354/413 |
| 4,444,483 | 4/1984 | Nakajima | 354/145.1 |
| 4,494,851 | 6/1985 | Maida et al. | 354/421 |
| 4,542,975 | 9/1985 | Ishida et al. | 354/416 |
| 4,573,786 | 3/1986 | Taniguchi et al. | 354/416 |

Primary Examiner—L. T. Hix
Assistant Examiner—David M. Gray
Attorney, Agent, or Firm—Watson, Cole, Grindle & Watson

[57] ABSTRACT

A flash photography system for a photographic camera and a flash device adapted to be connected thereto with the camera providing an aperture value output for flash light photography and a flash light stop signal obtained from an integrated output of the light reflected from a photographic object to terminate flash light emission when the integrated value reaches a predetermined value. The flash device calculates a maximum photographing distance covered by the flash light for effecting a correct exposure of the photographic object from the maximum flash light value and the aperture value from the camera. The maximum photographing distance is displayed by a suitable display visible to the camera operator.

14 Claims, 24 Drawing Sheets

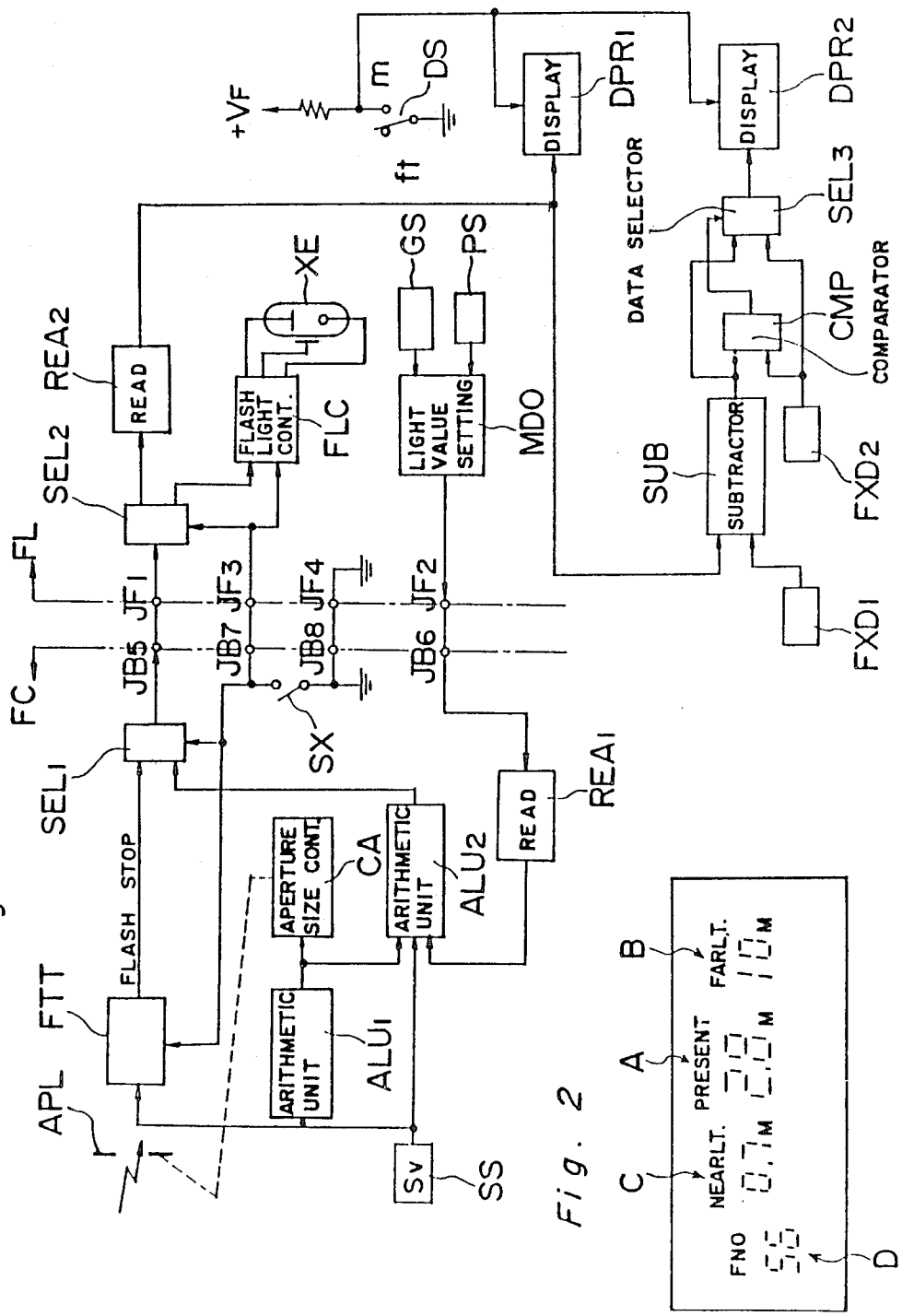

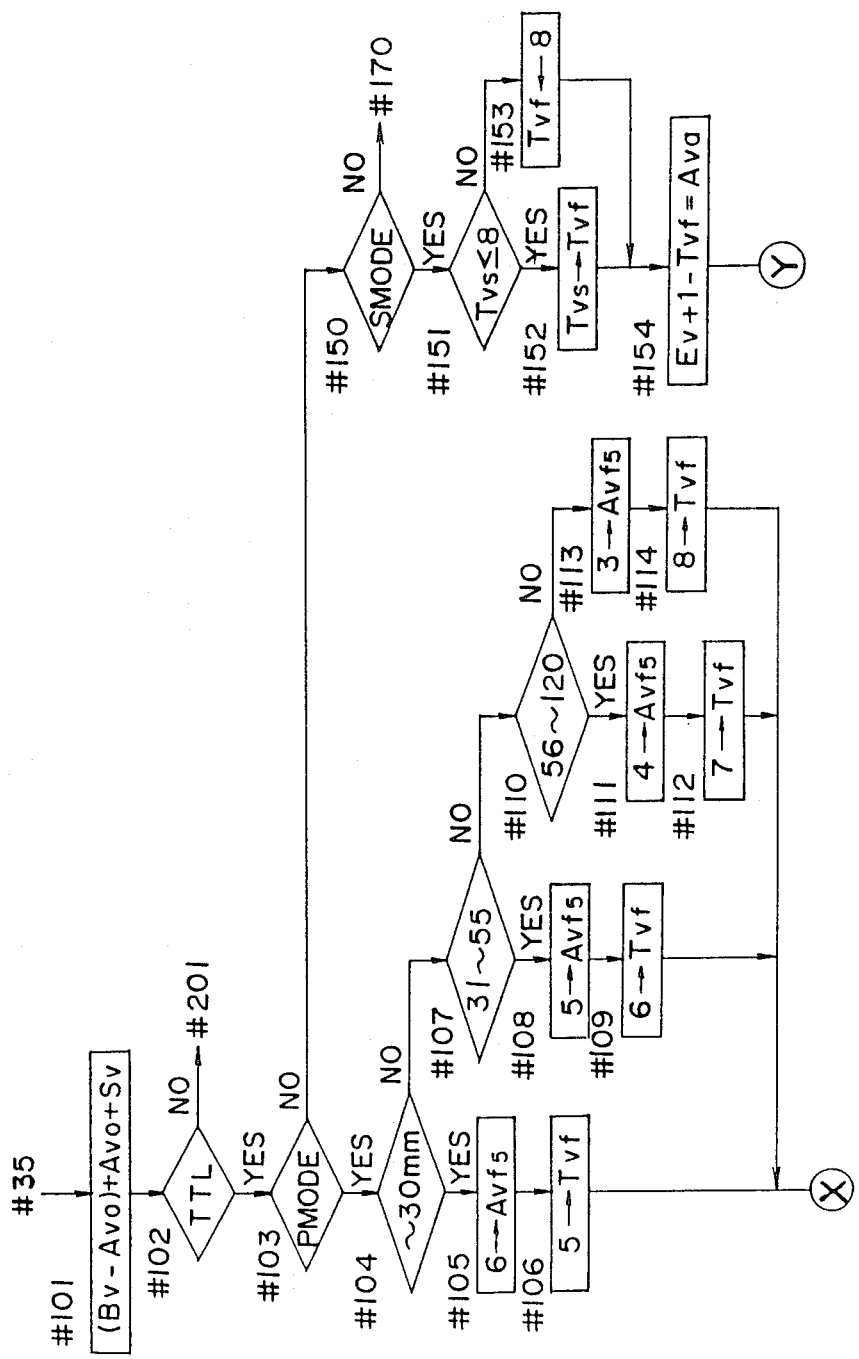

FLASH PHOTOGRAPHY SYSTEM

This is a division of application Ser. No. 544,870 filed Oct. 24, 1983 now U.S. Pat. No. 4,558,939.

FIELD OF THE INVENTION

The present invention relates to a flash light photography system, and more particularly to a photographing system having a display means for displaying photographing distance or distance range which is covered by light of a flash device for effecting a correct exposure of the photographic object to be photographed.

BACKGROUND OF THE INVENTION

In a TTL automatic flash (through-the-lens light measurement type flash light control) photographing system in which a flash light emission is stopped by a flash stop signal produced by a photographic camera when the value of the integrated amount of the light emitted from the flash device, reflected by the photographic object and in turn having passed through the diaphragm aperture of the camera, reaches a predetermined value; a maximum camera-to-object distance range which can be covered by the maximum light quantity of the flash device for effecting a correct exposure on the photographic object or object (referred to as the flash-available distance range) is varied depending on the actual diaphragm aperture size for the camera exposure operation. (see, for example U.S. Pat. No. 4,359,275)

Conventional TTL automatic flash photography systems can not indicate such flash-available distance range since the conventional flash devices are not provided with means for receiving data of the actual diaphragm aperture size of the camera.

There are known other types of flash light photography systems in which the light from the photographic object is measured by light measuring means provided in the flash device and the flash light is stopped when the integrated value of the output of the light measuring means reaches a predetermined value, while the maximum light quantity data of the flash device is transferred to the camera. (see, for example Japanese Patent Application laid-open No. 54-158923) In this type of flash light photographing system, the maximum flash-available photographing distance is calculated by the maximum light quantity and the diaphragm aperture value calculated or manually set and transferred to display means for displaying the maximum photographing distance in the view finder of the camera.

This type of flash light photographing system has such drawbacks as follows:

(a) The size of the characters for the distances displayed in the view finder is too small to read;

(b) In order to read the flash-available distance range on the flash device, the operator must adjust a calculating plate to a position corresponding to the diaphragm aperture value set in the camera, then he must read the flash-available distance range; and (c) Since only the maximum photographing distance is displayed, the operator can not read the minimum photographing distance on the flash-available distance range.

Other known flash devices are provided with display means for displaying the flash available distance range in accordance with the calculation of the maximum photographing distance on the bases of a manually set aperture value and the maximum light value of the flash device. (see, for example, Japanese laid-open patent application No. 57-66429) In the flash device of this type, the diaphragm aperture value must be set both in the camera and the flash device. Therefore the setting of the diaphragm aperture value in the flash device may be overlooked.

SUMMARY OF THE INVENTION

An essential object of the present invention is to provide a flash photography system having a display means for displaying the flash-available distance range without requiring a specific operation therefor.

Another object of the present invention is to provide a flash device having display means for displaying the maximum distance range and the flash-available distance range which can be read by operators without difficulty.

A still further object of the present invention is to provide a flash device having terminals which can be connected with the corresponding terminals of the camera such that the various data can be transferred through the terminals.

BRIEF DESCRIPTION OF THE DRAWINGS

FIG. 1 is a block diagram showing one embodiment of the flash light photographing system according to the present invention, FIG. 2 is a schematic diagram showing an example of the display according to the present invention.

DETAILED DESCRIPTION OF THE PREFERRED EMBODIMENTS

Figure 3:
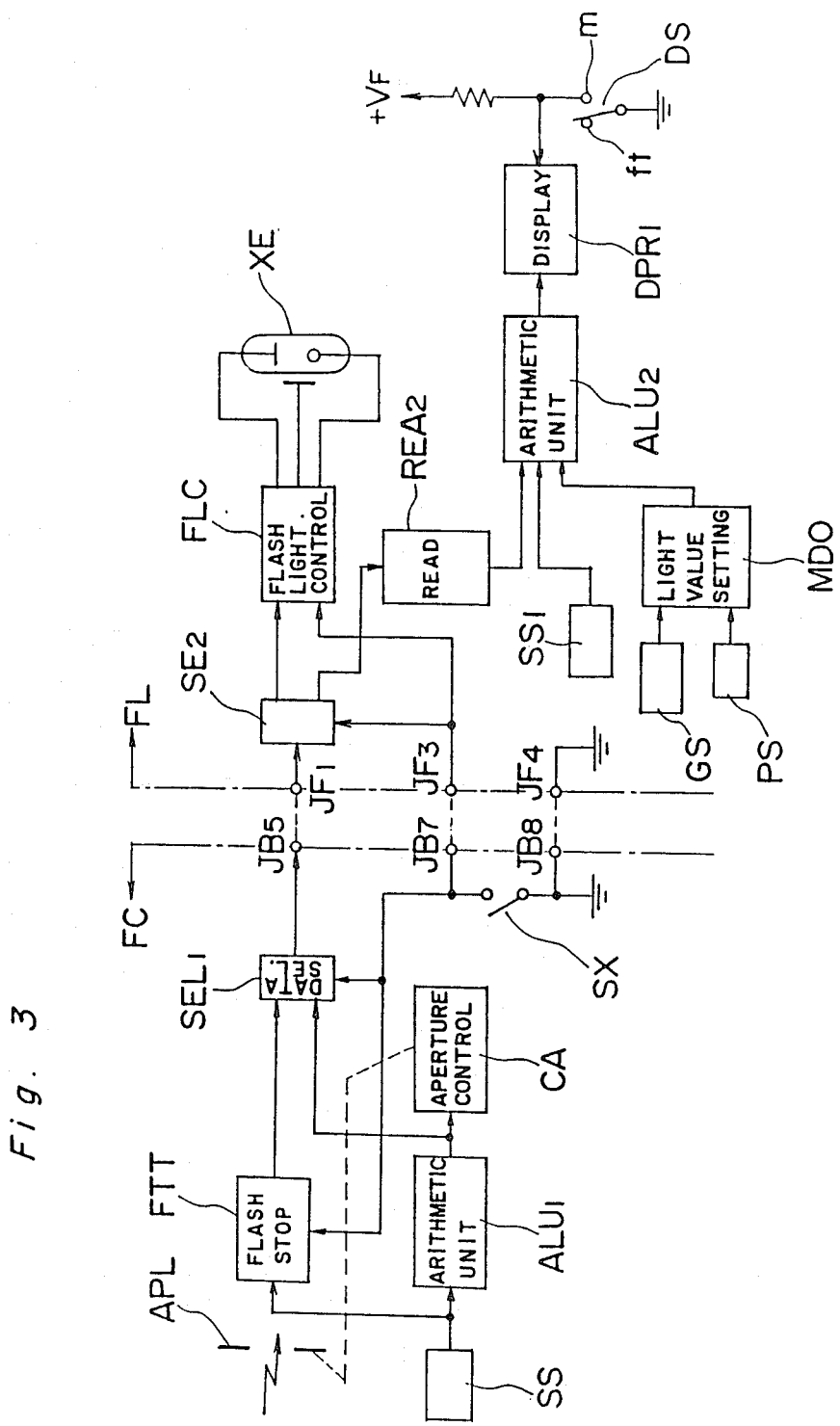
FIG. 3 is a circuit diagram showing a modification of part of the circuit shown in FIG. 1.

The various Tables referred to herein appear at the end of the specification.

Referring to FIG. 1, a flash control device FC is provided in a camera, wherein a film sensitivity setting unit SS produces set film sensitivity data Sv manually set set by a film sensitivity setting member (not shown). An arithmetic unit ALU1 produces a diaphragm aperture value Avf for the correct exposure determined by the brightness of the photographic object and the film sensitivity.

An aperture size control unit CA controls the actual size of the diaphragm aperture APL of the camera in accordance with the aperture value Avf.

A flash device FL comprises a mechanism for controlling the light distribution characteristics by changing the relative position between a light emission panel and a reflection panel provided in the flash device in a known manner. A circuit GS produces a signal representing the relative position between the light emission panel and the reflection panel. A circuit PS produces an output signal designating whether a normal light emission panel or wide light emission panel is used.

A light amount setting circuit MDO produces signals representing the values of the maximum light amount Ivmax and minimum light amount Ivmin obtainable from the flash device FL.

The output data of the light amount setting circuit MDO is transferred to a read unit REA1 provided in the camera through the terminals JF2 and JB6 connected with each other when the flash device is attached to the camera. The data read in the read unit REA1 is transferred to an arithmetic unit ALU2, which calculates $$Ivmax + Sv - Avf = Dvmax.$$

The data Dvmax shows the maximum photographing distance that can provide a correct or proper exposure by the camera with the flash device being used and the actual diaphragm aperture being set at Avf.

A data selector SEL1 outputs a signal representing the maximum photographing distance Dvmax when either the X contact or camera synchro switch SX is opened and a flash stop signal is input from a circuit FTT when the X contact SX is closed. The output of the data selector SEL1 is transferred to the flash device FL through the terminals JB5 and JF1. The signal of the X contact SX operation is also transferred to the data selector SEL2. The data selector SEL2 transfers the signal of the maximum photographing distance Dvmax fed from the terminal JF1 to the read unit REA2 when the X contact SX is opened. On the other hand, the data selector SEL2 transfers the flash stop signal from the terminal JF1 to the flash light control circuit FLC when the X contact SX is closed.

The signal of the maximum photographing distance Dvmax is input to a display unit DPR1 to indicate the maximum photographing distance Dvmax in digital form. A change over switch DS selects the unit of the distance specifically to be displayed by the display unit DPR1. With the switch DS connected with the m terminal, the display unit displays the distance in terms of metric and with the switch DS connected with the ft terminal, the display device displays the distance in terms of the foot-pound unit.

The data of the maximum photographing distance Dvmax stored in the read unit REA2 is supplied to a subtractor SUB, which calculates the minimum photographing distance Dvmin by the following equation $$Dvmax - Dvd = Dvmin.$$

The data Dvd is fed from a circuit FXD1 and has a constant value determined as a function of the ratio of the minimum light value and the maximum light value of the flash device. In the preferred embodiment, the apex value Dvmin of the minimum photographing distance can be obtained by subtracting the constant Dvd from the apex value Dvmax of the maximum photographing distance. This calculation is necessary due to the fact that the ratio of the minimum light value and the maximum light value does change with the light distribution characteristic of the flash device. The output of the subtractor SUB is applied to a comparator CMP. A circuit FXD2 produces an apex value Dvc of the minimum photographing distance determined by parallax representing the distance between the optical axis of the light emitted from the flash tube such as a Xenon tube and the optical axis of the photographic lens of the camera. The value Dvc is $-1$ for 0.7 m for example. The data of the value Dvc is suplied to the comparator CMP, which compares the minimum photographing distance Dvmin with the value Dvc to output a "High" signal if Dvmin>Dvc and a "Low" signal if Dvmin<Dvc. A data selector SEL3 outputs a signal representing the value Dvmin upon receipt of the "High" signal from the comparator CMP and a signal representing the value Dvc upon receipt of the "Low" signal from the comparator CMP. These values are displayed by the display unit DPR1 as shown in FIG. 2 in which the area (A) displays the actual photographing distance, area (B) displays the maximum photographing distance and the area (C) displays the minimum photographing distance. The flash-available distance is displayed by the display areas (B) and (C) and the area (D) displayes the F number.

Referring to FIG. 1 again, when the X contact SX is closed, a Xenon tube valve XE emits the flash light, with an integrating circuit in the circuit FTT integrating the output of a photo sensor (not shown) which receives and measures in a known manner the flash light reflected from a photographic object. Simultaneously, the data selector SEL2 becomes ready to produce the flash stop signal through the terminal JF1 to the flash light control circuit FLC. When the output of the integrating circuit reaches a predetermined value, the circuit FTT outputs the flash stop signal to the flash light control circuit FLC to stop the flash light emission by the Xenon tube.

Referring to FIG. 3 showing another embodiment of the photographing system according to the present invention, wherein the arithmetic unit ALU2 for calculating the maximum photographing distance Dvmax is provided in the flash device FL. Also a circuit SS1 for producing the film sensitivity is provided in the flash device FL. The arithmetic unit ALU2 calculates the equation $$Ivmax + Sv - Avf = Dvmax$$

in a similar manner as previously described with reference to the embodiment shown in FIG. 1 on the basis of the value Ivmax applied from the circuit MDO, the aperture value Avf from the read unit REA2 and the film sensitivity Sv from the circuit SS1.

Figure 4:
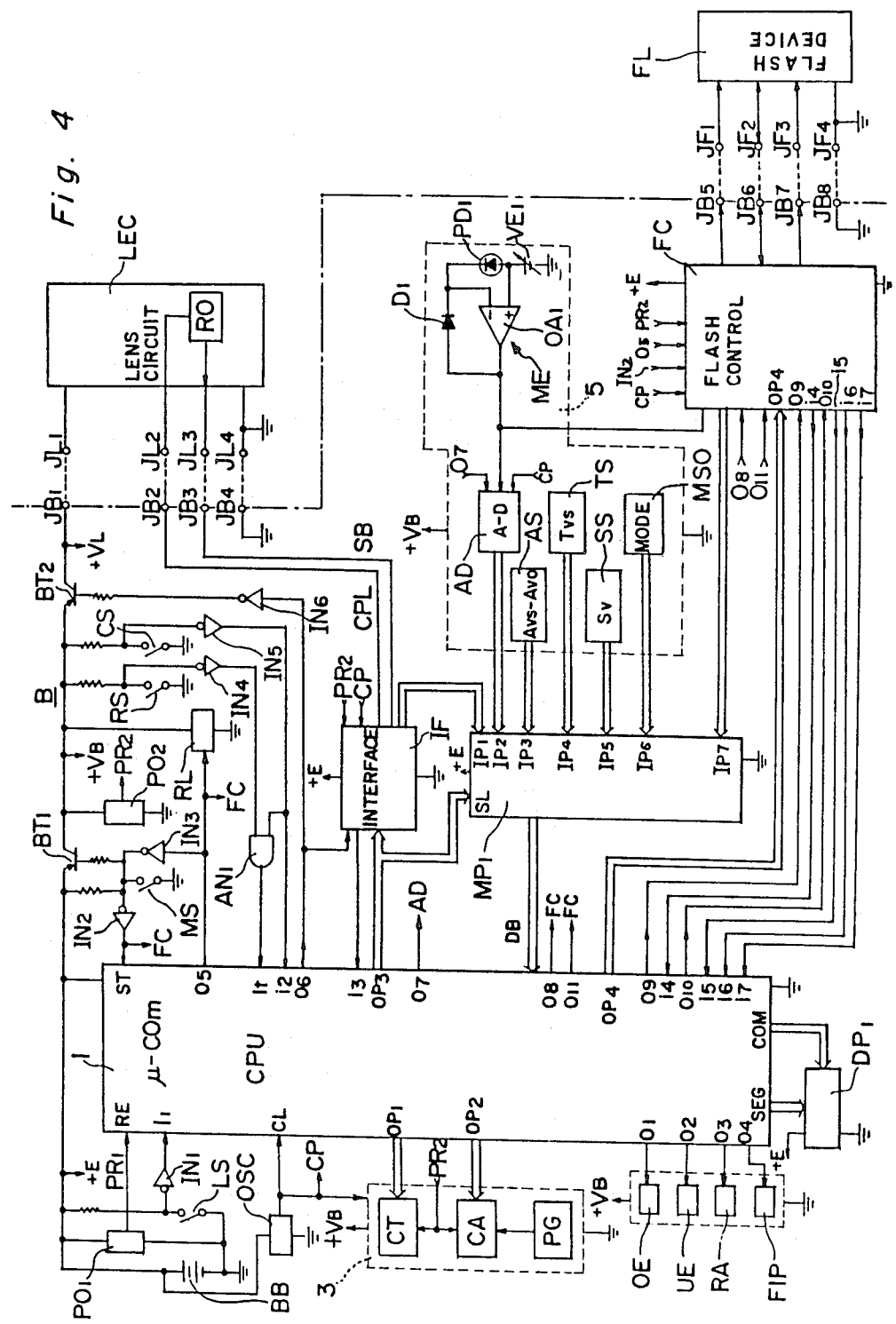
FIG. 4 is a circuit diagram showing a still further embodiment of the present invention.
Figure 5:
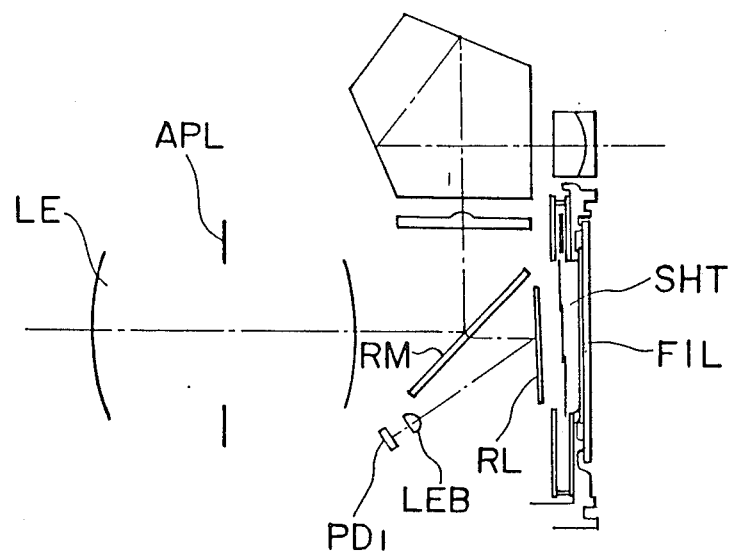
FIGS. 5 and 6 are schematic diagrams showing the lens arrangement of a camera used in the present invention.

In FIG. 4, a central processing unit 1 (referred to as CPU hereinafter) such as a microprocessor is provided for controlling the various control sequences of the circuit arrangement shown in FIG. 5. Battery BB provides power to to the camera and power ON reset circuit PO1 produces a power ON reset signal PR1, which is sent to the reset input terminal RE of the CPU 1 for initialization of the CPU 1. An oscillator OSC produces a clock pulse train CP which is supplied to the CPU 1 and the essential parts of the circuits for controlling them in synchronism with the clock pulse.

A display device DP1 made of a liquid crystal display having eight segments for each digit receives the signals fed from the terminals SEG and common terminal COM of the CPU 1 for displaying the exposure control values and various exposure control modes used in the camera system. The battery BB supplies the DC power to the CPU 1, the oscillator OSC, the display device DP1, an interface circuit IF, a flash control device FC, a data selector MP1, inverters IN1 through IN6, and an AND gate AN1 through a line +E.

When a light measurement switch MS is closed to be ON for a light measurement operation, a "High" level signal is applied to the input terminal ST of the CPU 1 to start reading the data for the exposure control. Simultaneously, analog-to-digital conversion of the result of the light measurement and the calculation of the exposure value and display are started. Also when the light measurement switch MS is closed, a transistor BT1 conducts so that the DC power is supplied to the circuit arrangement through the line +VB. When the DC power is supplied from the line +VB, a power ON reset circuit PO2 generates a power ON reset signal PR2, which is supplied to an exposure time control circuit CT and the aperture control circuit CA to reset them.

An exposure control unit 3 surrounded by a dotted line is composed of the exposure time control circuit CT, the aperture control circuit CA and a pulse generator PG. The exposure time control circuit CT receives the exposure time data Tv from the output terminal OP1 of the CPU 1 to produce a time interval signal representing a time interval $2^{-Tv}$ between the beginning of shutter release and ending of shutter closure on the basis of the clock pulses CP. The exposure time can be controlled by the time interval signal.

The pulse generator PG generates a pulse train the number of pulses of which corresponds to the amount of rotation angle of an aperture ring (not shown) provided in the lens LE. The aperture control circuit CA is supplied with the data Av representing a number of steps of the decreasing value of the aperture fed from the output terminal OP2 of the CPU 1 and the pulse train from the pulse generator PG.

Aperture control circuit CA counts the number of the pulses fed from the pulse generator PG and compares the number of pulses thus counted and the data Av representing the calculated aperture value fed from the CPU 1 to produce an output signal when the counted number of the pulses coincides with the data Av for stopping rotation of the aperture ring.

A switch is provided for detecting the lens LE attached to the camera. The switch LS is closed upon mounting of the lens to the camera and opened upon removal of the lens from the camera. When the switch LS is closed a high signal is supplied to the input terminal i1 of the CPU 1 through the inverter IN1 to cause the CPU1 to read-in the data of the lens LE to calculate the exposure time. When the switch LS is opened, the input terminal i1 of the CPU 1 is low so that the CPU 1 performs other calculations as hereinafter described.

Figure 13A:
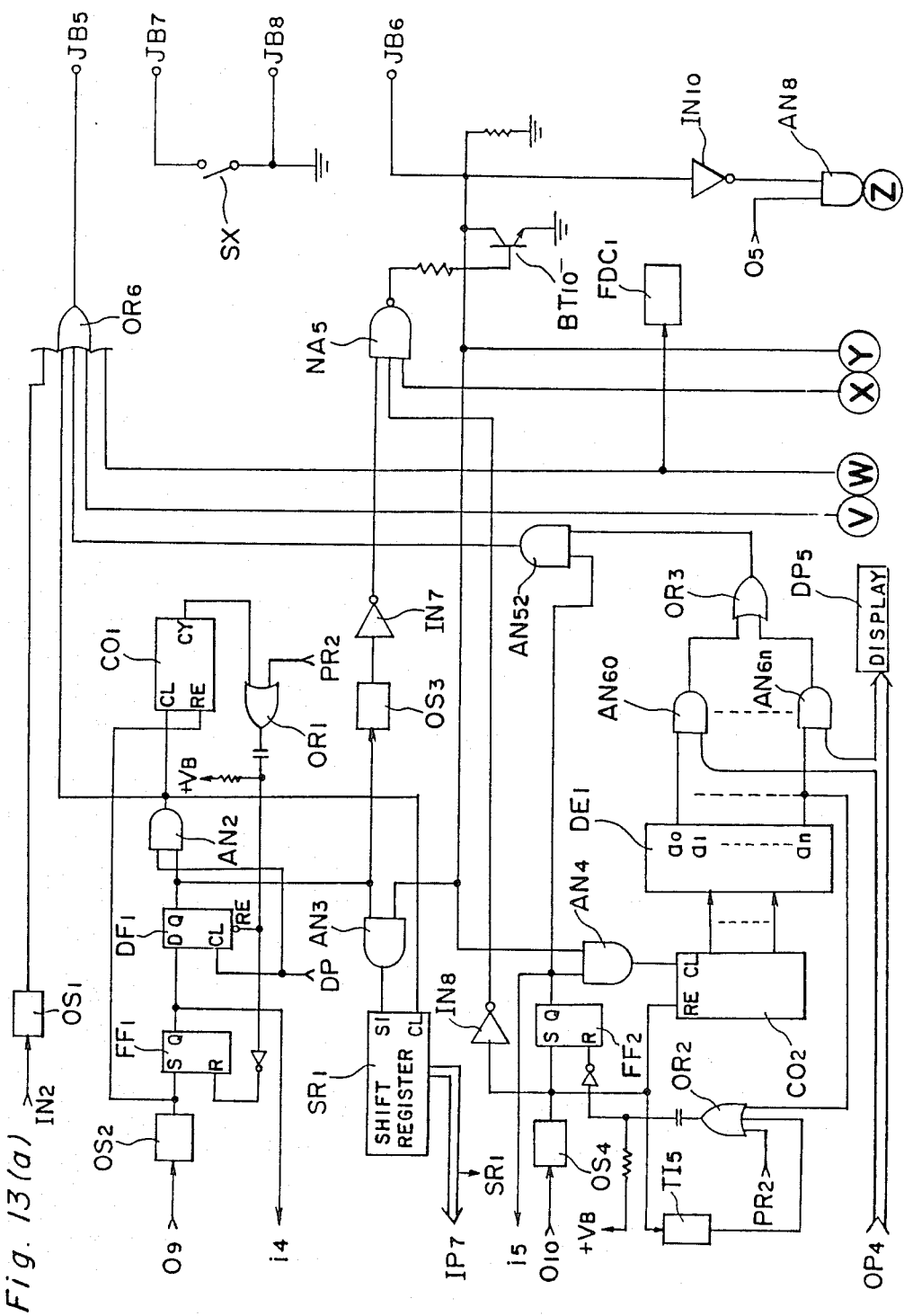
Figure 13B:
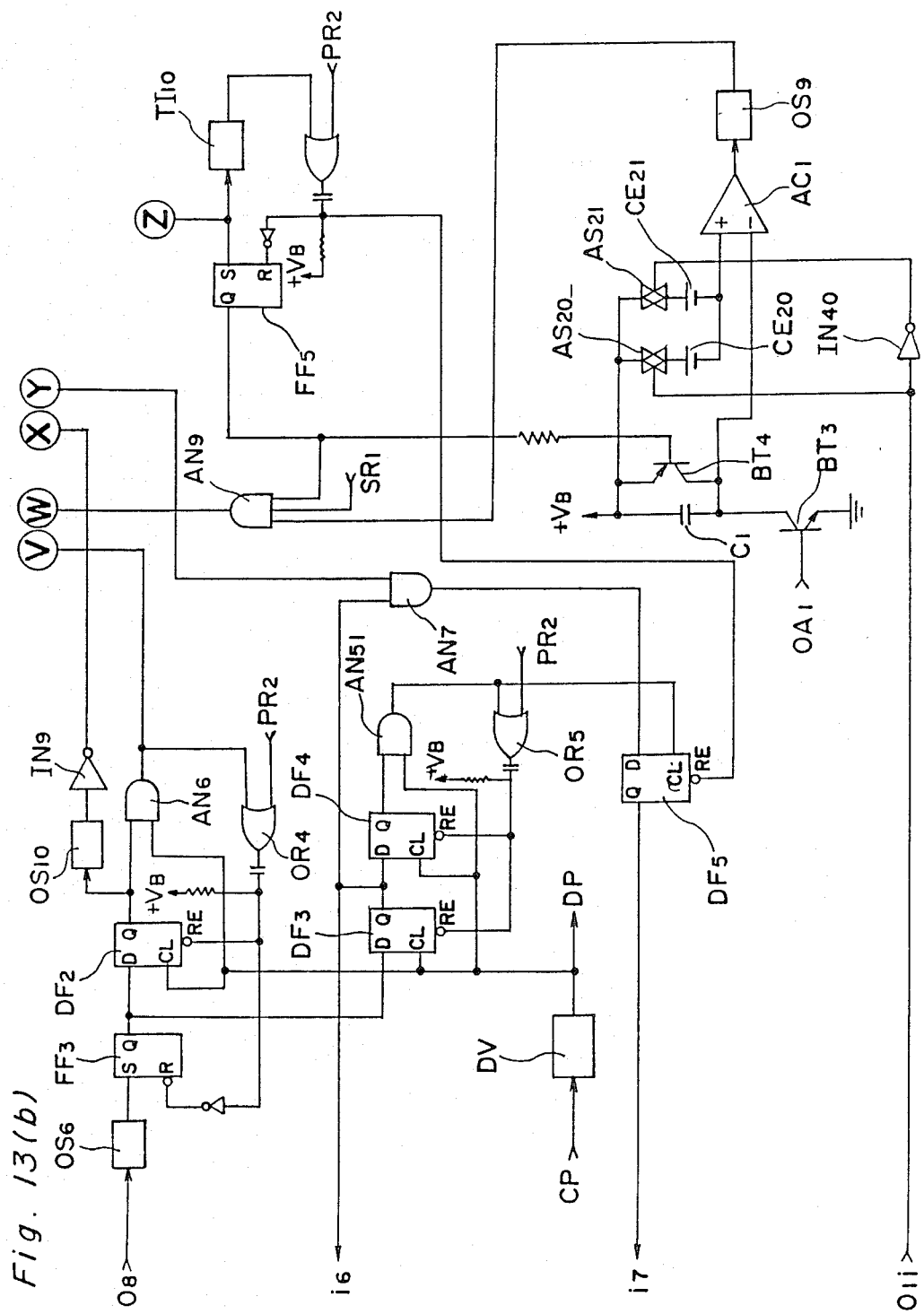
Figure 14:
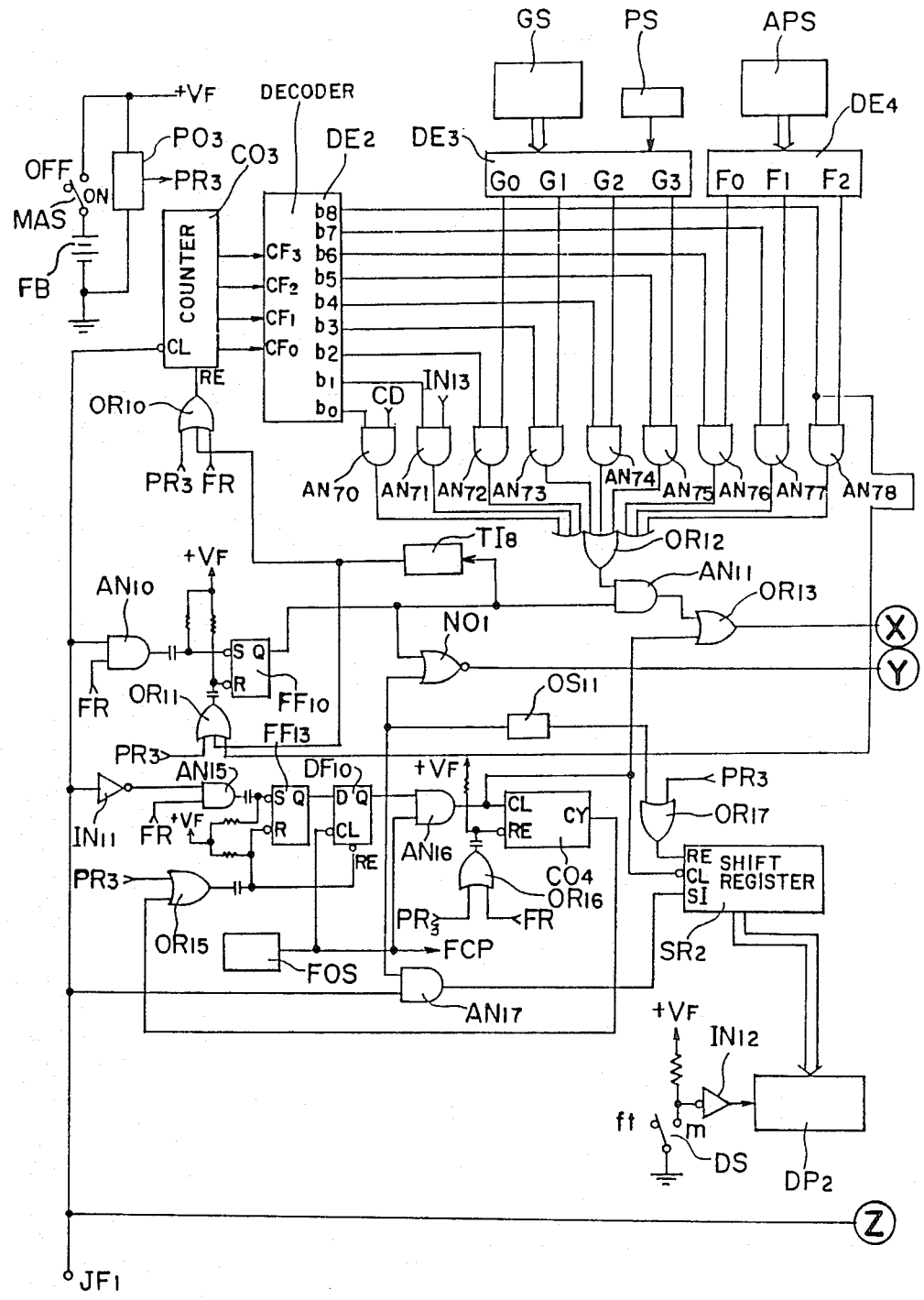
Figure 14B:
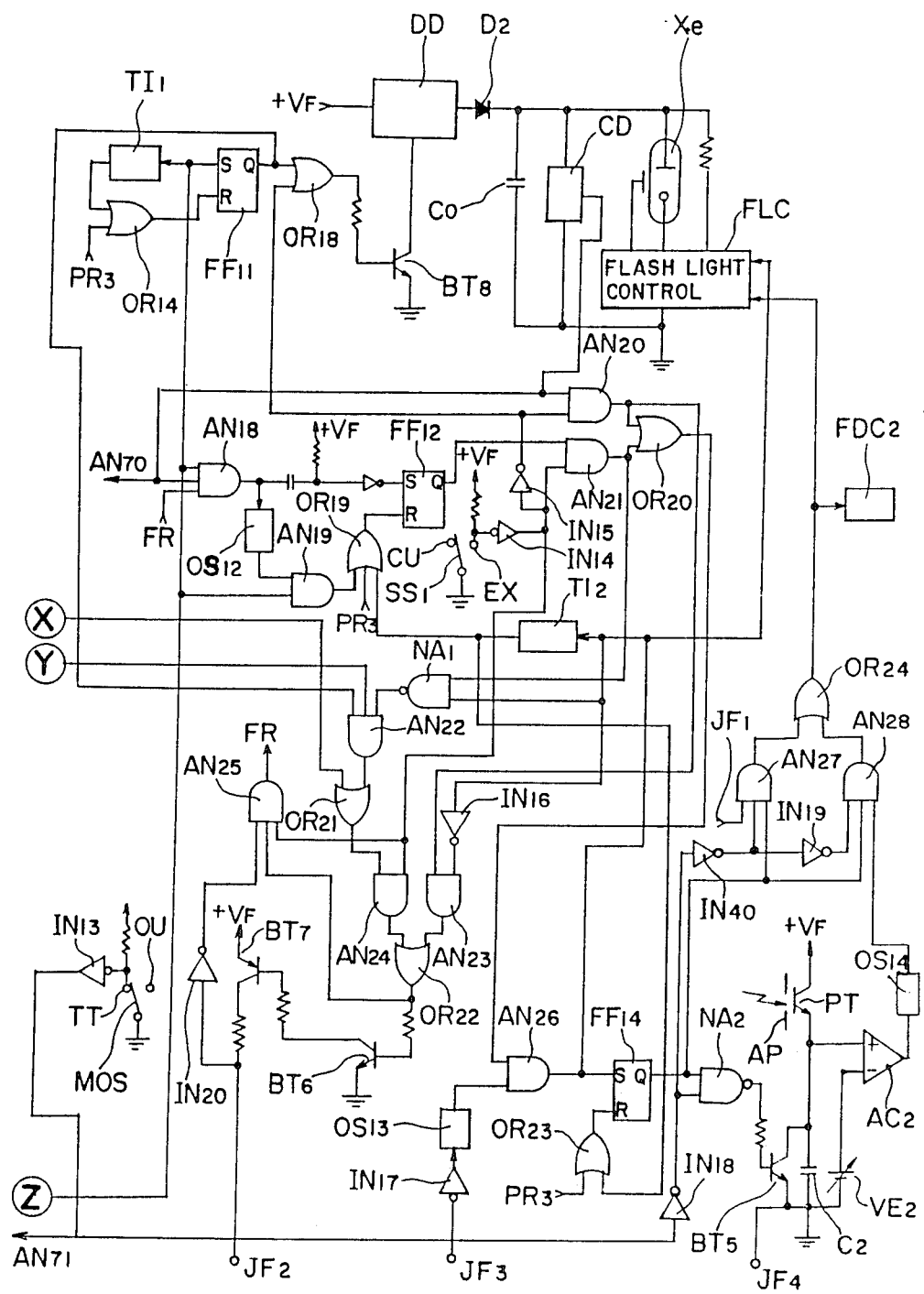

A block 5 shows and exposure data output unit, wherein PD1 is a photo sensor mounted in the camera as shown in FIGS. 13 and 14. In FIG. 5, an aperture control device APL is opened and a reflection mirror RM is in the dropped position so as to introduce light rays from the photographing object to the finder optical system. The rays of light of the photographic object passes a half mirror disposed in the central portion of the reflection mirror RM, and is reflected by a reflection plane RL, and subsequently enters the photo sensors PD1 through a condenser lens LEB. In such a state, the operational amplifier OA1 in FIG. 4 generates a light measurement output $Bv+Sv-Avo$, wherein Bv is the brightness of the photographing object, Avo is an open aperture value, and Sv is an apex value corresponding to the film sensitivity.

Figure 6:
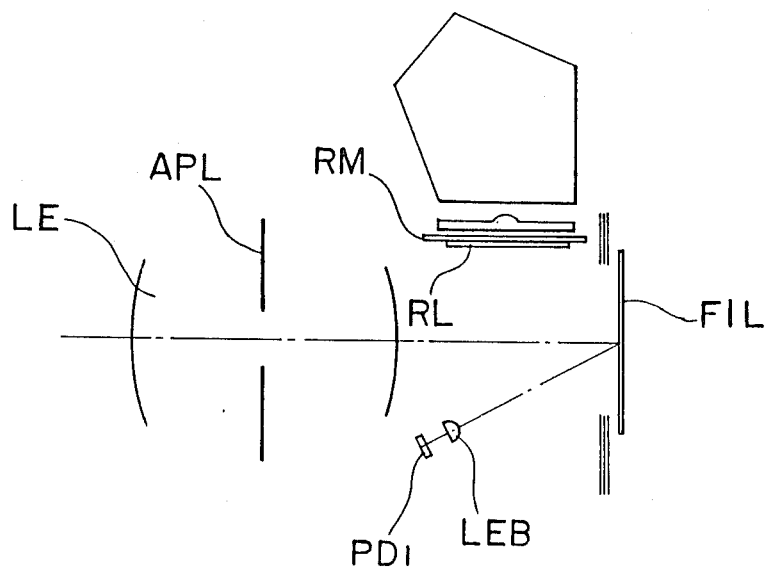

In FIG. 6, the diaphragm aperture APL is opened to a value corresponding to the calculated or set aperture value Av, while the reflection mirror RM and the reflection plane RL are raised to allow passage of the light rays of the photographic object. The shutter SHT is in a released position, so that the rays of light having passed the lens LE and the diaphragm aperture APL are reflected by the photographic film FIL and in turn, the rays of light of the object enter the photo sensor PD1. In such a state, the operational amplifier OA1 generates an output of $Bv+Sv-Av$. As hereinafter described the amount of light of the flash device FL is controlled by the output of the operational amplifier OA1.

The analog-to-digital converter (referred to as AD converter hereinafter) AD operates to convert the light measurement data $Bv+Sv-Avo$ in analog form fed from the operational amplifier OA1 into a digital form when the CPU 1 produces a "High" level output pulse from the output terminal O6. The digital data is fed to the input terminal IP2 of a data selector MP1.

An aperture setting circuit AS supplies data $Avs-Avo$ representing the position of the aperture control ring of the interchangeable lens LE to the input terminal IP3 of the data selector MP1.

An exposure time setting circuit TS generates exposure time data which corresponds to the exposure time manually set by an exposure time setting member provided in the camera. The output terminal of the exposure time setting circuit TS is connected with the input terminal IP4 of the data selector MP1.

A film sensitivity setting circuit SS generates digital data corresponding to the film sensitivity manually set by a film sensitivity setting member (not shown) provided in the camera. The output terminal of the film sensitivity setting circuit SS is connected with the input terminal IP5 of the data selector MP1.

A mode setting circuit MSO generates signals representing one of the exposure control modes which is set by a mode setting member provided in the camera. The output terminal of the mode setting circuit MSO is connected with the input terminal IP5 of the data selector MP1.

An interface IF reads various data from the interchangeable lens circuit LEC when the output terminal O5 of the CPU 1 becomes "High". After completion of the read-in operation, the interface IF transfers the various data to the CPU 1 through the data selector MP1 and an external data bus DB corresponding to the control data of 4 bits fed from the output terminal OP3 of the CPU 1. A detailed circuit arrangement of the interface IF will be explained with reference to FIG. 17 later.

A flash light control circuit FC transfers various data between the CPU 1 and the flash device FL in response to the signals fed from the output terminals O5, O8, O9, O10 and O11 of the CPU 1 and the inverter IN2. A detailed circuit arrangement of the flash light control device FC will be described later.

The data selector MP1 transfers the output data on the input terminals IP1 through IP7 to the CPU 1 through the data bus DB in response to data of 4 bits applied to the selection terminal SL from the output terminal OP3 of the CPU 1.

Table 2 shows which kinds of data can be transferred to the data bus DB through the data selector MP1 in response to the input data on the selection terminal SL. For example, when the selection terminal SL is "0000"or "$0_H$", wherein the index H means hexa decimal digit, set exposure time data Tvs applied to the input terminal IP4 is transferred to the data bus DB from the data selector MP1.

When the selection terminal SL is one of the data of $6_H$ through $C_H$, the interface IF produces the data which are read from the lens circuit LEC as shown in the Table 4, the data is fed to the input terminal IP1 of the data selector MP1 and in turn transferred to the data bus DB to input the data in the CPU 1. When the lens detection switch LS is opened, i.e., an interchangeable lens is not attached to the camera, the input terminal il of the CPU is kept "Low" so that the CPU 1 produces only the data of "$0_H$" through "$4_H$", therefore the various data representing the lens LE can not be supplied to the CPU 1.

A release switch RS is closed upon depression of the release button or shutter button of the camera and opened upon releasing of the hand from the release button.

A switch CS is operated to close upon completion of the film winding and to open so as to prevent undesired exposure.

The signal of the operation of release switch RS is applied to one input terminal of the AND gate AN1 through the inverter IN4. On the other hand, the signal of the operation of switch CS is applied to the other input terminal of the AND gate AN1 through the inverter IN5 and to the input terminal i2 of the CPU 1. The output terminal of the AND gate AN1 is connected with the interrupt terminal it of the CPU 1.

The output terminal O5 of the CPU 1 is connected with an input terminal of the inverter IN3, the output of which is connected with the base of the transistor BT1 through a resistor so that the transistor BT1 is maintained in the ON state even if the light measurement switch MS is opened during an exposure control operation. The output terminal O6 of the CPU 1 is "High" while the interface IF reads in the data of the lens LE. The output terminal O6 is connected with an input terminal of an inverter IN6, the output of which is connected with the base of the transistor BT2 so that the transistor BT2 conducts to supply DC power to the lens circuit LEC through the terminals JB1 and JL1 when the output O6 is "High" and the output of the inverter IN6 is "Low". In the lens circuit LEC, a ROM RO various data of the lens.

The address data and the stored data in the ROM RO are transferred between the lens circuit LEC and the interface IF through the connection terminals JB3 and JL3 in synchronism with the clock pulse train CPL which is supplied to the lens circuit LEC from the interface IF through the connection termials JB2 and JL2.

Figure 7A:
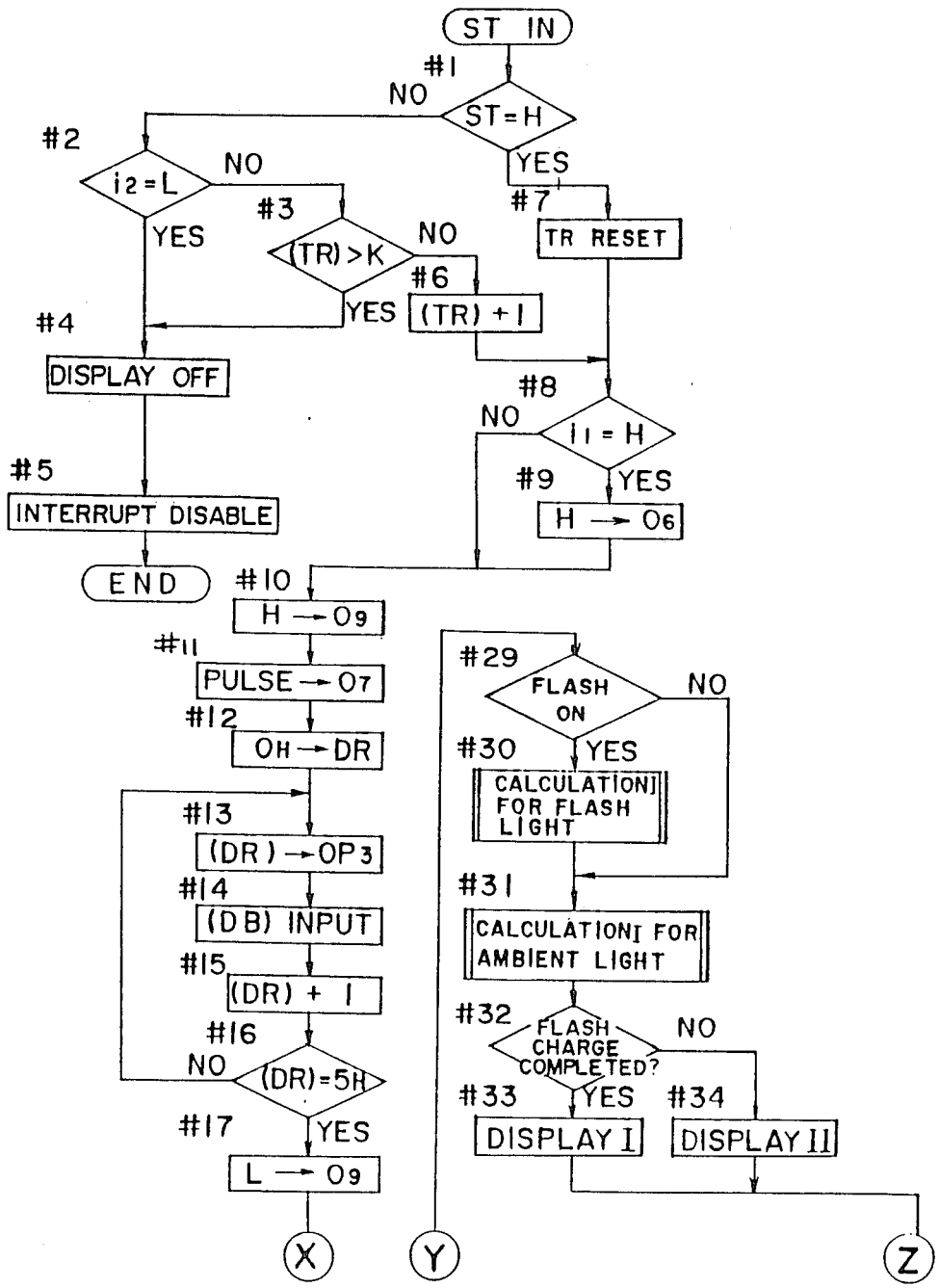
FIGS. 7a, 7b, 7c are flow charts showing the operation of the photographing system shown in FIG. 4, FIGS. 8 through 10 are characteristic curves showing the operation of the photographing system shown in FIG. 4, FIGS. 11a, 11b, 11c, 12a and 12b are flow charts showing the operation of the photographing system shown in FIG. 4, FIGS. 13a and 13b are detailed circuit diagrams of a flash control circuit in FIG. 4, FIGS. 14a and 14b are detailed circuit diagram of a flash device shown in FIG. 4.
Figure 7B:
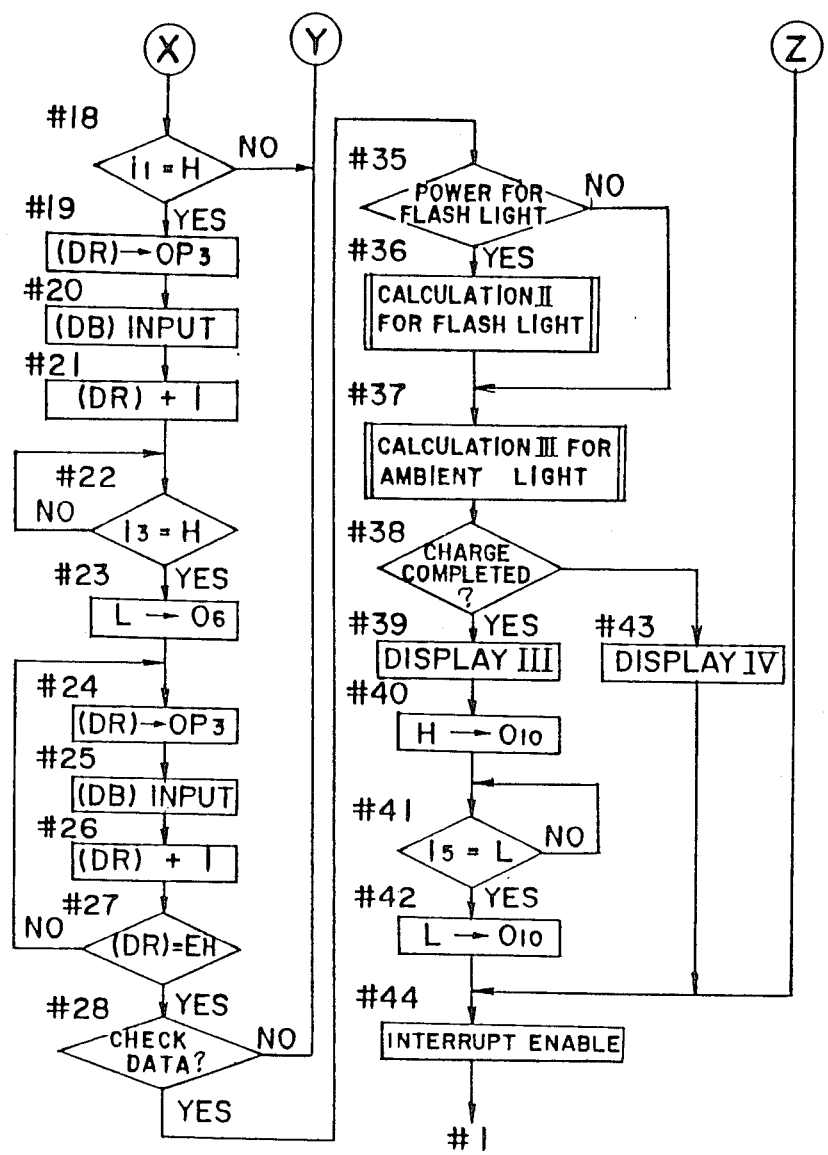
Figure 7C:
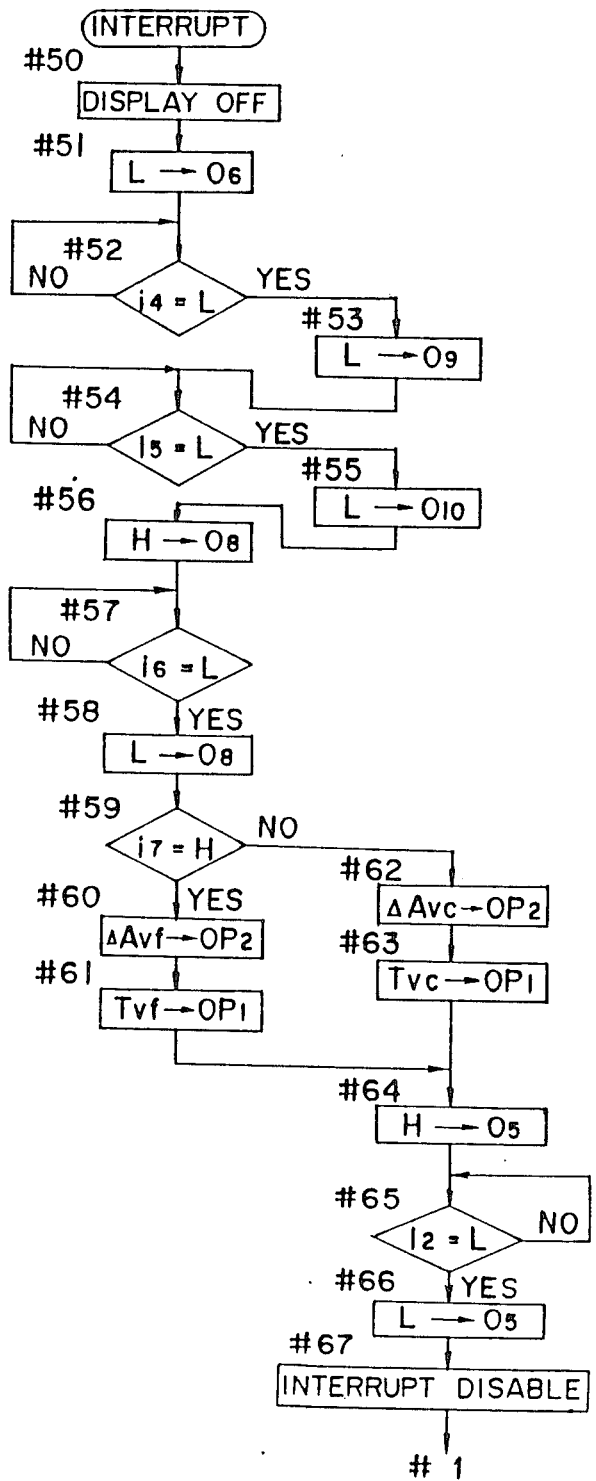

The operation of the circuit arrangement of the camera system shown in FIG. 4 is explained hereinafter with reference to FIGS. 7a, 7b and 7c.

When the camera system is not used, the CPU 1 is in a stand-by state and the clock pulse train CP is not supplied to the CPU 1 so as to save the DC power supply of the battery BB. When the light measurement switch MS is closed a "High" signal is fed to the CPU 1 to start it. The flash control circuit FC produces a start signal for starting a voltage booster in the flash device FL. At the step #1, the state of the terminal ST is determined. If the state of the terminal ST is "Low" the program goes to step #2. If the state of the terminal ST is "High", the program goes to step #7 to reset a register TR acting as a timer. In the step #8, whether or not the lens LE is attached to the camera is detected by the state of the input terminal il. If the input terminal il is "Low", the program goes to step #10. However, if the terminal il is "High", the program goes to step #9, causing the output terminal O6 to be "High", thereby causing the transistor BT2 to be conductive to supply the DC power to the lens circuit LEC, and causing the interface IF to start to read out the data of the lens LE attached to the camera. Then the program advances to step #10, wherein the output terminal O9 of the CPU 1 is "High" to cause the flash control circuit FLC to read out the data of the flash device FL1. Then the program goes to step #11 to generates a "High" pulse from the output terminal O7 of the CPU 1. With the "High" pulse on the terminal O7, the A-D converter AD starts to convert the analog information of the light measurement result fed from the operational amplifier OA1 to digital information. In the step #12, 4 bit data $0_H$ is set in the data register DR and the 4 bit data $0_H$ appears on the output terminal OP3 of the CPU 1. With the $0_H$ data, the exposure time data Tvs is output from the data selector MP1. The data Tvs is stored in the register DR in the CPU 1. In the step #15, 1 is added to the content of the register DR. Subsequently, in the step #16, whether or not the data of the register is $5_H$ is determined. If the content of the register DR is not $5_H$, the program returns to step #13 and repeats the sequence described above.

When the content of the register DR is $1_H$, the film sensitivity Sv is read in the CPU 1. When the content of the register DR is $2_H$, the exposure mode data is read in the CPU 1.

When the content of the register DR becomes $3_H$, the AD conversion in the AD converter AD is completed to generate data of the brightness of the main object, and $$Bv+Sv-Avo$$

is read into the CPU 1 to store it in a suitable register.

In a similar manner as described above, when the contents of the data register DR becomes "$4_H$", the data selector MP1 transfers the flash control data on the input terminal IP7 fed from the flash device FL to the CPU 1. In the step #16, as the content of the data register DR is "$5_H$", the program goes to step #17, whereby the output O9 becomes "Low" to disable the flash control device FC and in turn the program flow goes to step #18, wherein the state of the input terminal il is determined. In a case where the switch LS is open, i.e., the output of the inverter IN1 is "Low", the program flow goes to step #29 the detail of which will be described later. In a case where the interchangeable lens LE is attached to the camera with the switch LS closed, i.e., the input terminal il is "High", the program flow goes to step #19. In the step #19, the data $5_H$ in the register DR is output on the terminal OP3 so that the data representing the aperture value Avs−Avo is transferred to the data bus DB for applying the data to the CPU 1. In the step #20, the data Avs−Avo is stored in a register and thereafter, 1 is added to the content of the data register DB and the program flow goes to step #22.

In the step #22, the CPU 1 waits for the time when the input terminal i3 becomes "High". When the read-in operation of the data of the lens circuit LEC in the interface IF is completed, the interface IF applies a "High" signal to the input terminal i3 of the CPU 1.

With the "High" signal of the interface IF, the program flow goes to step #23, wherein the output terminal O6 of the CPU becomes "Low" which is reversed to "High"" by the inverter IN6, thereby causing the transistor BT2 to be non-conductive, resulting in cutting off the DC power supply to the lens circuit LES.

When the input terminal i3 of the CPU 1 becomes "High", certain of the data stored in the interface IF is selectively transferred to the CPU 1 depending on the contents of the data on the terminal OP3 of the CPU 1. Namely, checking data is transferred to the input terminal IP1 of the data selector MP1 corresponding to the data $6_H$, similarly the open aperture value Avo for the data $7_H$, the maximum aperture value Avm for the data $8_H$, the minimum focal distance fw for $9_H$, the maximum focal distance ft for $A_H$, Dv (explained hereinafter) for $B_H$, the set picture taking distance Dv for $C_H$ and the set focal distance fs for $D_H$ are respectively transferred to the input terminal IP1 of the data selector MP1. These data are transferred to the CPU 1. When the read-in operation of the data in the CPU 1 is completed in the step #27, the content $E_H$ of the data register DB is detected to advance the program flow to the step #28. In the step #28, whether or not the checking data is applied to the CPU 1 is determined. The checking data shows that the interchangeable lens is attached to the camera. The checking data is the same for all kinds of the interchangeable lenses.

When the checking data is detected, the program flow goes to the step #35. However, when the checking data is not detected, the program flow goes to the step #29. The latter case occurs either when any one of the interchangeable lenses is attached to the camera or when an accessory such as an intermediate ring or a bellows is interposed between the lens and the camera.

In a case where the step #29 is selected, whether or not the flash light photographing mode signal is present is determined in the step #29 for determining whether or not the flash device FL is attached to the camera. When the flash device FL is not attached to the camera, all the data on the connecting terminal JB6 is made "Low", then the program flow goes to the step #31 so as to calculate data for ambient light photographing. When one of the aperture priority exposure mode or exposure priority aperture mode is selected by a mode selecting device, the light measurement circuit ME produces Bv−Avn, wherein Avn is the effective aperture value. Then the exposure time Tvc is calculated by the equation (Bv−Avn)+Sv=Tvc.

The speed of the shutter SHT of the camera is controlled by the value calculated by the above equation. In this case, the decreasing value Av of the aperture is zero and therefore the diaphragm aperture APL is not drawn. In this case the exposure time is controlled by the TTL (through the lens) exposure measurement by the aperture setting method.

If the manual exposure control mode is selected, the exposure time is controlled by the manually set value, the decreasing value of the aperture is set to zero so that the size of the actual diaphragm aperture APL is kept unchanged. However, when the fact that the flash device is attached to the camera is detected in the step #29, the program flow goes to step #30 for calculating the control data for the photographing. In this case the aperture value Avf is made zero. The exposure time value Tvf is set by the exposure value corresponding to the critical synchronizing exposure time such as 1/250 sec when one of the automatic exposure control modes is selected. In a case where the manual exposure control mode is selected, if the set exposure time Tvs is shorter than the critical synchronizing exposure time, the data Tvf is selected for the exposure time control. If the set exposure time Tvs is longer than the critical synchronizing exposure time, the set exposure time Tvs is selected as the exposure time data Tvf for the flash control.

Subsequently, the calculation for the exposure data for the picture taking with ambient light is performed in the step #31 as described above, and then the program flow goes to the step #32, wherein whether or not the main capacitor in the flash device FL is charged to the predetermined voltage is judged by the data sent from the flash device to the CPU 1. When the charged voltage is reaches the predetermined value, the program flow goes to the step #33, whereby a display device is lit to show that flash picture taking is ready. If the voltage in the main capacitor does not reach the predetermined value, the program flow goes to the step #34 to display that the picture taking with ambient light is ready.

In the step #28 described above, when the checking data is detected, the program flow goes to the step #35, wherein upon detecting that the flash device FL is attached to the camera, the calculation of the data for the flash light photographing is made, and in turn the program flow goes to the step #37. On the other hand, upon detecting that the flash device is not attached to the camera, the program flow goes to the step #37 for calculation of the following equation for photographing with ambient light.

$$(Bv+Sv-Avo)-Avo=Ev \quad (1)$$

In addition when the program mode is set, the following equation $$p \cdot Ev = Av \ (0<p<1) \quad (2)$$

is calculated. When Avo≦Avc≦Avm, (wherein Avo is the open aperture value and Avm is the maximum aperture value), the following equation $$Ev-Av=Tv \quad (3)$$

is calculated. The calculated value Tv is used as the exposure time value for the picture taking with ambient light. When Av<Avo, the following equation $$Ev-Avo=Tv \quad (4)$$

is calculated. In a case where the calculated exposure time Tv is smaller than Tv$_{min}$, the value Tv$_{min}$ which is the maximum exposure time is used as the control value Tvc with a warning lamp lit for indicating that the exposure value thus calculated is under the desired exposure value. When $Tv \geq Tv_{min}$ the value calculated by the equation (4) is used as the control value Tvc. Furthermore, if the aperture value Av calculated by the equation (2) is greater than Avm, the data Avm is used as a control value and the following equation $$Ev-Avm=Tv \quad (5)$$

is calculated, and if Tv is greater than $Tv_{max}$ ($Tv_{max}$ is the shortest exposure time) the value $Tv_{max}$ is used as the control value Tvc with the warning lamp lit to indicate an overexposure.

In the aperture priority exposure mode (referred to as A mode hereinafter), the set aperture value Avs is calculated by the following equation $$(Avs-Avo)+Avo=Avs \quad (6).$$

Subsequently the exposure time is calculated by the equation $$Ev-Avs=Tv \quad (7)$$

When $Tv_{min} \leq Tv \leq Tv_{max}$, the calculated exposure time Tv and the set aperture value Avs are used as the control data Avc and Tvc. When $Tv < Tv_{min}$ the data Tvmin is used as the control data Tvc and the following equation $$Ev-Tv_{min}=Av \quad (8)$$

is calculated, When $Av \geq Av_{min}$, the calculated aperture value Av is used as the control data. When $Av < Av_{min}$, the data $Av_{min}$ is used as a control data Avc with the warning lamp lit to indicate an underexposure.

When the calculated exposure time Tv is greater than the shortest exposure time $Tv_{max}$, the shortest exposure time $Tv_{max}$ is used as a control data and the following equation is calculated $$Ev-Tv_{max}=Av \quad (9).$$

When $Av < Avm$, the data Avm is used as a control data Avc with the warning lamp lit to indicate an overexposure. However, when $Av \geq Avm$, the data of the aperture value Av calculated by the equation (9) is used as the control data Avc for the aperture value.

In the exposure time priority aperture control mode (referred to as S mode), $$Ev-Tvs=Av \quad (10)$$

is calculated. When $Avo \leq Av \leq Avm$, the set exposure time Tvs and the aperture value Av calculated by the equation (10) are used as the control data Avc and Tvc. When $Av < Avo$, the data Avo is used as the control data Avc and the following equation is calculated.

$$Ev-Avo=Tv \quad (11)$$

When $Tv \geq Tv_{min}$, the exposure time Tv calculated by the equation (11) is used as the control data Tvc. When $Tv < Tv_{min}$, the value $Tv_{min}$ is used as the control data Tvc with the warning lamp lit to indicate an underexposure. When the data Av calculated by the equation (10) is greater than Avm, the value Avm is used as the control data and the following equation is calculated.

$$Ev-Avm(=Avc)=Tv \ldots \quad (12)$$

When Tv calculated by the equation (12) is greater than $Tv_{max}$, the value $Tv_{max}$ is used as the control data with the warning lamp lit to indicate an overexposure. When the value Tv is smaller than $Tv_{max}$, the data Tv calculated by the equation (12) is used as the control data Tvc.

In the manual setting mode (referred to as M mode), the set aperture value Avs and the set exposure time value Tvs are used as the control data Avs and Tvs, and the following equation is calculated.

$$Ev-(Av\overset{0}{c}+Tvc)=\Delta Ev \ldots \quad (13)$$

After the calculation as described above according to any one of the set modes is completed in the step #37, the program flow goes to the step #38.

The following description is made to explain the contents of the step #36 which is performed when the flash device FL is attached to the camera.

Figure 11B:
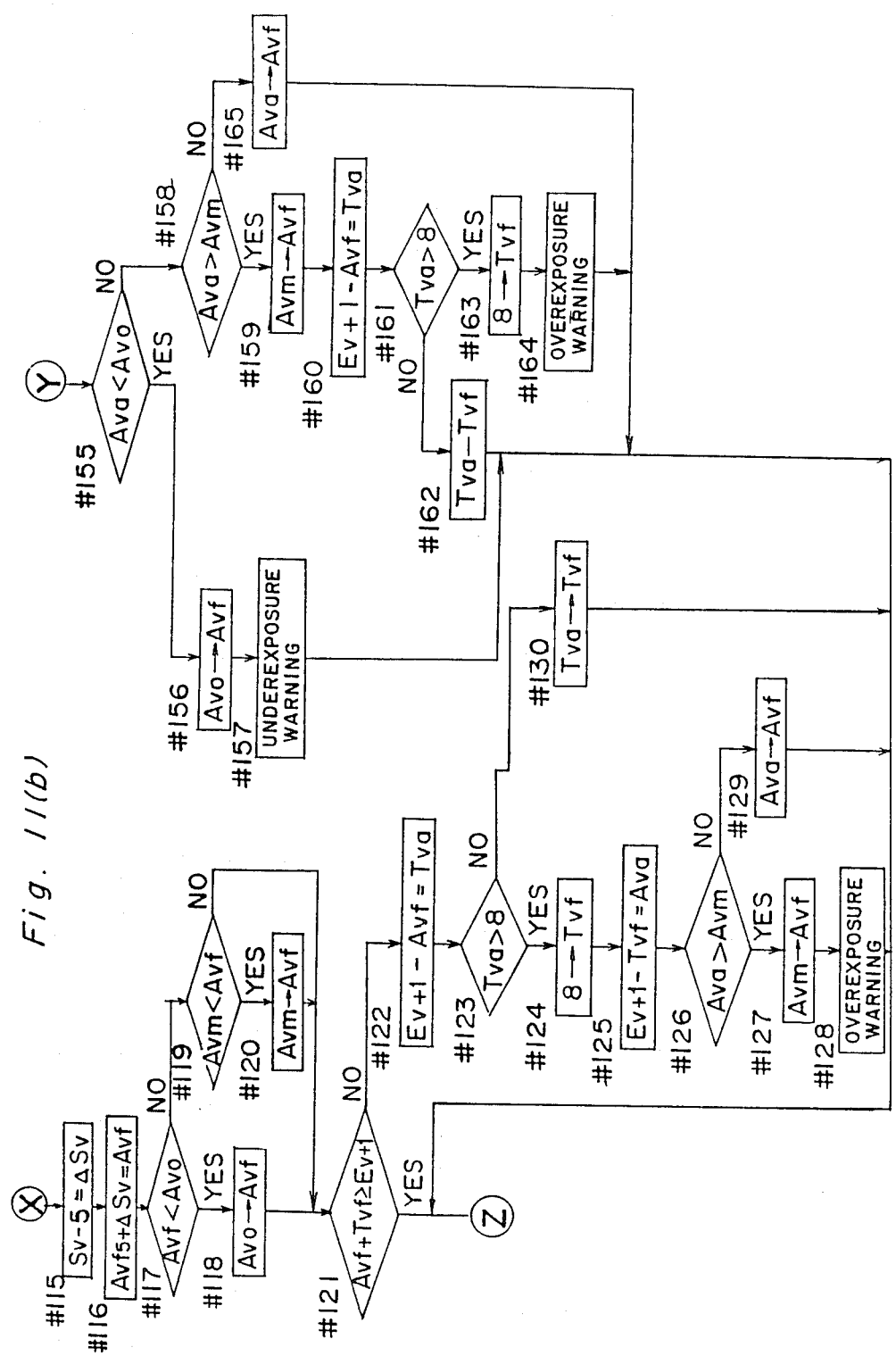
Figure 11C:
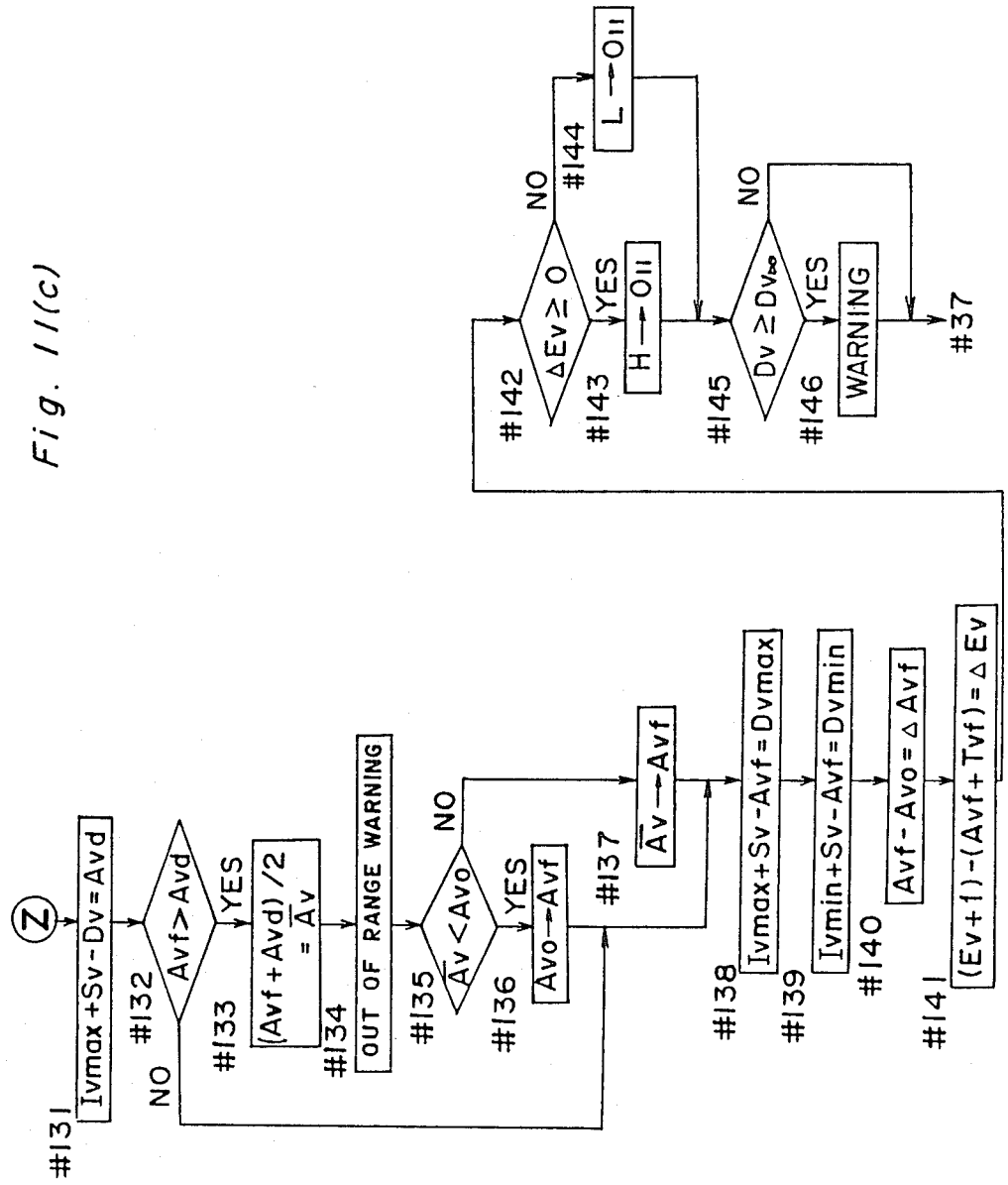

Referring to FIG. 11, in the step #101, the following equation is calulated $$(Bv-Avo)+Sv+Avo=Ev \ldots \quad (15).$$

Subsequent to the calculation, which of the TTL mode or the external light mode is selected by the flash device FL is determined in the step #102. If the TTL mode is selected, the program flow goes to the step #103. If the external light mode is selected, the program flow goes to the step #201 shown in FIG. 12.

Figure 8:
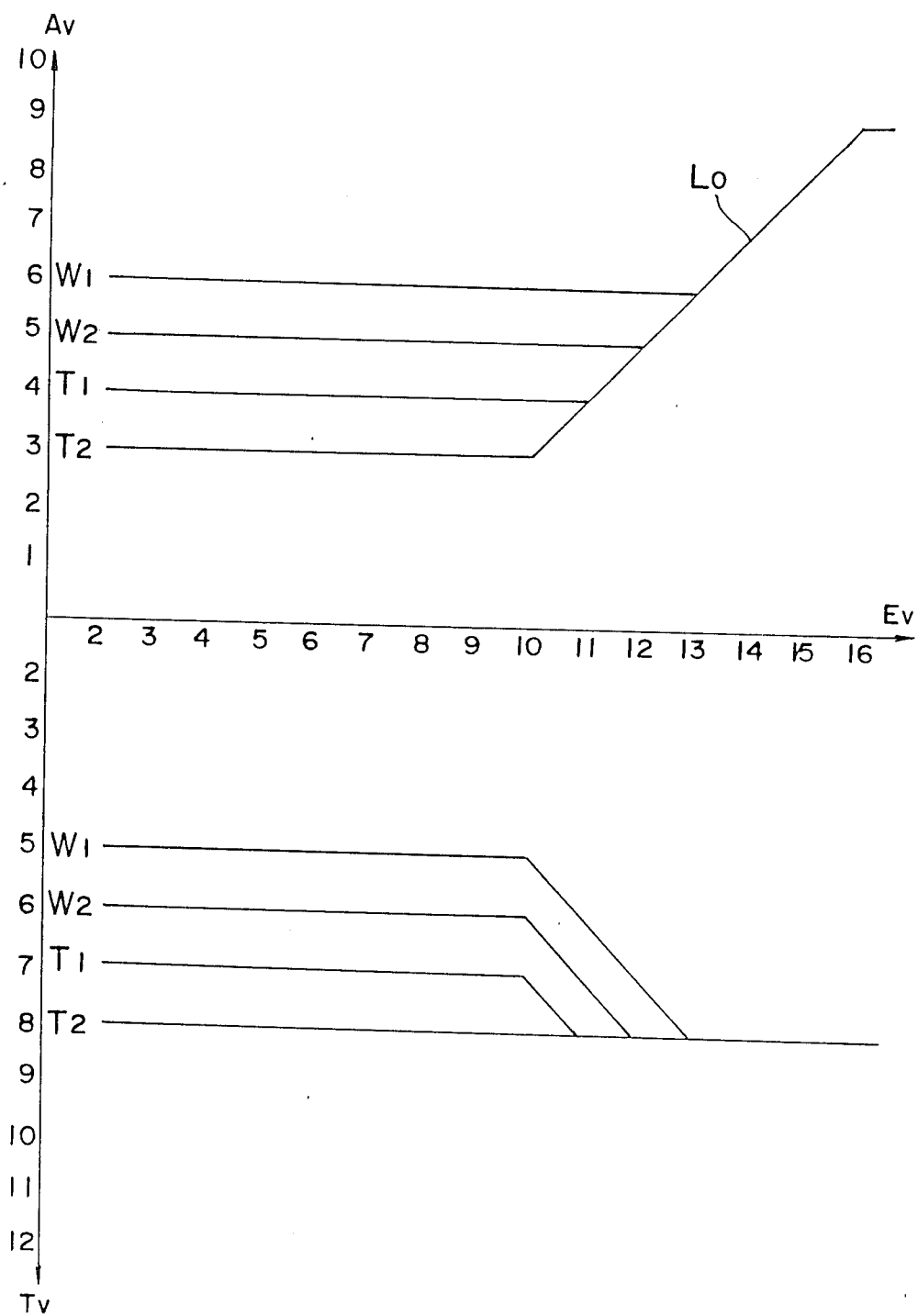

In case of the TTL mode, if the camera is set in the P mode, the program flow goes to #104, and if not the P mode, the step #150 is selected. In a case where the TTL mode and P mode are selected, the CPU determines whether or not the focal distance of the interchangeable lens LE attached to the camera is shorter than 30 mm in the step #104. In case of YES, an aperture value 6 (F8) is set as the data $Avf_5$ as shown in W1 in FIG. 9 for the film sensitivity $Sv=5$ in the step #105, and in turn the exposure time data 5 (1/30 sec) is set as the synchronized exposure time Tvf in the step #106. When the focal distance of the interchangeable lens is longer than 30 mm, whether or not the focal distance is in the range of 31 mm to 55 mm is determined in the step #107. In case of YES, the aperture value Avfs is set by 5 (F5.6) and the exposure time Tvf is set by 6 (1/60 sec) as shown by W2 in FIG. 9. In a case where the focal distance is larger than 55 mm, whether or not the focal distance is in the range of 56 mm to 120 mm is determined in the step #110. In case of YES the aperture value $Avf_5$ is set by 4 (F4) and the exposure time $Tvf_5$ is set by 7 (1/125 sec) as shown by T1 in FIG. 8. In case of NO, the aperture value $Avf_5$ is set by 3 (F2.3) and the exposure time Tvf is set by 8 (1/250 sec) in the step #113, then the program flow goes to the step #115.

In the step #115, $$Sv-5=\Delta Sv \ldots \quad (16)$$

is calculated and the program flow goes to the step #116 wherein $$Avf_5+\Delta Sv=Avf \ldots \quad (17)$$

is calculated. By determining the aperture value AVf as described above, since the incident light from the flash device FL to the camera can be decreased so that the aperture value can be decreased as small as possible in such a state that the flash available operation range between the camera and the flash device is kept constant. Accordingly, in photographing with the flash light, the depth of the focus can be as deep as possible. In a case where the film sensitivity is different from $Sv=5$ by $\Delta Sv$, the aperture value can be decreased according to the value $\Delta Sv$ and flash available operation range between the flash device and the camera is kept unchanged.

In the step #117, the CPU 1 determines whether or not the aperture value Avf obtained by the equation (17) is smaller than Avo and when Avf<Avo, the value Avo is used as the aperture value Avf for photographing with the flash device FL in the step #118. When Avo≦Avf, the CPU 1 determines if Avm<Avf in the step #119. When Avm<Avf, Avm is used as Avf and when Avm≧Avf the value Avf calculated by the equation (17) is used as the aperture value and then the program flow goes to the step #121.

In the step #121, the CPU 1 determines if the following equation $$Avf + Tvf \geq Ev + 1 \ldots \quad (18)$$

is satisfied, and if YES, the program flow goes to step #131, on the other hand, if NO, the program flow goes to step #122. The Ev value corresponding to the change over point of the judgement at the step #121 is $EV=10$. Accordingly, if the Ev is smaller than 10, the data Tvf and Avf are used without modification in the step #131. On the other hand, if the value Ev is equal to or greater than 10, the data Tvf and Avf are modified as hereinafter described and the program flow goes to the step #132.

In the step #122, $$Ev + 1 - Avf = Tva \ldots \quad (19)$$

is calculated and in the step #123, if Tva is greater than 8 is determined. When Tva is equal to or smaller than 8, the value Tva obtained by the equation (19) is used as the exposure time control data Tvf and the program flow goes to the step #131.

The operation performed in the steps #121 and #122 shows that in a case where the focal distance is greater than 30 mm the aperture value is forcibly set by the data W1 for the exposure value Ev within the range of $10 \leq Ev \leq 13$. Similarly, in a case where the focal distance of the lens is in the range of 31 mm to 55 mm, the aperture value is forcibly set by the data W2 for the brightness Ev within the range of $10 \leq Ev \leq 12$. The data T1 corresponds to the brightness Ev in the range $10 \leq Ev \leq 11$. If Tva>8, $$Ev + 1 - Tvf = Ava \ldots \quad (20)$$

is calculated by putting Tvf−8. Subsequently, if Ava≦Avm, the aperture value Ava calculated by the equation (20) is used as the control data, and in turn the program flow goes to the step #131. If Ava>Avm, the data Avm is used as the control data with the warning lamp (display device OE in FIG. 4) lit to indicate an overexposure and the program flow goes to the step #131. The steps from #124 to #129 show the operation for determining the data of the aperture value and the exposure time relative to the brightness Ev in FIG. 8, i.e., the aperture value can be calculated along the slanting line $L_0$ for $Ev \geq 13$ when the data W1 is selected, for $Ev \geq 12$ when the data W2 is selected, for $Ev \geq 11$ when the data T1 is selected and for $Ev \geq 10$ when the data T2 is selected.

In the above description, the aperture value Tva and the exposure time Tva are calculated on the basis of the data $Ev+1$, namely the constant K2 is designated as 1Ev, however, the content k2 can be selected by a desired value ranging from 0Ev to 2Ev.

The calculation of the exposure data for the S mode will be described hereinafter.

Figure 9:
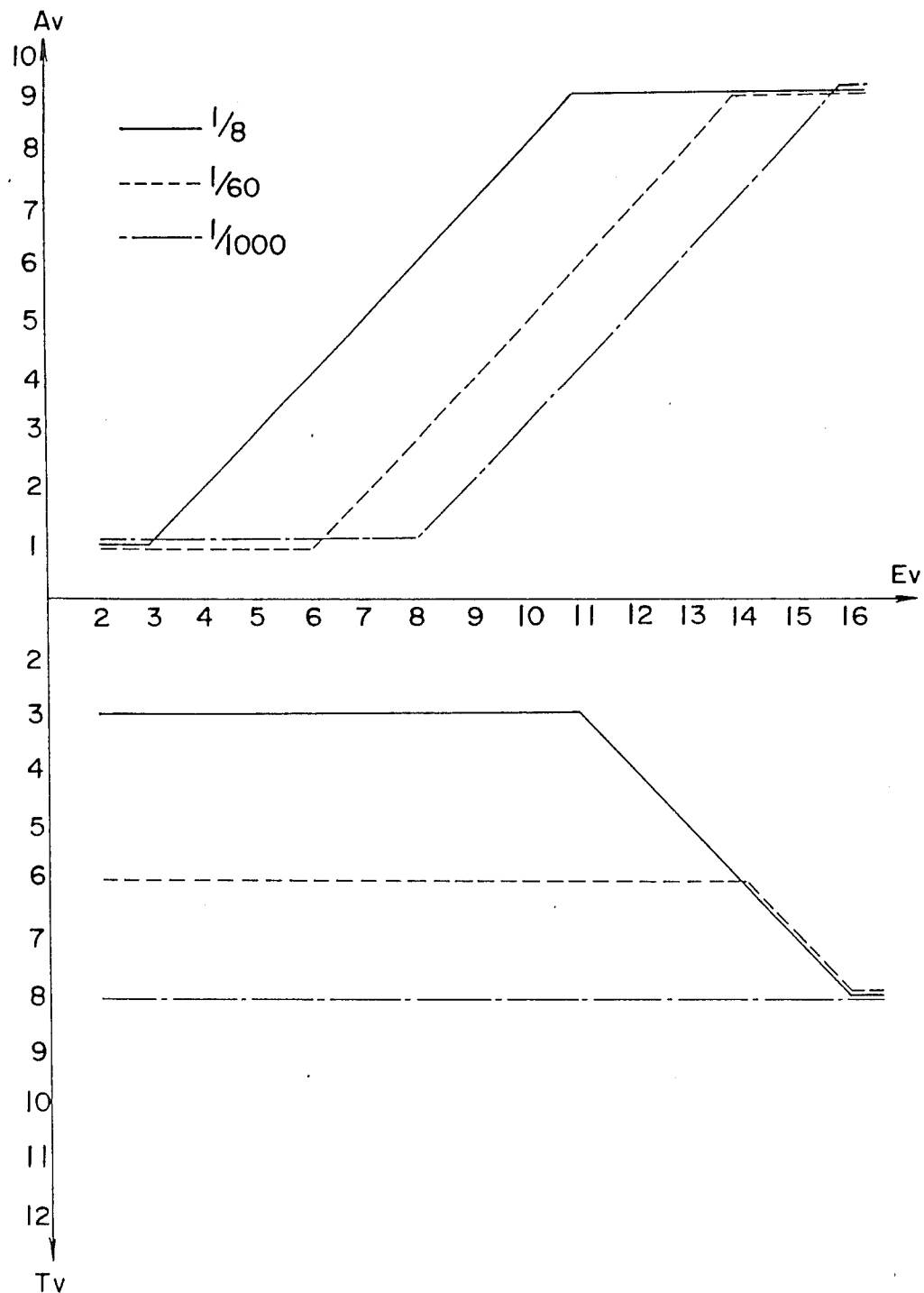

FIG. 9 shows the relationships between Av, Tv and Ev taking Tvs as a parameter wherein the real lines correspond to the parameter $Tvs=3$ (⅛ sec), the dotted lines correspond to $Tvs=6$ (1/60 sec) and the chain lines correspond to $Tvs=8$ (1/250 sec).

In FIG. 11 if the mode is not the P mode, the program flow goes to the step #150 to determine if the mode is the S mode. In case of the S mode, the CPU 1 determines whether or not Tvs is equal to or less than 8 in the step #151. If Tvs≦8, the set exposure time Tvs is set as the control value for the exposure time Tvf and the program flow goes to the step #154. However, if Tvs>8, a value 8 is set for Tvf in the step #153 and the program flow goes to the step #154, wherein $$Ev + 1 - Tvf = Ava \ldots \quad (21)$$

is calculated to obtain the aperture control value Ava. In the steps #155, if Ava<Avo is detected the program flow goes to step #156.

In the step 190 156, the data Avo is used for the aperture control data Avf and the warning lamp UE is lit to indicate the underexposure, then the program flow goes to the step #131. It is noted that the operation of the step #156 corresponds to the range $EV<3$ when the characteristic curve is represented by the real line, to the range $Ev<6$ for the characteristic curve of the dotted line and to the range $Ev<8$ for the chain line.

If Ava≧Avo is determined in the step #155, the program flow goes to the step #158, wherein if Ava>Avm is determined. If Ava≦Avm, the aperture value Ava calculated by the equation (21) is used as the aperture control data, and then the program flow goes to the step #131. This operation corresponds to the range $3 \leq Ev \leq 11$ for the characteristic curve shown by the real line in FIG. 9, to the range $6 \leq Ev \leq 14$ for the characteristic curve shown by the dotted and to the range $8 \leq Ev \leq 16$ for the characteristic curve shown by the chain line.

If Ava>Avm is determined in the step #158, the value Avm is selected as the aperture control data Avf in the step #159 and the following equation $$Ev + 1 - Avf = Tva \ldots \quad (22)$$

is calculated in the step #160.

If Tva≦ is 8 is determined in the step #161, the program flow goes to the step #162, wherein the value Tva calculated in the equation (22) is selected as the exposure time control data Tvf and then the program flow goes to the step #131. This operation corresponds to the range $11 \leq Ev \leq 16$ for the characteristic curve shown in the real line in FIG. 10, and to the range $14 \leq Ev \leq 16$ for the characteristic curve shown in the dotted line in FIG. 9. There is no such a range as described above for the chain line.

If Tva>8 is detected in the step #161, the program flow goes to the step #163, wherein the exposure time control data Tvf is set to (1/250) with warning lamp OE lit to indicate an overexposure, then the program flow goes to the step #131. This operation corresponds to the range Ev>16 for the characteristic curves shown in FIG. 10.

The operation in the A mode will be hereinafter described with reference to FIG. 12.

When it is determined that the mode presently set is not the S mode in the step #150, the program flow goes to the step #170, to determine whether or not the present mode is the A mode. When the A mode is detected, the program flow goes to the step #171, wherein the CPU 1 determines whether or not the focal length of the interchangeable lens is attached to the camera. If the result of the judgement is YES, the program flow goes to the step #172 to designate the exposure time control data Tvf as 5 (1/30 sec).

If the result of the judgement is NO, the program flow goes to the step #173 to determine whether the focal length of the inerchangeable lens attached to the camera is in the range of 31 mm to 55 mm. If the result of the judgement is YES, the program flow goes to the step #174 to designate the exposure time control data Tvf as 6 (1/60 sec). If the result of the judgement in the step #173 is NO, the program flow goes to the step 190 175 to determine whether the focal length of the interchangeable lens is in the range of 56 mm to 120 mm. If the result of the judgement is YES, the program flow goes to the step #176 to designate the exposure time control data Tvf as 7 (1/125 sec). If the focal length of the interchangeable lens is greater than 120 mm, the program flow goes to the step #177 to designate the exposure time control data Tvf as 8 (1/250 sec).

After the operation described above is completed, the program flow goes to the step #178 to determine whether the exposure time control data Tvf satisfies the following equation $$Avs + Tvf \geq Ev + 1 \ldots \quad (23).$$

If the equation (23) is satisfied, the program flow goes to the step #179 to designate the set aperture value data Avs as the desired aperture value data Avf and then the program flow goes to the step #131.

Figure 10:
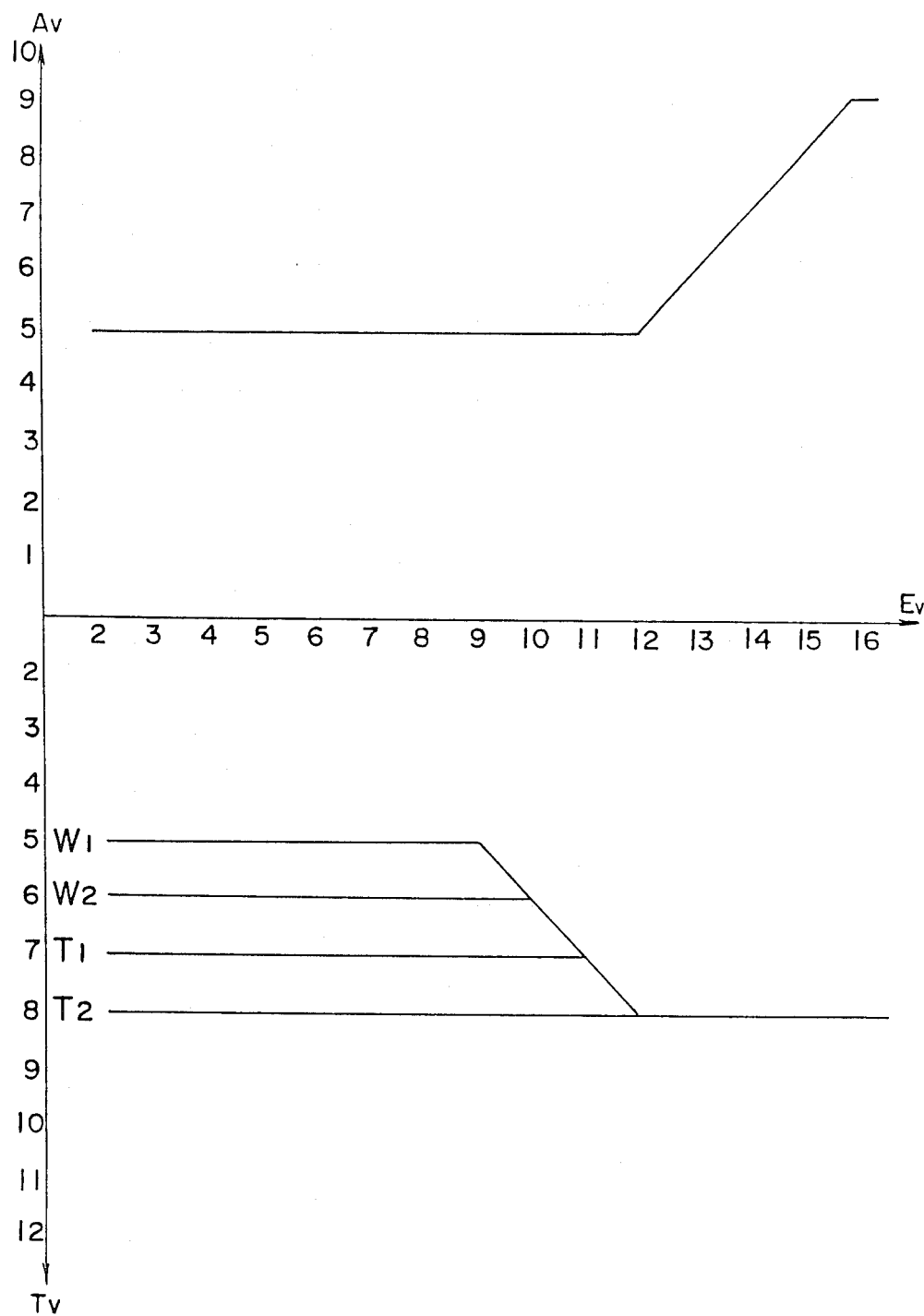

The operation in the steps #178 and #179 means that in the example shown in FIG. 10, if the focal length of the interchangeable lens is shorter than 30 mm (this range is shown as W1 in FIG. 10) and the aperture value is set to the value 6, the brightness value Ev equal to or smaller than 9 may be suitable for the photographing. Similarly for the focal length range W2 (31 mm≦focal length≦55 mm) and the aperture value 5 the brightness value in the range Ev=10 can be used, for T1 (56 mm≦focal length≦120 mm) and T2 (focal length>121 mm) Ev≦11 and Ev≦12 can be used.

In a case where the equation (23) is not satisfied, the program flow goes to the step #180 to calculate the following equation $$Ev + 1 - Avs = Tva \ldots \quad (24).$$

Then whether the data Tva is greater than 8 is determined in the step #181. If the result of the judgement in the step #181 is NO, i.e., the value Ev is equal to or smaller than 8, the program flow goes to the step #188 to designate the exposure time control data Tva calculated by the equation (24) as the desired exposure time control data Tvf and the program flow goes to the step #131. The operation in the steps #181 and #188 is performed for the respective ranges of the brightness 9<Ev≦12 for the focal length W1, 10≦Ev≦12 for the focal length W2 and 11<Ev≦12 for the focal length T1. In this case there is no suitable brightness range for the focal length T2.

If Tva>8 is detected in the step #181, the program flow goes to the step #182, wherein the exposure time control data Tvf is designated as 8. The the program flow goes to the step #183 to calculate $$Ev + 1 - Tvf = Ava \ldots \quad (25).$$

In the step #184, if Ava>Avm is determined. If Ava<Avm, the value Ava is designated as the aperture value control data Avf and the program flow goes to the step #131. This operation is performed in the range 12≦Ev≦16. If Ava>Avm, the program flow goes to the step #185 to designate the data Avm as the aperture value control data Avf with the warning lamp OE lit in the step #186 to indicate an overexposure, then the program flow goes to the step #131.

If the result of the judgement in the step #170 is NO, i.e., the mode set in the camera is not the A mode, the program flow goes to the step #190 for the M mode. In the step #190, whether the exposure time data Tvs set by a manual operation is equal to or smaller than 8 is determined. If Tvs>8, the exposure time data is set to 8 and if Tvs≦8, the set exposure time data Tvs is used as the exposure time control data Tvf and the aperture value Avs is used as the value Avf in the step #175, then the program flow goes to the step #131.

Figure 12A:
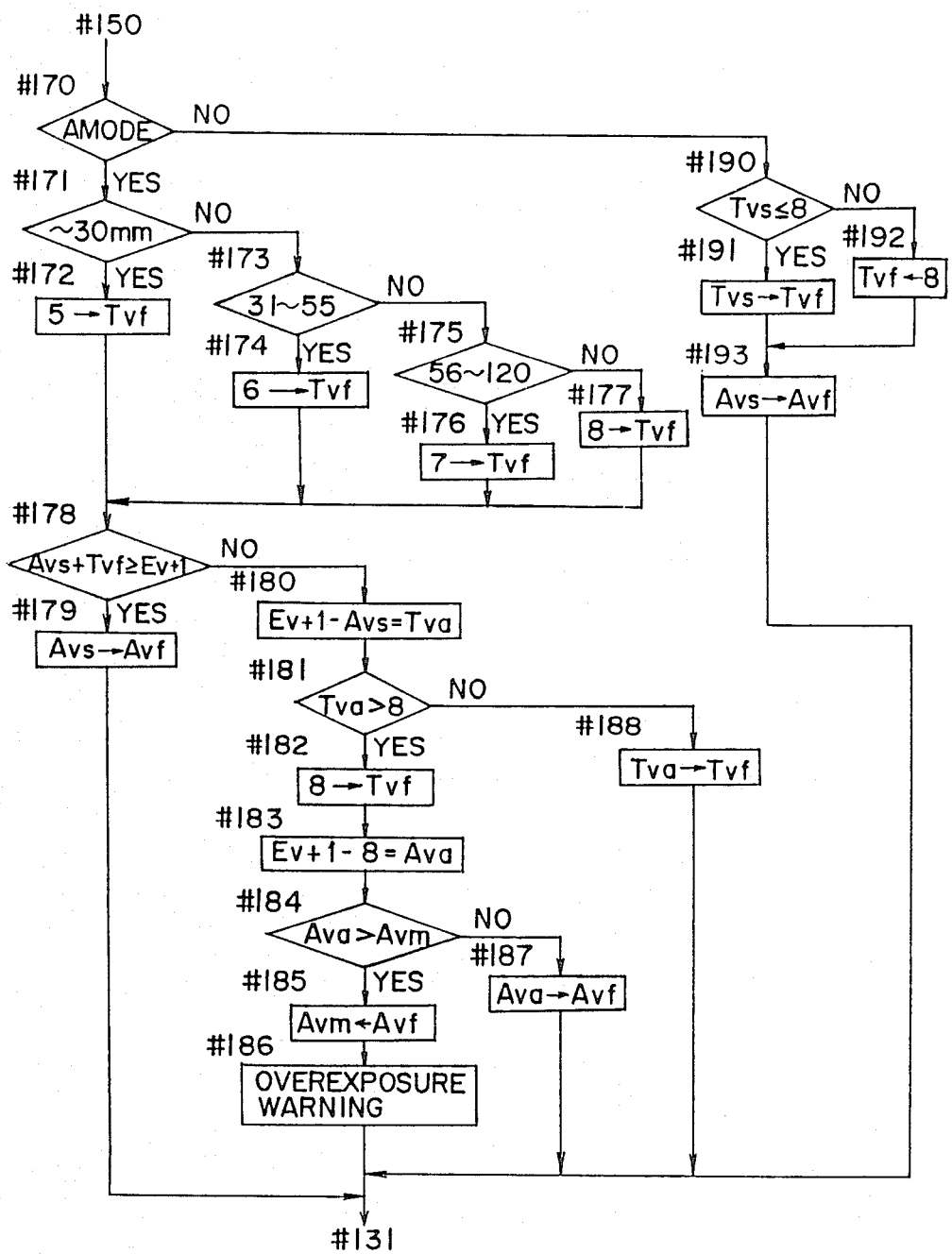
Figure 12B:
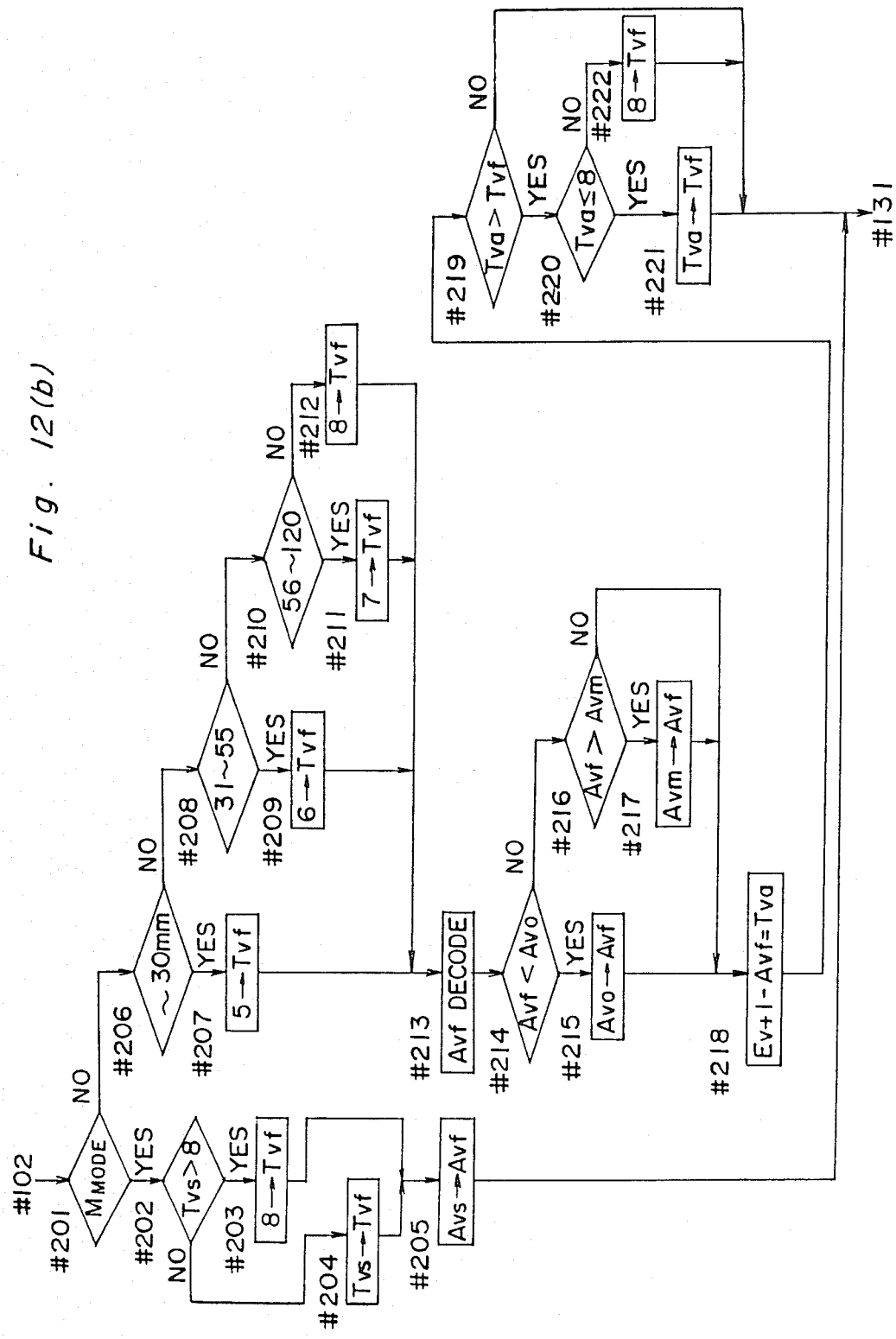

In the step #102 shown in FIG. 12, if the result of the judgement is NO, i.e., otherwise the TTL mode is detected, the program flow goes to the step #201 shown in FIG. 13 under such a judgement that the ambient light photographing mode is set in the flash device FL.

In the step #201, whether the M mode is set in the camera is determined. If the M mode is detected, the program flow goes to the step #202 to determine if the set exposure time data Tvs is larger than 8. If the result of the judgement is YES, the desired exposure time control data Tvf is set to 8. If the result of the judgement is NO, i.e., the data Tvs is equal to or smaller than 8, the set exposure time data Tvs is used as the exposure time control data Tvf.

Subsequently, in the step #205, the set aperture value Avs is used as the aperture value control data Avf, then the program flow goes to the step #131.

In the step #201, if the result of the judgement is NO, the program flow goes to the step #206 for each of the P mode, A mode and S mode to determine whether the focal length of the inerchangeable lens is smaller than 30 mm. If the result of the judgement is YES, the exposure time control data Tvf is set to 5 and the program flow goes to the step #213. If the focal length is greater than 30 mm, the program flow goes to the step #208 to determine whether the focal length is in the range W2 (from 31 mm to 55 mm). If the result of the judgement in the step #208 is YES, the exposure time control data Tvf is set to 6, then the program flow goes to the step #213. If the result of the judgement in the step #208 is NO, the program flow goes to the step #210 to determine whether the focal length of the interchangeable lens is in the range T1 (from 56 mm to 120 mm). If the result of the judgement is YES, the exposure time control data Tvf is set to 7 and the program flow goes to the step #213. If the result of the judgement in the step

210, is NO, i.e., the focal length of the interchangeable lens is greater than 120 mm, the exposure time control data Tvf is set to 8 and the program flow goes to the step #213.

In the step #213, the aperture control data Avf is obtained by the data coming from the flash device FL and whether the aperture value control data Avf is smaller than the value Avo in the step #214. If the judgement is YES, the value Avo is used as the aperture value control data Avf and the program flow goes to the step #218.

If the result of the judgement in the step #214 is NO, i.e., the aperture value control data Avf is equal to or greater than Avo, whether Avf>Avm is determined in the step #216. If the result of the judgement in this step is YES, the value Avm is used as the aperture control value Avf and the program flow goes to the step #218. If the result of the judgement in the step #216 is NO, i.e., the aperture value control data Avf≦Avm, the program flow goes to the step #218 to calculate the following equation $$Ev+1-Avf=Tva \ldots \quad (26).$$

Subsequently, whether the value Tva>Tvf is determined. If Tvf<Tva, the program flow goes to the step #131.

If Tva>Tvf, the program flow goes to the step #220 to determine whether the value Tva is equal to or smaller than 8. If the result of the judgement is NO, the program flow goes to the step #222 to designate the value 8 for the exposure time control data Tvf, then the program flow goes to the step #131.

If the result of the judgement in the step #220 is YES, i.e., Tva≦8, the value Tva calculated by the equation (26) is used as the exposure time control data Tvf, then the program flow goes to the step #131.

As explained above, in a case where pictures are taken under the external light photographing mode, the aperture value for the aperture control device APL is controlled by the aperture value set in the flash device FL.

In a case where the exposure time control value determined by the brightness of the photographic object has a value in the range U0 between the exposure time value determined corresponding to the focal length of the interchangeable lens LE and the critical synchronizing exposure value, the value Tvf is used as the desired exposure time control data. When the exposure time control value determined by the brightness of the photographic object is out of the range U0, the exposure time control data Tvf is used. In the step #131, a critical aperture value Avd for the operation coupled with the flash device is calculated on the basis of the maximum light emission value $Iv_{max}$, film sensitivity Sv and the distance Dv using the following equation $$Iv_{max}+Sv-Dv=Avd \ldots \quad (27).$$

Subsequently, whether Avf is greater than Avd is determined in the step #132. If Avf≦Avd, the aperture value control data Avf is set slightly greater than the flash available critical aperture value, the light emission is sufficient so that the program flow goes to the step #133 without indication of the out-of-range for the coupled operation with the flash device. If Avf>Avd, which means that the light value is insufficient for photographing due to the decreased aperture value i.e., the aperture value is slightly smaller than the desired value, the program flow goes to the step #133 to calculate an intermediate aperture value Av by the following equation $$(Avf+Avd)/2=\overline{Av} \ldots \quad (28).$$

Also the warning lamp RA is lit to indicate that the aperture value Avf is out-of-the-flash-available range for photographing with the flash device coupled.

Subsequently, whether $\overline{Av}$ is smaller than Avo is determined in the step #135. If $\overline{Av}$≦Avo, the value Avo is used for the aperture value control data Avf, however, if Avd≧Avo, the value Av is used as Avf and the program flow goes to the step #138, wherein $$Iv_{max}+Sv-Avf=Dv_{max} \ldots \quad (29\text{-}1)$$

is calculated. And in the step #139, $$Iv_{min}+Sv-Avf=Dv_{min} \ldots \quad (29\text{-}1)$$

is calculated.

The value $Dv_{max}$ shows the maximum flash available distance for the aperture value Avf and the $Dv_{min}$ shows the minimum flash available distance. These data $Dv_{max}$ and $Dv_{min}$ are transferred to the flash device FL through the flash control device FC so as to display the TTL mode operation which means that the light emission of the flash device is controlled on the basis of the light measurement value of the light sensing element PD1 in the camera as hereinafter described. The value $Iv_{min}$ shows the minimum amount of light of the flash device. The value $Iv_{min}$ may be read from a memory.

In the step #140, the number of steps of decreasing aperture size Avf is calculated by the equation $$Avf-Avo=\Delta Avf \ldots \quad (30).$$

In the step #141, an exposure difference value ΔEv is calculated by the following equation $$(Ev+1)-(Avf+Tvf)=\Delta Ev \ldots \quad (31).$$

The exposure difference value ΔEv thus calculated is displayed by the display device DP1 shown in FIG. 4. The value ΔEv shows the difference between the actual exposure value of the sub object and the desired exposure value thereof.

In the step #142, whether the value Δev≧0 is determined. If ΔEv≧0 i.e., Ev≧10 in case of FIG. 8, since the fill-in flash mode is set, the output terminal O11 is made "High" and the program flow goes to the step #145. If ΔEv<0 is judged in the step #142, which shows the main flash light mode, the output O11 is made "Low" and the program flow goes to the step #145.

In the step #145, whether the actual photographing distance Dv of the interchangeable lens LE coincides with the maximum photographing distance $Dv_\infty$ of the lens is determined, wherein the maximum photographing distance $Dv_\infty$ means the distance shorter than the infinitive position of the lens by a unit scale. The maximum photographing distance is different from lens to lens, so that the maximum photographing distance data is provided from the lens in use to the camera as fixed data.

If $Dv \geq Dv_\infty$ is determined in the step #145, there is a great possibility of an underexposure even if the flash light is used, since the photographing distance is set around infinity the flash device is useless so that the program flow goes to the step #146 to light the display lamp FIP to warn of the above matter, whereby the program flow goes to the step #37. If $Dv<Dv_\infty$, the program flow goes to the step #37 directly.

In the operations described above, the overexposure warning, underexposure warning, out-of-the range-of-the-flash available operation warning and infinity distance warning is made by making the output terminals O1 through O4 "High", respectively. When such warning is not necessary, the output terminals are made "Low".

The device shown in FIG. 4 is explained with reference to the flow chart shown in FIG. 7.

In the step #38, whether a charge completion signal is applied to the CPU 1 from the flash device FL is determined. The charge completion signal is generated when the main capacitor provided in the flash device FL is charged with the predetermined voltage sufficient to ignite the flash device. If the charge completion signal is present, the display device DP1 indicate the exposure time control data Tvf, aperture control data Avf and the exposure difference data ΔEv and the fact that the camera system is set in the flash light mode.

Subsequently, the output terminal O10 is made "High", and the distance data $Dv_{max}$ and $Dv_{min}$ determined in the steps #138 and 139 are transferred to the flash device FL from the flash control device FC, and the CPU 1 waits for the "Low" signal at the input terminal I5. When the transfer of the data is completed, the input terminal I5 is made "Low" so that the program flow goes to the step #42 causing the output terminal O10 to be "Low", thereby going to the step #44. If the charge completion signal is absent, the program flow goes to the step #43 to display that the camera system is set in the ambient light mode and the exposure control mode, exposure time control data Tvc, aperture control data Avc and the exposure difference ΔEv are indicated by the display device DP1. Then the program flow goes to the step #44 to enable the interrupt operation for the exposure control operation.

The program flow returns to the step #1 to determine whether the input terminal ST is "High" due to closure of the light measurement switch MS. If the terminal ST is "High" the program flow goes to the step #7. On the other hand, if the terminal ST is "Low", the program flow goes to the step #2 to determine whether the input terminal I2 is "Low". In a case where the exposure operation is ready and the film is not advanced, therefor the shutter is not in the charged position, the switch CS is set in a open state whereby the input terminal I2 is "Low", the program flow goes to the step #4 wherein a signal BLANK for disabling the display device DP1 is output and in the step #5, the interrupt operation is disabled stopping the CPU 1.

However, when the film is already advanced and the shutter is already charged, the switch CS is closed to make the input terminal I2 "High", so that the program flow goes to the step #3, wherein whether the content of the timer register TR is a predetermined value K is determined. The value K is for example 15 seconds. If the content of the timer register TR is larger than the value K, the program flow goes to the step #4, but if the content of the timer register TR is smaller than the value K, 1 is added to the content of the timer register TR, then the program flow goes to the step #8 to repeat the operation described above.

BY the arrangement described above, while the light measurement switch MS is closed, read-in operation, calculation and display are continued. The same operation is continued until the content of the timer register TR reaches the value K when the light measurement switch MS is open with the film advanced and the shutter set in the charged position. When the light measurement switch MS is open and the predetermined time interval has passed, the read-in operation, calculation and the display are stopped.

When the light measurement switch MS is closed and the first calculation operation is completed, the CPU 1 is enabled to receive the interruption signal at the input terminal IT. When the release switch RS is closed in such state that the film is advanced and the shutter is set in the charged position, the output of the AND gate AN1 is "High" to apply the interruption signal to the input terminal IT, whereby the program flow goes to the step #50 to effect the exposure control. In the step #50, the signal BLANK is output to disable the display device DP1. Then the program flow goes to the step #51 to make the output terminal O6 "High" to prevent the read-in operation of the data of the lens LE in the CPU 1 from the interface IF during the read-in operation of the data in the interface IF from the lens circuit LEC. If the interruption signal is applied to the CPU 1 during the read-in operation of the data of the flash device FL to the CPU 1, the CPU 1 refuses the interruption operation until the input terminal i4 changes to "Low" from "High". When the input terminal i4 becomes "Low", the output terminal O9 is made "Low" and then the program flow goes to the step #54.

In the step #54, in a case where the data is transferred to the flash device FL from the flash control circuit FC, when the interruption signal is applied to the CPU 1, the CPU 1 waits until the input terminal i5 changes to "Low" from "High". When the input terminal i5 becomes "Low", the program flow goes to the step #55 to make the output terminal O10 "Low". Then the program flow goes to the step #56 to make the output terminal O8 "High" and the CPU 1 determines whether the charge completion signal is applied to the flash control device FC from the flash device FL. If the charge completion signal is detected by the change of the state of the input terminal i6 to "Low", the program flow goes to the step #58 causing the output terminal O8 to be "Low", and in turn whether the input terminal i7 is "High" is determined in the step #59. The input terminal i7 is "Low" or "High" depending on the absence or presence of the charge completion signal.

When the "High" on the terminal i7 is detected, the step number of the aperture decreasing value Avf calculated in the steps #30 and 36 is output from the output port OP2 to the aperture control device CA in the step #60. Then the exposure time control data Tvf is output from the output port OP1 to the exposure time control device CT in the step #61.

However, if the charge completion signal is absent, and therefore "Low" on the terminal i7 is detected in the step #59, the program flow goes to the steps #62 and 63 to derive the step number of the decreasing aperture value ΔAvc for photographing under the stationary light and the exposure time control data Tvc.

As described above, according to the preferred embodiment of the present invention, whether the charge completion signal is present is determined immediately before the shutter SHT begins releasing, the control data for the flash light photographing or the data for the ambient light photographing are selectively output depending on the presence or absence of the charge completion signal.

Subsequently, the terminal O5 is made "High" in the step #64 to start the release circuit RL and a "Low" signal is fed to the base of the transistor BT1 through the inverter IN3 to continue the conductive state of the transistor BT1 even if the light measurement switch MS is open. By the operation of the release circuit RL the exposure control device 3 in FIG. 4 starts, whereby an aperture size control ring is rotated, so that a pulse train is generated from the pulse generator PG, the number of pulses being proportional to the amount of the rotation of the aperture size control ring. The aperture control device CA counts the number of the pulses, whereby the aperture size control ring is rotated until the counted number of pulses coincides with the diaphragm aperture size decreasing value ΔAvc or ΔAvf for controlling the actual aperture value.

In a case where the single lens reflex camera is used, a reflection mirror RM is raised as shown in FIG. 7. When the reflection mirror RM is moved to the raised position, and the setting of the diaphragm aperture is completed, the shutter starts running and the expsure time control device CT begins counting the exposure time on the basis of the data fed from the terminal OP1 of the CPU 1.

In a case where the camera system is set in the flash light photographing mode, at the time when the shutter SHT is completely opened, a flash light start signal is applied to the terminal JF3 of the flash device FL from the terminal JB7 of the flash control device FC to effect the light emission of the flash device. If the flash device is set in the TTL mode, when the integration value of the light value on the film plane measured by a light measuring circuit reaches the predetermined value, a flash stop signal is applied to the terminal JF1 of the flash device FL from the terminal JB5 to stop the flash device FL. When the time counted by the exposure time control device CT reaches the exposure time control data fed from the output terminal OP1 of the CPU 1, the rear curtain of the shutter SHT starts, regardless of whether the flash light photographing mode or ambient light photographing mode is set in the camera. Upon completion of the running of the rear curtain of the shutter SHT, the switch CS is opened, and the reflection mirror MR is dropped with the diaphragm aperture set at the open aperture value.

After the exposure control as described above, the output of the inverter IN5 becomes "Low" with the input terminal i3 of the CPU 1 "High" causing the output terminal O5 to be "Low" in the step #66 so that the release circuit RL is stopped and the transistor BT1 becomes nonconductive.

In the step #67, the interruption signal at the terminal IT is disabled and the program flow returns to the START. In this case if the light measurement switch MS is in the closed position, data read-in, calculation and the display operations are performed again.

If the switch CS is opened, the output of the AND gate AN1 is "Low" so as to prevent the application of the interruption signal to the interruption terminal IT of the CPU 1, thereby preventing the exposure operation even if the release switch RS is closed. In this case data read-in, calculation, and display operations are possible.

Figure 15:
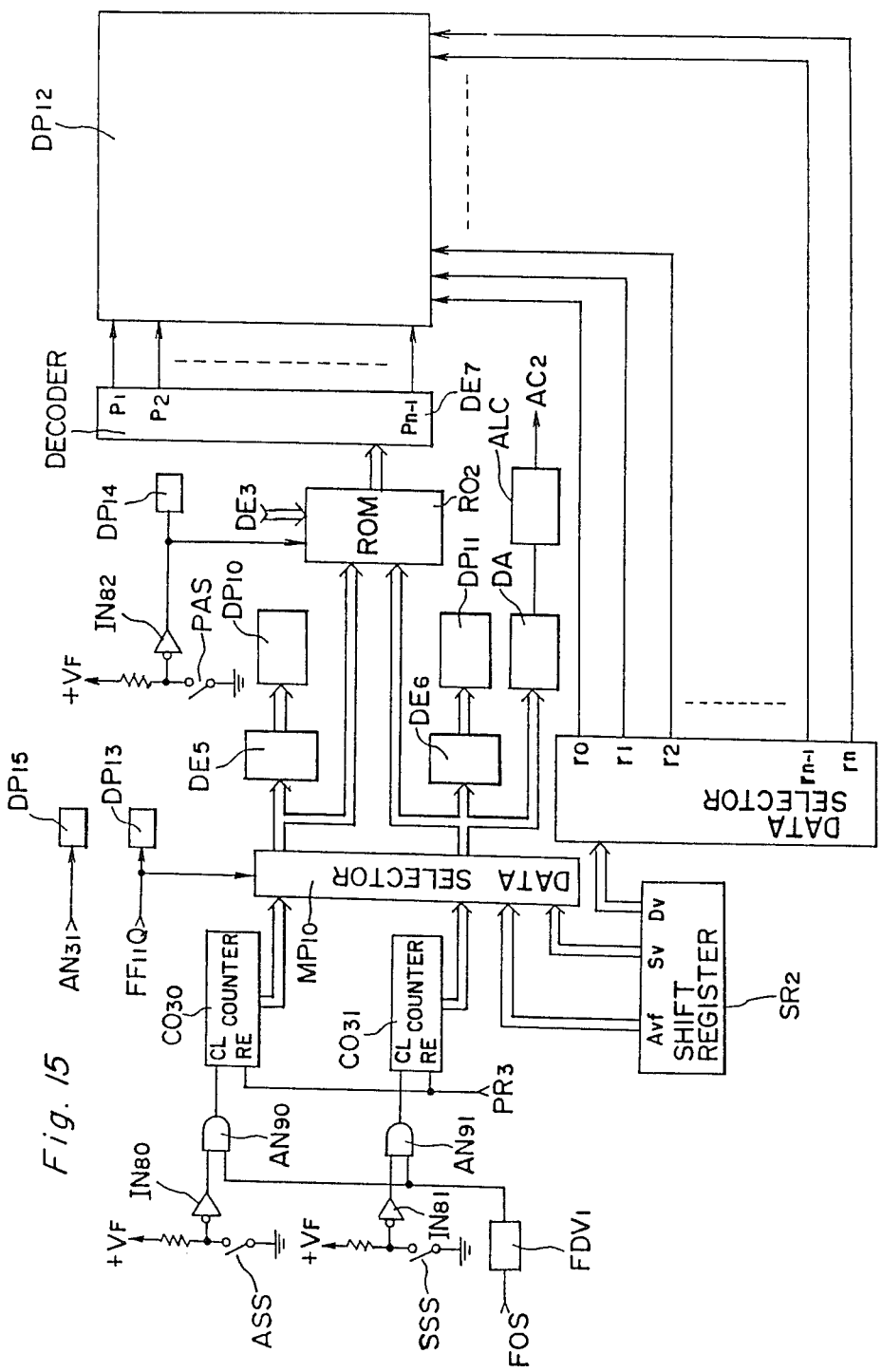
FIG. 15 is a block diagram showing one example of a display used in the embodiment of FIG. 4.
Figure 17A:
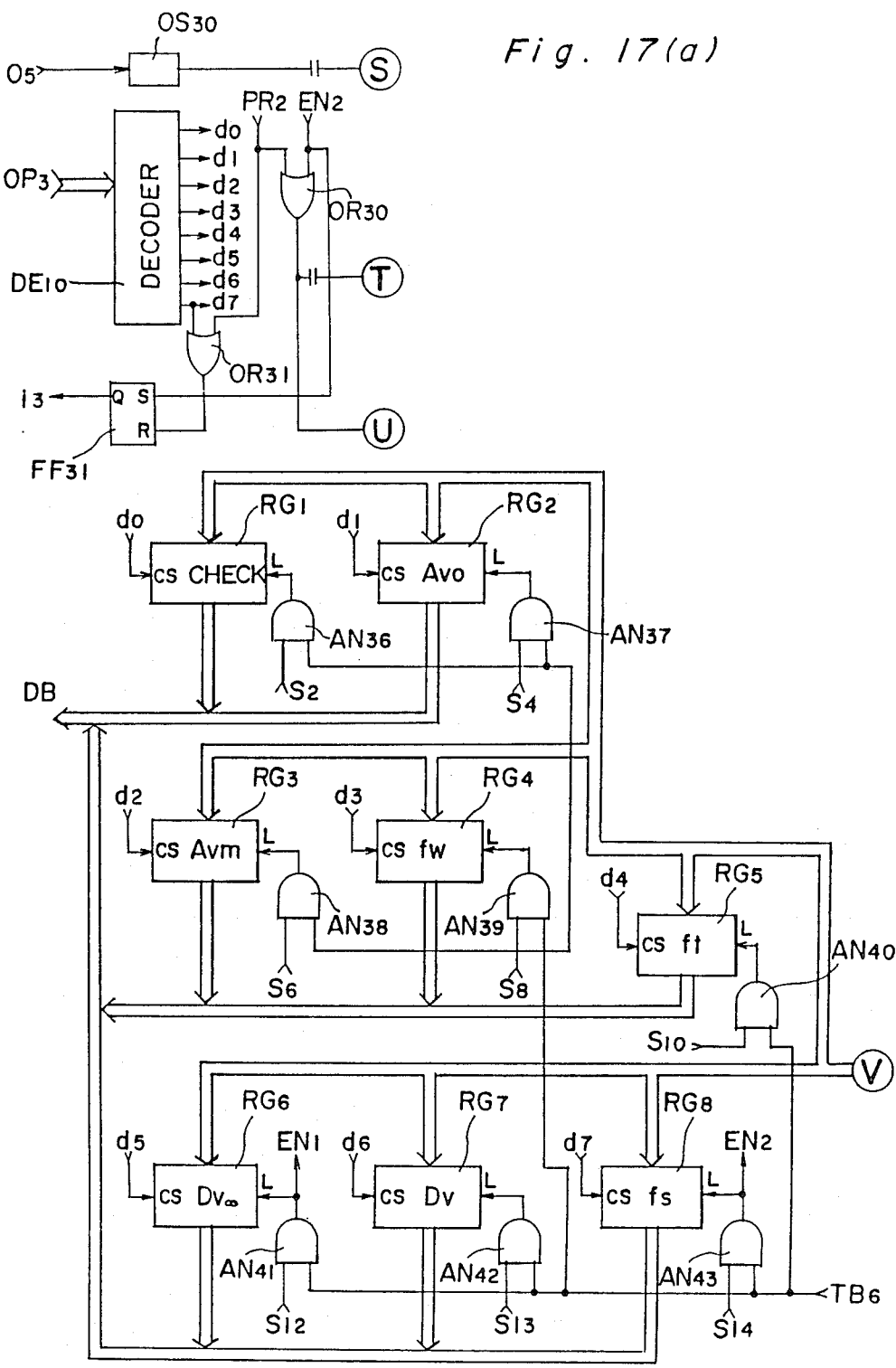
Figure 17B:
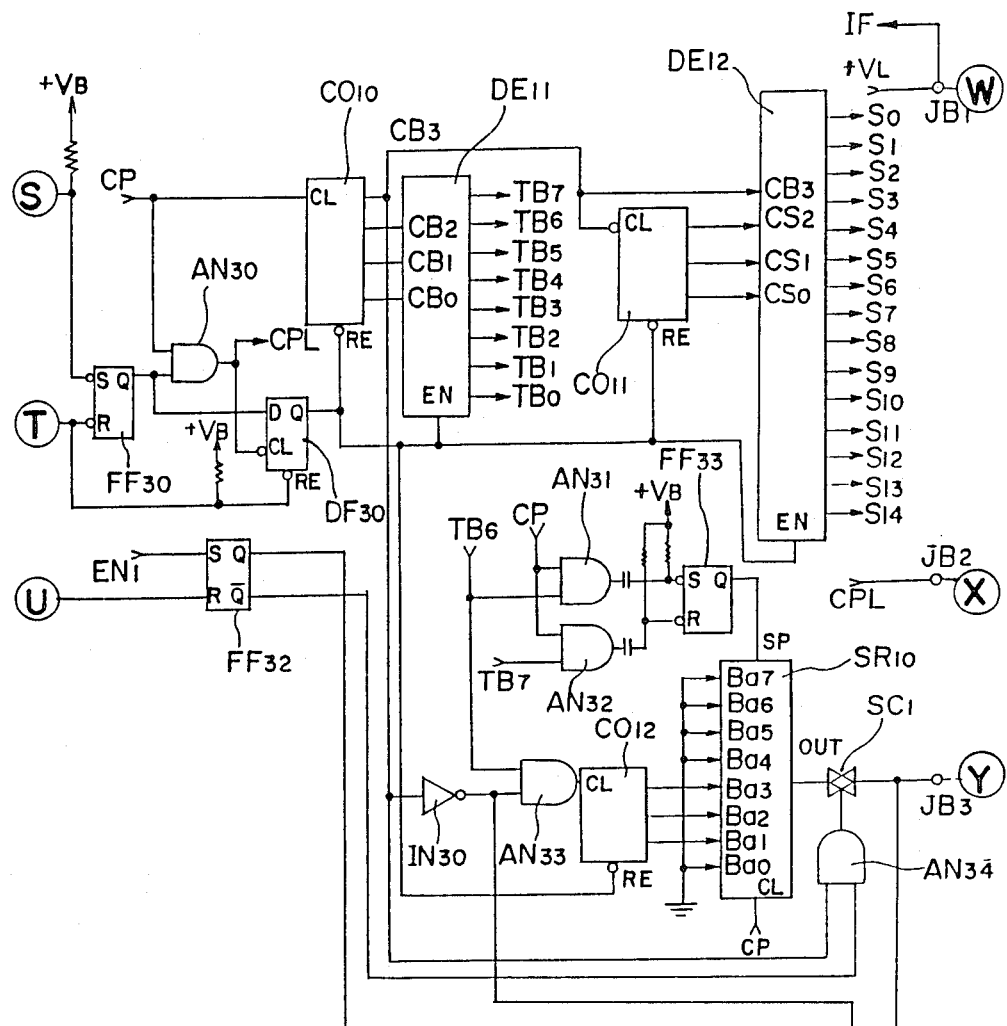
Figure 17C:
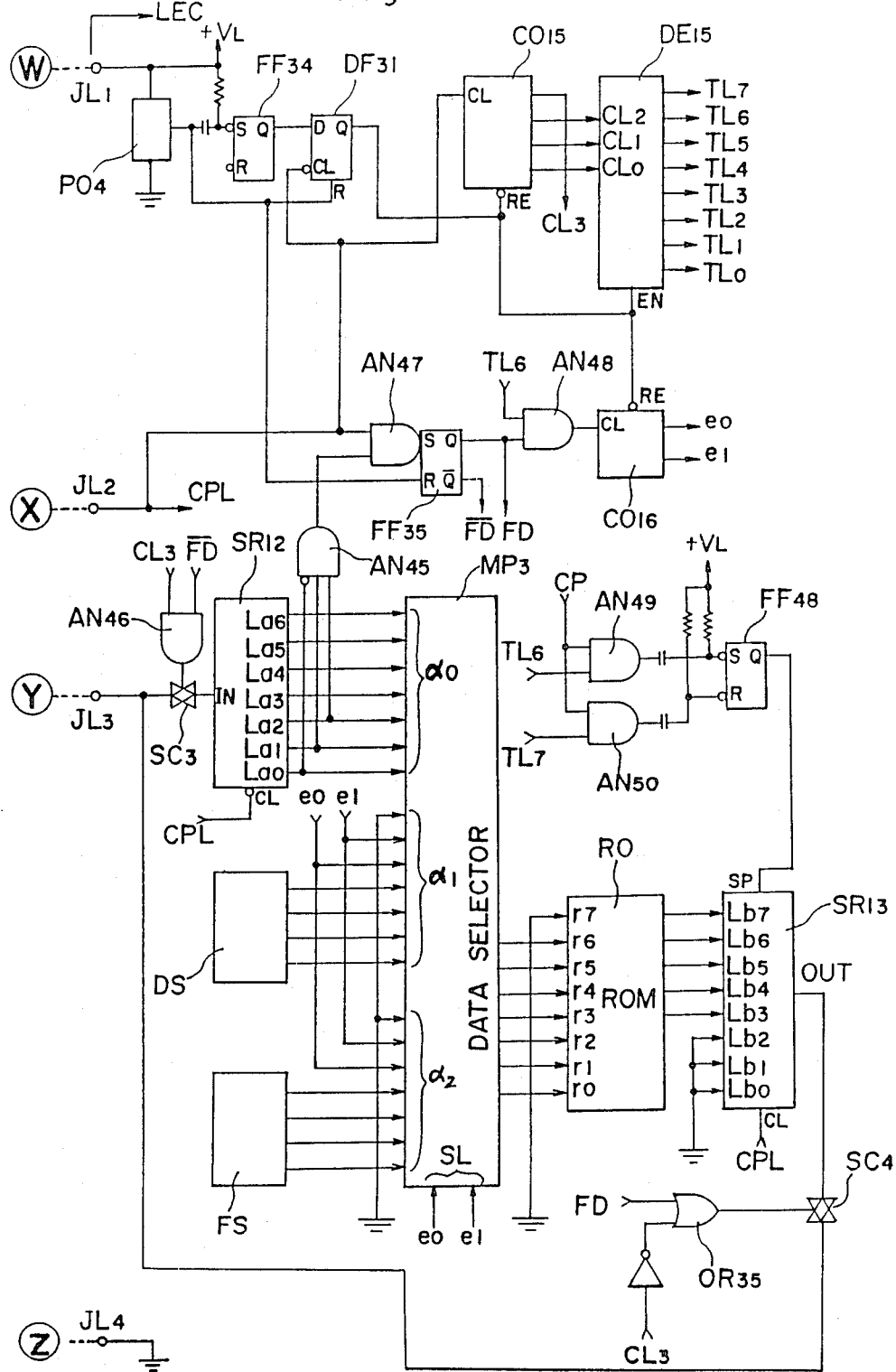

The detailed circuit arrangements of the flash control device FC and the flash device FL are shown in FIG. 17. Referring to FIG. 15, upon closure of the main switch MAS, the DC power is supplied to the flash device FL from the battery FB and the power ON reset signal PRO3 is output from the terminal PR3 of the power ON reset circuit PO3 to reset the flash device FL.

When the change over switch SS1 is switched to the CU contact, the flash device FL is set in the first flash light photographing mode. In this condition, the output of an inverter IN14 is "Low" and the output of an inverter IN15 is "High", so that the output of an OR gate OR18 is "High", thereby a transistor BT8 conducts to effect the boosting operation of the booster DD.

However, when the change-over switch SS1 is switched to the EX contact, the flash device FL is set in the second flash light photographing mode. The output of an inverter IN15 becomes "Low" and the output of the OR gate OR14 becomes "High" by the power ON reset signal PR3. The output of the OR gate OR14 resets a flip-flop circuit FF11, thereby causing the output of an OR gate OR18 to be "Low". Under this condition, the booster DD is not enabled even if the main switch MAS is closed. In order to enable the booster DD under the flash light photographing mode, the following procedure is taken. By closure of the light measurement switch MS in the camera, the transistor BT1 conducts to allow the DC power supply to the power ON reset circuit PO2 from the battery BB provided in the camera. Thus, the power ON reset circuit PO2 supplies the power ON reset signal PR2 to the flash control circuit FC to reset the latter (FIG. 4). With reference to FIG. 13 and reference to FIG. 14, upon closure of the light measurement switch MS, the output of the inverter IN2 becomes "High", thereby causing a one shot circuit OS1 to produce a "High" pulse. The output pulse of the one shot circuit OS1 is supplied to the set input terminal of the flip-flop circuit FF11 through the OR gate OR6 and the terminals JB5 and JF1. The flip-flop FF11 is set by the pulse and an OR gate OR18 produces a "High" signal, which is fed to the base of the transistor BT8 which is then conductive, whereby the booster DD is enabled. Also, the "High" pulse input from the terminal JF1 is applied to the input terminal of the timer TI1 to start counting time, which generates an output when a predetermined time period, for example 0.5 seconds has passed after reception of the "High" pulse. The output signal of the timer TI1 is applied to the reset input terminal of the flip-flop FF11 to make the Q output of the flip-flop FF11 and the output of an OR gate OR18 "Low", thereby causing the transistor BT8 to be nonconductive. Then the booster DD is disabled to save the DC power. The timer TI1 may be reset and start the time counting each time when the "High" pulse is applied to the timer from the terminal JF1, Also the timer TI1 may be reset when a sufficient time such as 10 minutes has passed after the "high" pulse is applied to the timer from the terminal JF1.

When the flip-flop FF11 is set, a flip-flop FF10 and a D type flip flop DF10 are in the reset state, therefore the output terminal of a NOR gate NO1 is "High". Also as hereinafter described, the output of a NAND gate NA1 is "High" such that the output of an AND gate AN22 and an OR gate OR21 are "High". In such states, if the flash device FL is set in the second flash light photographing mode with the switch SS1 changed to the EX contact, both input terminals of an AND gate AN24 receive "High" signals, thus an OR gate OR22 outputs a "High" signal to the base of the transistor BT6 causing the transistor BT6 to be conductive. Also a transistor BT7 is then made conductive to produce a "High" signal which is supplied to the flash control circuit FC through the terminals JF2 and JB6.

With reference to FIG. 13, in a state that the light measurement switch MS is closed, when the output terminal 09 of the CPU becomes "High", a one shot circuit OS2 generates a pulse. Then a flip-flop FF1 is set by the positive edge of the pulse and the counter CO1 is also reset. A D type flip flop DF1 acts to generate a series of pulses in response to application of the positive edge of each of pulses DP fed from a frequency divider DV provided in the flash control circuit FC. The pulse DP has a period shorter than the time interval set in the timer TI1. A pulse is applied to the terminal JF1 of the flash device FL from an AND gate AN2 through an OR gate OR6 and the terminal JB5 of the flash control circuit FC every time the Q output of the flip-flop DF1 becomes "High". The output pulses of the AND gate AN2 are applied to the counter CO1. A one shot circuit OS3 generates a pulse every time the Q output of the flip-flop DF1 becomes "High", and an inverter IN7 reverses the output of the flip-flop DF1, then in turn a NAND gate NA5 applies a series of "High" pulses to the base of a transistor BT10 in response to the "Low" signals of the inverter IN7, whereby the transistor BT 10 is made conductive corresponding to the period of time during which each of the pulses of a NAND gate NA5 becomes "High. The terminals JB6 JF2 are made "Low" when the transistor BT10 is in the conductive state.

With further reference to FIG. 14, upon application of the "Low" signals to the terminal JF2 from the transistor BT10 in the flash light photographing mode, the "Low" signals are applied to an inverter IN20 and an AND gate AN25 generates a pulse train supplied from the inverter IN20. The output FR of the AND gate AN25 and the pulses DP on the terminal JF1 are applied to the input terminals of an AND gate AN10 to reset the flip-flop FF10 resulting in generation of a "High" signal on the Q output of the flip-flop FF10. The Q output of the flip-flop FF10 is applied to a NOR gate NO1 which generates a "Low" signal to an AND gate AN22 to make the output of the AND gate AN22 "Low".

The output of the flip-flop FF10 is applied to one input terminal of an AND gate AN11. Thus, the AND gate AN11 gates the signals applied from an OR gate OR12 to the base of the transistor BT6 through OR gates OR13, OR21, an AND gate AN24 and the OR gate OR22, whereby the transistors BT6 and BT7 are made conductive to produce "Low" signals. By the operation described above, the output data of the OR gate OR 12 is transferred to the terminal JB6 through JF2.

A counter CO3 for counting the number of pulses applied to the terminal JF1 is adapted to be reset by the output FR of the AND gate AN25. A decoder DE2 provides the output data shown in Table 3 on the output terminals b0 through b8 corresponding to the data applied to the input terminals CF0 through CF3. The output terminal b0 of the decoder DE2 is made "High" during a time interval between two falling points of the first pulse and the second pulse on the terminal JF1. The "High" signal on the output terminal b0 is applied to the one input terminal of an AND gate AN70, another input terminal of which receives the charge completion signal CD. The AND gate AN70 gates the charge completion signal CD upon receipt of the signal on the terminal b0, in other words, the charge completion signal can be transferred to the terminal JF2 when the terminal b0 is "High". The charge completion signal CD on the terminal JF2 is transferred to the serial input terminal SI of a shift register SR1 through the terminal JB6 of the flash control circuit FC and an AND gate AN3 (FIG. 13). The shift register SR1 takes the data fed from the AND gate AN3 when the second pulse is applied to the terminal CL from the AND gate AN2.

With continuing reference to FIG. 14, the terminal b1 of the decoder DE2 is made "High" during a time interval between two falling points of the second pulse and the third pulse on the terminal JF1. The output of the terminal b1 is applied to one input terminal of an AND gate AN71 another input terminal of which receives a signal from IN13 representing which of the TTL mode or the external light mode is selected. When the TTL mode is selected a switch MOS is switched to the TT contact so that an inverter IN 13 generates a "High" output, on the other hand, when the external light mode is selected, the switch MOS is switched to the OU contact so that the inverter IN13 generates a "Low" signal. The output of the inverter IN13 is transferred to the shift register SR1 through the terminals JF2 and JB6 and stored therein in a similar manner as described above.

A decoder DE3 is adapted to receive the output data of a first data output device GS and the data of a second data output device PS to provide one of the maximum light emission value Ivmax of the flash device FL at the terminals G0 through G3, the contents of which are shown in the Table 4. The output of the decoder DE3 can be also transferred to the shift register SR1 through AND gates AN72 through AN75 which receive the output signals on the terminals b2 through b5.

The first data output device GS is coupled with an adjusting member for adjusting a light distribution characteristic by changing a positional relationship relative to a light reflection plane for the flash light and generates various data. The second data output device PS generates data representing the kind of the reflection panel used in the flash device for emitting the flash light. In the preferred embodiment, either the wide angle reflection panel or the normal reflection panel is alternatively used. The decoder DE3 provides the maximum light emission value Ivmax shown in the Table 4 on the basis of the output data of the first output data output device GS and the second data output device PS.

A decoder DE4 provides the aperture values set in the flash device FL by the data input from an aperture value data output device APS which is coupled and moved with an adjusting member for adjusting the aperture AP disposed in front of the photo transistor PT used in the flash device FL so as to adjust the incident light value. The contents of the decoder DE4 are shown in the Table 5.

The output terminals F0, F1 and F2 of the decoder DE4 can be transferred to the shift register SR1 through AND gates AN76 through AN78 which are enabled by the output signals of the terminals b6 through b8 of the decoder DE2.

When the tenth pulse applied to the counter C03 falls, the terminal b8 of the decoder DE2 becomes "Low" to reset the flip-flop FF10 through an OR gate OR11 to cause the Q output of the flip-flop FF10 to be "Low", thereby causing the output of the AND gate AN11 to be "Low" with the output of the NOR gate NO1 being "High", resulting in making the terminal JF2 of the flash device FL "High".

Upon application of the tenth pulse DP to the decimal counter CO1 (FIG. 13), a carry signal is generated at the carry terminal CY. The carry signal is fed to the reset terminal R of the flip-flop FF1 and the reset terminal RE of the D-type flip-flop DF1, then flip-flops FF1 and DF1 are reset so that both the Q output terminals become "Low". Both of the AND gates AN2 and AN3 are disabled by the "Low" signal of the D-type flip-flop, then the read-in operation of the data $Iv_{max}$ and the set aperture value Av into the shift register SR1 is stopped.

When the input terminal i4 of the CPU 1 becomes "Low" by the Q output of the flip-flop FF1, the CPU 1 determines that the read-in operation of the data from the flash device FL to the flash control circuit FC is completed (FIG. 4). Also the data in the shift register SR1 is transferred to the input terminal IP7 of the data selector MP1 and in turn the data is transferred to the CPU 1 in the order designated by the signals applied to the terminal SL of the data selector MP1 from the CPU 1.

In the preferred embodiment, vthe shift register SR1 is 9 bits, so that the data in the shift register SR1 can be read out separated in two or three groups if the number of bits of the CPU is small.

In a case where the flash device FL is not attached to the camera or the flash device is attached to the camera but the power switch MAS is OFF, the contents of the shift register SR1 are zero. Thus by determining the contents of the shift register SR1, whether or not the flash device is attached to the camera and the power switch MAS is OFF can be detected by the CPU 1.

In a case where the flash device FL is set in the first flash light photographing mode with the switch SS1 changed to the CU contact, the output of an inverter IN14 is "Low", so that the AND gate AN24 is disabled to prohibit transfer of the maximum light emission data $Iv_{max}$ and the set aperture value Av from decoder DE4 to the shift register SR1 through the terminals JF2 and JB6. As the switch SS1 is in the CU position the output of an inverter IN15 is "High", then the "High" signal is applied to one input terminal of the AND gate AN20. If the charge completion signal CD is "High", the output of the AND gate AN20 is "High". On the other hand, if the X contact of the flash device is opened, the output of an AND gate AN26 is "Low" with the output of an inverter IN16 "High". Accordingly, the output of an AND gate AN23 is "High". The output of the AND gate AN23 is applied to the base of the transistor BT6, whereby the transistors BT6 and BT7 conduct. By this operation only the charge completion signal is applied to the flash control circuit FC through the terminals JF2 and JB6 and stored in the shift register SR1 in the first flash light photographing mode.

As shown in the Tables 4 and 5, the data is so arranged that all of the data which is read in the shift register SR1 is not "High", therefore it is possible to determine that the mode set in the flash device is the first flash light photographing mode.

A method of judgement of the mode set in the flash device FL by the CPU 1 is explained hereinafter.

Whether the first flash light mode is ordered is determined, whereby, if the mode ordered is not the first mode, the program flow goes to the step #101 in FIG. 11. However, if the ordered mode is the first mode, the exposure time is set to 1/250 sec and the aperture value is set by the data set in the flash device, then the program flow goes to the step #140.

The following description is made to explain a way of transferring the flash available range data from the camera to the flash device.

Referring to FIG. 13, when the terminal O10 of the CPU 1 becomes "High", the "High" signal is applied to a one shot circuit OS4, which supplies a pulse having a predetermined width to the set terminal of a flip-flop FF2 and the reset terminal RE of the counter CO2. Then the Q output of the flip-flop FF2 is "High". This "High" signal is fed to the input terminals of AND gates AN52 and AN4. The contents of the counter CO2 is zero. The output of the one shot circuit OS4 is inverted by an inverter IN8 and the transistor BT10 is made conductive, whereby a "Low" signal is applied to the terminal JF2 of the flash device FL (shown in FIG. 14) from the terminal JB6 of the flash control device FC and the output of the AND gate AN25 is "High". As the input terminal JF1 is "Low", the inverter IN11 produce a "High" signal to the input terminal of an AND gate AN15. Another input terminal of the AND gate AN15 receives a "high" signal from the output FR of the AND gate AN25. By the output of the AND gate AN15, a pulse is applied to the set terminal of a flip-flop FF13 so that the flip-flop FF13 is set, causing the Q output to be "High". This "High" output is applied to the input terminal of the D-type flip-flop DF10. The Q output of the flip-flop DF10 becomes "High" upon receipt of a pulse at the terminal CL from oscillator FOS. The "High" signal at the Q output of the flip-flop DF10 is applied to AND gates AN16 and AN17. The AND gate AN16 gates the pulse train FCP fed from the oscillator FOS to both clock input terminals CL of a counter CO4 and a shift register SR2. Also the clock pulse train FCP is applied to the base of the transistor BT6 through the OR gates OR13, OR21, OR22, and the AND gate AN24 so as to drive the transistor BT7, which feeds the pulse train to the clock input terminal CL of the counter CO2 through the terminals JF2, JB4, and the AND gate AN4 (FIG. 13).

A one shot circuit OS11 generates a "High" pulse signal by the output of the D-type flip-flop DF10 to reset the shift register SR2 through an OR gate OR17 and the counter CO4 is reset by the "High" signal applied through an OR gate OR16.

With respect to FIG. 13, the output of the counter CO2 which is the result of the counting of the clock pulse train FCP is input in the decoder DE1 which generates a "High" signal on any one of the output terminals ao through an in the order corresponding to the counted value of the counter CO2.

When the first pulse of the pulse train FCP is input in the counter CO2 from the AND gate AN4, the output of the decoder DE1 becomes "High" by the positive-going edge of the first pulse. The "High" state is continued until the positive-going edge of the second pulse of the pulse train FCP. An AND gate AN60 is opened by the output of the decoder DE1 to gate the most significant bit of the maximum flash available distance data $Dv_{max}$ to the terminal JB5 through the OR gates OR3 and OR6 and the AND gate AN52. This data on the terminal JB5 is applied to the serial input terminal SI of a shift register SR2 through terminal JF1 the AND gate AN17 (FIG. 14). The shift register SR2 takes the most significant bit of the data $Dv_{max}$ therein synchronized with the negative-going edge of the first pulse of the pulse train FCP. In a similar manner as described above, the output terminal (an) of the decoder DE1 becomes "high" with the positive edge of the (n+1)th pulse of the pulse train FCP keeping the high state until the positive edge of the (n+2)th pulse. During this period, the least significant bit of the minimum flash available distance data $Dv_{min}$ is output from an AND gate AN6n and this information is taken in the shift register SR2 synchronized with the negative-going edge of the (n+1)th pulse.

Since the counter CO4 is a (n+2) number system, the (n+2)th pulse of the pulse train FCP is output from the carry terminal CY and in turn the carry output is applied to the reset terminals CL of the flip-flop FF13 and the D-type flip-flop DF10 which are reset respectively, causing the AND gates AN16 and AN17 to be disabled. The shift register SR2 takes a "High" or "Low" signal in synchronism with the negative-going edge of the pulse FCP. However, the least significant bit of the shift register SR2 is not applied to the display device DP2.

On the other hand, the counter CO2 in the camera is a (n+2) number system and all of the output of the counter CO2 becomes "Low" with the positive-going edge of the (n+2)th pulse of the pulse train FCP, whereby all of the outputs (a0) through (an) of the decoder DE1 become "Low". The flip-flop FF2 is reset when the terminal (an) goes "Low" by the positive-going edge of the (n+2)th pulse, then the AND gates AN4 and AN52 are disabled. Since the Q output of the flip-flop FF2 is connected with the input terminal i5 of the CPU 1, so that the CPU 1 detects that the data transfer is completed by the "Low" signal on the terminal i5.

In the flash device FL of FIG. 14, the display device DP2 displays the flash available range of the flash device by the data $Dv_{max}$ and $Dv_{min}$ fed from the camera. A switch DS is provided for switching the unit contents of the display. Display device DP2 displays the flash available range distance data in terms of the metric system with the switch DS switched to the (m) contact and displays the distance data in terms of the foot-pound system with the switch DS switched to the (ft) contact. The flash available range distance data can be displayed by a display device DP5 (FIG. 13). The display device DP2 is provided on the back side of the flash device and the display device DP5 can be provided in a finder, top face or the back lid of the camera.

With reference to FIG. 13, a timer circuit TI5 generates an output after a sufficient time has passed for transferring the data $Dv_{max}$ and $Dv_{min}$ to the flash device FL from the period of generation of the output of the one shot circuit OS4. Thus, the timer circuit TI5 resets the flip-flop FF2 through the OR gate OR2 after the period for transferring the data has lapsed.

Detecting the charge completion signal is explained hereinafter.

Referring to FIG. 13, the terminal O8 of the CPU 1 becomes "High" upon closure of the release switch RS. The "High" signal is applied to a one shot circuit OS6, which generates a "High" pulse of a predetermined width. A flip-flop FF3 is set by the output of the one shot circuit OS6 to generate a "High" signal at the Q output terminal. The output of the flip-flop FF3 is applied to the D input terminal of a D-type flip-flop DF2 so that the Q output terminal of the flip-flop DF2 becomes "High" upon application of the clock pulse DP to the clock terminal CL of the flip-flop DF2 from the frequency divider DV. The Q output is applied to one input terminal of an AND gate AN6 which receives the clock pulse DP from the frequency divider DV at another input terminal, whereby the AND gate AN6 gates the clock pulse DP to the terminal JF1 of the flash device FL through the OR gate OR6 and the terminal JB5 of the flash control device FC.

The "High" signal at the Q output of the flip-flop DF2 is applied to another one shot circuit OS10, which generates a pulse of predetermined width to an inverter IN9. The NAND gate NA5 generates a pulse of "High" level the width of which corresponds to that of the output of the one shot circuit OS10. The output pulse of the NAND gate NA5 is applied to the base of the transistor BT10, which is conductive during the period of the pulse of the NAND gate NA5. Accordingly, a pulse of "Low" level is input to the terminal JF2 of the flash device FL through the terminal JB6 of the flash control circuit FC. The "Low" level pulse on the terminal JF2 is inverted by the inverter IN20 and applied to the input terminal of the AND gate AN25, which generates a pulse output FR (FIG. 14).

The pulse DP is applied to the set terminal of the flip-flop FF10 to set it, so that the Q output thereof is "High". The "High" signal of the flip-flop FF10 is inverted by the NOR gate NO1, then applied to the input terminals of the AND gates AN11 and AN22.

The counter CO3 in the flash device FL counts one pulse DP and the content thereof becomes "0001", whereby the output terminal b0 of the decoder DE2 becomes "High". This "High" signal is applied to the input terminal of the AND gate AN70 which gates the charge completion signal CD to the terminal JF2. The charge completion signal on the terminal JF2 is transferred to the terminal JB6 of the flash control circuit FC as hereinbefore described.

When the Q output of the flip-flop DF2 (FIG. 13) becomes "High", the pulse DP from the frequency divider DV is applied to the reset input terminal R of the flip-flop FF3 and the reset terminal RE of the flip-flop DF2, then the flip-flops FF3 and DF2 are respectively reset by the negative-going edge of the pulse DP. Thus one pulse DP is transferred to the flash device FL from the flash control circuit FC.

After the "High" signal is input to the D-type flip-flop DF3 from the flip-flop DF2, the Q output of the flip-flop DF3 becomes "High" by the positive going edge of the pulse DP applied to the clock terminal CL of the flip-flop DF3. Also the Q output of the D-type flip-flop DF4 becomes "High" by the pulse DP. The "High" signal of the flip-flop DF3 is applied to the input terminal of an AND gate AN7, which gates the charge completion signal applied from the terminal JB6.

An AND gate AN51 produces a "High" signal upon receipt of the "High" signal from the Q output of a D-type flip-flop DF4. The output of AND gate AN7 is applied to the D input of D-type flip-flop DF5 and the AND gate AN51 is applied to the clock input terminal of a D-type flip-flop DF5, the Q output of which becomes "High" upon receipt of the pulse DP. The "High" signal of the flip-flop DF5 is applied to the input terminal i7 of the CPU 1.

The output signal of the AND gate AN51 is input to the reset terminals RE of the D-type flip-flops DF3 and DF4, then the Q output terminals of the both flip-flops DF3 and DF4 become "Low" respectively. The "Low" output of the flip-flop DF3 is applied to the input terminal i6 of the CPU 1 as the signal representing that read-in operation of the charge completion signal is completed.

In the flash device shown in FIG. 14, when the flip flop FF10 is set as described above, a timer TI8 starts time counting. The preset time of the timer TI8 is longer than the time required for transferring the charge completion signal from the flash device FL to the flash control circuit FC.

The timer TI8 generates a "High" signal when the preset time has lapsed and the "High" signal is applied to the reset input terminal of the counter CO3 through an OR gate OR10 and is applied to the reset terminal of the flip-flop FF10 through an OR gate OR11, whereby the counter CO3 and the flip-flop FF10 are simultaneously reset, so as to prevent the output 0001 of the counter from being held a long time.

In a case where the "High" signal on the terminal JF1 and the charge completion signal derived from detector CD are applied to the input terminals of an AND gate AN18, the AND gate AN18 gates the FR of the AND gate AN25 to the set input terminal of a flip-flop FF12 and a one shot circuit OS12. The flip-flop FF12 is set and the one shot circuit OS12 generates an output the width of which is longer than the time period of the pulse DP. By this arrangement, if a plurality of pulses DP must be transferred from the terminal JF1 in series, each one of the pulses DP can be transferred from the terminal JF1 within one period of the output pulse of the one shot circuit OS12.

In a case where only one pulse DP is transferred to the terminal JF1 after the release switch RS is closed, an AND gate AN19 does not generate an output so that the flip-flop FF12 is kept in the set state. Under such state if the switch SS1 is switched to the EX contact with the output of the inverter IN14 being "High", this "High" signal is applied to one input terminal of an AND gate AN26 through an OR gate OR20 and the AND gate AN21. Accordingly, when an order signal of the light emission is applied to the terminal JF3, the order signal is transferred to the flash light emission control device FLC through the AND gate AN26. Therefore, in the second mode and when the charge completion signal is present, the flash device FL is ready for light emission upon closure of the release switch RS.

When the X contact SX in the flash control device FC of FIG. 13 is closed, an inverter IN17 of FIG. 14 drives a one shot circuit OS13 which generates a "High" output pulse. The "High" output pulse is transferred to the light emission control circuit FLC through AND gates AN26 thereby causing a xenon tube XE to emit the flash light in a known manner. On the other hand, by the output of the one shot circuit OS13, a "Low" level pulse appears on the terminal JB6 through terminal JF2. An inverter IN10 (FIG. 13) generates a "High" signal which is applied to an AND gate AN8. If the shutter button has already been pressed, a "High" signal is generated from the output terminal O5 of the CPU 1, the "High" signal is applied to an AND gate AN8. Then the AND gate AN8 provides a "High" signal to a flip-flop FF5 to set it, thereby the Q output of the flip-flop FF5 becomes "High". The Q output of the flip-flop FF5 is applied to one input terminal of an AND gate AN9 and the base of a transistor BT4 which is then nonconductive.

A transistor BT3 receives a light value measured on the film plane by a light measurement circuit ME and produced from an operational amplifier OA1 (FIG. 4), whereby a current proportional to the light value of the flash light measured on the film plane follows through the collector of the transistor BT3. The collector current is integrated in a capacitor C1. A voltage across the capacitor C1 is applied to a comparator AC1 to which either a reference voltage CE20 or another reference voltage CE21 is applied through analog switches AS20 or AS21 controlled by the signal on the CP4 output terminal O11. The terminal O11 becomes "High" for the fill-in flash mode and "Low" for the flash light mode, i.e., the flash light is used as a main light source for photographing. Accordingly, in the fill-in flash mode, the analog switch AS20 is ON so that the reference voltage CE20 is applied to the comparator AC1. In the flash light mode, the analog switch AS21 is ON so that the reference voltage CE21 is applied to the comparator AC1. The ratio of the reference voltage CE20 and CE21 is 3:4, in other words, the reference voltage CE20 is lower by 0.5 Ev than the reference voltage EC21 in terms of the apex value. Furthermore, the reference voltage CE21 corresponds to the correct exposure.

When the voltage across the capacitor C1 reaches the reference voltage CE20 in case of the fill-in flash mode, the comparator AC1 generates a "High" output, so that a one shot circuit OS9 generates a "High" output. Under this condition if the signal indicating the TTL light measuring mode is stored in the shift register SR1, a pulse is transferred to the terminal JF1 through the AND gate AN9, OR gate OR6 and the terminal JB5 to stop the light emission of the flash device FL. In a similar manner described above, the flash device is stopped when the voltage across the capacitor C1 reaches the reference voltage EC21 in case of the flash light mode. As described above, in case of the fill-in flash mode, when the light exposure value measured on the film plane reaches the value smaller by 0.5 Ev than the correct exposure value, the light emission of the flash device FL is stopped, this operation corresponds to the case wherein the value k1 is set by 0.5 Ev as described with reference to FIGS. 1 and 2.

The output pulse of the AND gate AN8 is applied to the timer TI10. The timer TI10 generates a pulse when a sufficient time has passed after the flash device FL completes the light emission, so that the flip-flop FF5 is reset, thereby causing the transistor BT4 to be conductive resulting in disabling the AND gate AN9. Also the flip-flop DF5 is reset.

In the flash device FL, the AND gate AN26 produces a "High" pulse by the output of the one shot circuit OS13, whereby a flip-flop FF14 is set and the Q output thereof becomes "High". In a case where the switch MOS is switched to the OU contact i.e., the external light mode is set in the flash device, inverters IN18 and IN19 generate "High" outputs. Therefore, the output of a NAND gate NAZ is "Low", whereby a transistor BT5 is non-conductive and an AND gate AN28 is enabled.

By emitting the flash light from the xenon tube XE a photo transistor PT receives light reflected from the photographic object through the diaphragm aperture AP. The output current of the photo transistor PT is integrated in a capacitor C2. When the voltage across the capacitor C2 reaches a reference voltage VE2, which is variable and determined corresponding to the film sensitivity used in the camera, a comparator AC2 provides a "High" output to enable a one shot circuit OS14. The output pulse of the one shot circuit OS14 is transferred to the flash light control circuit FLC, whereby the xenon tube XE stops emission of the flash light.

In case of the TTL mode with the switch MOS switched to the TT contact, an inverter IN40 generates a "High" signal to enable an AND gate AN27, whereby the light emission stopping signal transferred to the terminal JF1 of the flash device FL from the one shot circuit OS9 is further transferred to the flash light control circuit FLC through the AND gate AN27 and an OR gate OR24.

When the order signal for emission of the flash light is applied to a timer TI2 from the AND gate AN26, the timer TI2 counts the period of time required for the full light emission of the xenon tube. When the time set in the timer TI2 has lapsed, the output of the timer TI2 is applied to the reset terminal of a flip-flop FF12 through the OR gate OR19 to reset it. The output of the timer TI2 is also applied to the reset terminal of a flip flop FF14 to reset it.

In a case where the first flash light photographing mode is selected with the switch SS1 switched to the CU contact, the output of the inverter IN15 is "High". If the charge completion signal is present, the AND gate AN20 and the OR gate OR20 generate "High" signals respectively, whereby the AND gate AN26 is enabled. In the state described above, with the X contact opened, an AND gate AN23 is enabled by the output of the inverter IN16 to gate the charge completion signal to the terminal JF2 through the OR gate OR22 and the transistors BT6 and BT7. The charge completion signal is read in the flash control circuit FC, then the first flash light photographing mode is detected.

Upon closure of the X contact SX, the AND gate AN26 generates a "High" signal by the output of the one shot circuit OS13 and in turn the output of the inverter IN16 is made "Low". The "Low" signal is transferred to the terminal JB6 of the flash control device FC through the terminal JF2 as the order signal of the flash light emission. In case of the TTL mode, the light emission stopping signal from the flash control circuit FC is transferred to the flash light control device FLC through the AND gate AN27 and the OR gate OR24. In case of the external light mode, the light emission stopping signal from the one shot circuit OS14 is applied to the flash light control device FLC through the OR gate OR24 to stop the emission of light by the xenon tube XE.

In order to display that the light control is completed by the output of the one shot circuits OS9 and OS14, there is provided a display device FDC1 in the flash control circuit FC and another display device FDC2 in the flash device FL. In the flash control device FC of FIG. 13, when the AND gate AN9 is enabled by the content of the shift register SR1 showing the TTL mode, and when the light emission stopping signal is generated, the display device FDC1 displays whether the light control performed in the camera system is correct for a predetermined period. On the other hand, in the flash device, when the light emission stopping signal is generated from the OR gate OR24, the display device FDC2 displays an indication confirming that the light value is controlled correctly.

A detailed circuit arrangement of the display device will be described hereinafter.

Referring to FIG. 15, a switch ASS for setting the diaphragm aperture value is connected through an inverter IN80 with one input terminal of an AND gate AN90, the output of which is connected with the clock input terminal of a counter CO30 with another input terminal of the AND gate AN90 connected with the output of a frequency divider FDV1, so that during closure of the switch ASS, the output of the inverter IN80 becomes "High" and the AND gate AN90 is enabled to pass the clock pulse train from the frequency divider FDV1 to the counter CO30, which counts the number of clock pulses train applied thereto during the closure of the switch ASS. The number of the pulses counted by the counter CO30 corresponds to the set aperture value.

A switch SSS for setting the film sensitivity is connected through an inverter IN81 with one input terminal of an AND gate AN91, the output of which is connected with the clock terminal of a counter CO31 with another input terminal of the AND gate AN91 connected with the output terminal of the frequency divider FDV1, so that during the closure of the switch SSS, the AND gate AN91 allows the clock pulse train to pass to the counter CO31 to increase the contents thereof, whereby the content of the counter CO31 represents the film sensitivity.

The shift register SR2 also shown in FIG. 14 for storing the data Avf, Dv and Sv is connected with a data selector MP10, and also to a decoder DE8 having output terminals r0 through $r_n$. The decoder DE8 outputs a "High" signal at any one of the terminals r1 through $r_{n-1}$ upon receipt of the photographing distance Dv which is in the flash available distance range. If the photographing distance Dv is shorter than the flash available distance range, the decoder outputs a "High" signal at the terminal Un. If the photographing distance Dv is longer than the flash available distance range, the decoder DE8 outputs a "High" signal at the terminal uo. If every bit of the photographing distance Dv is 1, the terminals r1 through $r_{n-1}$ become "High".

In a case where the flash device FL is attached to the camera, a data selector MP10 outputs the aperture value Avf and the film sensitivity SV fed from the shift register SR2 upon receipt of the "High" signal of the Q terminal of the flip-flop FF11 shown in FIG. 13.

In a case where the flash device F1 is not attached to the camera, the data selector MP10 outputs the manually set aperture value Avf and the film sensitivity SV fed from the counters CO30 and CO31 by the "low" output of the flip-flop FF 11.

The aperture setting data output from the data selector MP10 is decoded in a decoder DE5 for display in display DE5 and the film sensitivity decoded by decoder DE6 and is displayed by the display unit DP11 in digital form.

A display unit DP13 is provided for displaying whether or not the flash device FL is attached to a camera exclusively used for that flash device in response to the Q output states of the flip-flop FF11.

Another display unit DP15 is provided for displaying either the flash light control mode for the TTL light measurement if the output of the AND gate AN79 is "High" or the flash light control mode under the external light measurement if the output of the AND gate AN79 is "Low".

The film sensitivity fed from the data selector Mp 10 is converted into an analog form by a digital/analog converter DA and in turn the analog data is logarithmically expanded by an arithmetic circuit ALC, then applied to an inverting input terminal of the comparator AC2 shown in FIG. 14 By this arrangement, the reference voltage source VE2 can be omitted.

Another advantage of this arrangement is that since the flash light is controlled by the content of the shift register SR2 storing the film sensitivity set by the camera, so far as the flash device FL is attached to the camera for exclusive use, a correct exposure is assured even if a wrong film sensitivity is set in the flash device FL.

A ROM RO2 is provided for producing a flash available distance range on the basis of the aperture value Avf, the film sensitivity each fed from the data selector MP10 and the maximum light emission value of the flash device FL fed from the decoder DE3.

A switch PAS is closed or ON when the light emitting direction of the flash device is changed for correcting the parallax between the axis of the photographic lens of the camera and the light axis of the xenon lamp in case of close up photographing.

The switch PAS is connected with an inverter IN 82, the output of which is connected with a display unit DP 14 and the ROM RO2. When the switch is closed, the output of the inverter IN82 becomes "High" so that the display unit DP 14 displays the parallax correction.

It is noted that when the parallax correction is made, the effective light emission value of the flash device and the maximum flash available distance range change. Therefore, in a case where the parallax correction is present and the switch PAS is closed, the ROM RO2 outputs the minimum photographing distance Dvmin calculated by the equation $$Ivmin + Sv - Av = Dvmin$$

wherein Ivmin is the minimum light value of the flash device.

Although the minimum high value Ivmin changes according to the light distribution characteristic and the kinds of the reflection panel of the flash device, the maximum light value data from the decoder may include the light distribution characteristic and the information of the kind of the reflection panel. Because the ratio between the maximum light value and the minimum high value of the Xenon tube is constant, therefor the maximum light value fed from the decoder DE3 may correspond to the minimum light value when the parallex correction is present. Accordingly, when the values Sv and Av are determined, the address of the ROM RO2 where the minimum light value is stored can be accessed by the values Sv and Av so as to output the minimum photographing distance Dvmin.

The ROM RO2 may be designed to produce an output each bits of which is 1 if all bits of the data Av are 1.

Figure 16:
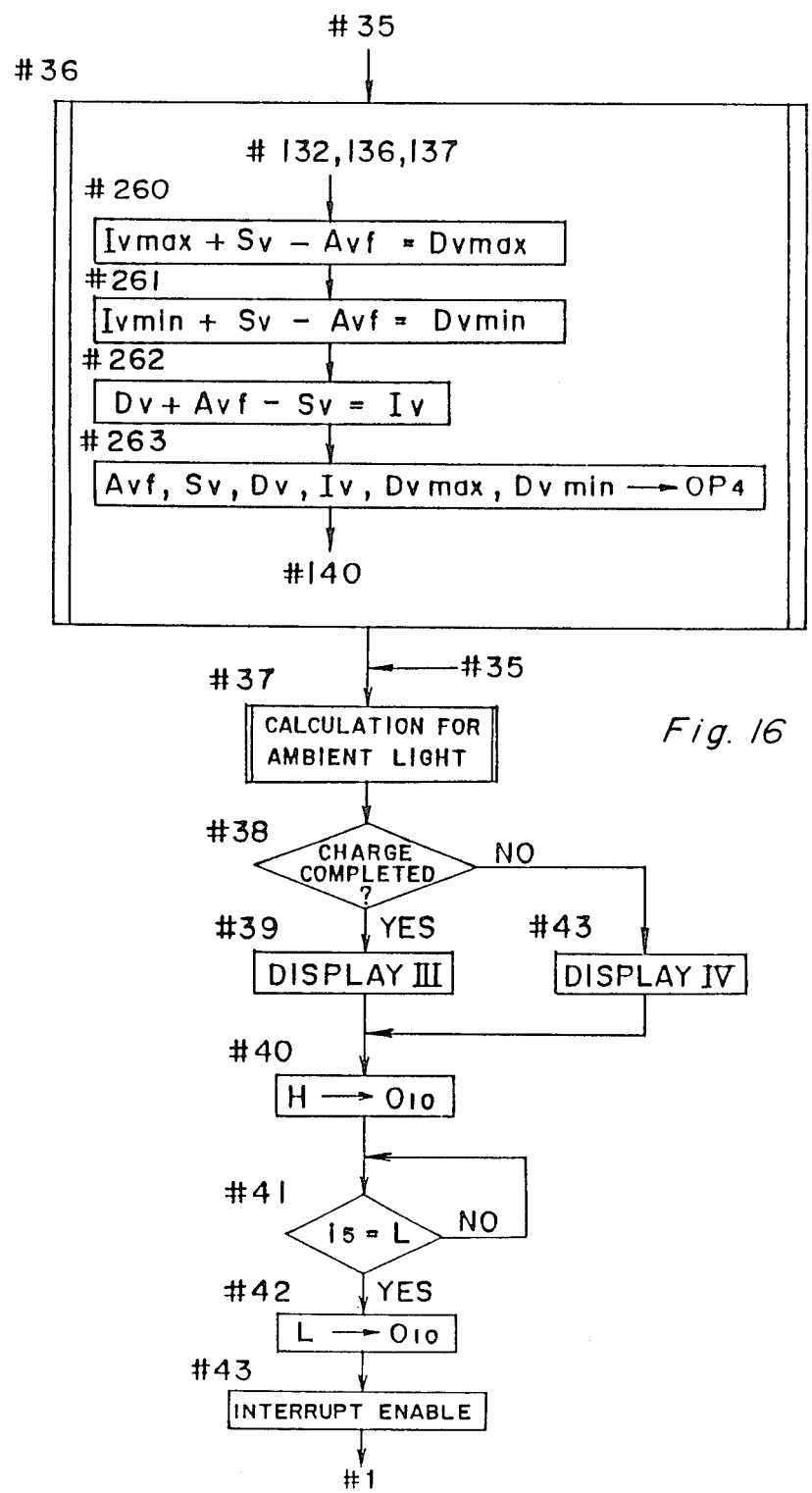
FIG. 16 is a flow chart showing a modification of the flow chart shown in FIG. 11, and FIGS. 17a, 17b and 17c are detailed circuit diagram of a lens circuit and an interface circuit used in the embodiment shown in FIG. 4.

FIG. 16 shows a flow chart of a modification of the operation shown in FIG. 11.

In the step #260, $$Ivmax + Sv - Av = Dvmax$$

is calculated to obtain the maximum photographing distance Dvmax in the coupled distance range. then program flow goes to the step #261, wherein the minimum photographing distance Dvmin is calculated by the equation $$Ivmin + Sv - Avf = Dvmin.$$

The minimum light value Ivmin of the flash device may be stored in the memory device in the camera as fixed data used commonly for various kinds of flash devices.

In the next step #262, a desired light value Iv is caluclated by $$Dv + Avf - Sv = Iv$$

under the photographic conditions at the time of the photographing.

The various data Avf, Sv, Dv, Iv, Dvmax and Dvmin are output at the output OP4 of the CPU1 in step 263, then the program flow goes to the step #140 and steps 37–43 also shown in FIG. 11. In this operation the various data required in the flash device can be obtained in the camera.

In the step #38, When the charge completion signal is not detected, ambient light photographing is displayed in the step #43, then the program flow goes to the step #40 so as to transfer the various data calculated for the flash light photographing. Accordingly in this modification, the data for displaying the flash light photographing can be transferred to the flash device from the camera not only for flash light photographing but also for the ambient light photographing.

FIG. 17 shows the detailed circuit arrangement of the interface IF and the lens circuit LEC.

The ROM RO in the lens circuit LEC stores the following data. The TABLE 6 shows the specific technical meaning of the data stored in the ROM RO and the TABLE 7 shows address of the data stored in the ROM RO.

The data "11100" in the address "00000001" is used to check whether an interchangeable lens is attached to the camera. The data "11100" can be commonly used for all kinds of lenses. The opened aperture value Avo is stored in the address "00000010" and the maximum aperture value Avm is stored in the address "00000011". The shortest focal length fw of the zoom lens is stored in the address "00000100". If the lens used is a fixed focal length type, the fixed focal length may be stored in this address. The longest focal length ft of the zoom lens is stored in the address "00000101". For the fixed focal length lens, the data "11111" is stored in the ROM RO. The maximum distance data Dv is stored in the address "00000110".

The photographing distance data of variable value is stored in the addresses "00010000" through "00011111". The set focal length data are stored in the addresses "00100000" through "00101111".

A distance information unit DS produces data of 4 bits representing an amount of the rotation angle of a distance adjusting ring (not shown) of the camera relative to the infinity position. The ROM RO can be accessed by designating the lower four bits r3 through r0 of the address data with the output data of the distance information unit DS so as to produce the distance data from the ROM. An example of lens data is shown in the TABLE 8. As understood from TABLE 8, a distance data "11001" corresponding to Dv=8.5 can be produced from the ROM if the distance adjusting ring is set at a position between the infinity position and 17 m, so that the distance information unit DS produces the data "0000". In case of flash light photographing, if the data "11001" is input in the CPU 1, the infinity warning can be displayed by a display device FIP in FIG. 4.

By increasing the number of bits of the address data and the distance data stored in the ROM, the interval of each of the distance ranges can be decreased and the total number of the distance ranges can be increased.

The focal length data set for the zoom lens are stored in the addresses "00100000" through "00101111". For a fixed focal lengths lens, the data "11111" is stored in all the addresses mentioned above.

A focal length information unit FS produces the data of 4 bits representing the amount of movement of a zoom ring of a zoom lens from the shortest focal position. The ROM RO can be accessed by designating the lower 4 bits r3 through r0 of the address data with the output data of the focal length information unit FS to produce the focal length data (absolute value) from the ROM RO.

The operation of the interface IF will be described hereinafter.

A one shot circuit OS30 produces a "High" signal from the output of the "High" signal on the output terminal O5 of the CPU 1. The "High" signal of the one shot circuit OS30 sets a flip-flop FF30. such that the clock pulse train CPL is applied to the clock terminal of a D-type flip-flop DF30 from the oscillator OSC (FIG. 4) through an AND gate AN30. Then the Q output of the flip-flop DF30 becomes "High" in synchronism with the positive going edge of the clock pulse, so that counters CO10, CO11 and CO12 are released from a reset condition, whereby decoders DE11 and DE12 are enabled to output the data. The clock pulse train is also applied to the terminal JL2 of the lens circuit LEC through the terminal JB2 of the interface IF. The DC power is supplied to the terminal JL1 of the lens circuit LEC from the terminal JB1 of the camera upon conduction of the transistor BT2 by the "High" output of the terminal O6 of the CPU 1, thus, the power ON reset PO4 generates a pulse. A flip-flop FF35 and a D-type flip-flop DF31 are reset and a flip-flop FF34 is set by the positive-going edge of the output pulse of the power on reset PO4. The Q output of the flip-flop DF31 becomes "High" by the negative-going edge of the first clock pulse CPL, whereby counters CO15 and CO16 are released from the reset condition, resulting in enabling the decoder DE15, whereby the data transferring becomes ready.

The counter CO10 and the decoder DE11 in the interface IF and the counter CO15 and the decoder DE15 in the lens circuit LEC are provided for generating the timing signals for synchronizing the operation of the camera and the lens circuit LEC. The counter CO10 is a hexadecimal number system counter of 4 bits for counting the clock pulses CP and the counter CO15 is a hexadecimal number system counter for counting the clock pulses CPL. The decoders DE11 and DE15 are respectively supplied with the respective lower 3 bits CB0, CB1, CB2, CL0, CL1 and CL2 of the counters CO10 and CO15 so as to output "High" signals at any one of the output terminals TB0 through TB7 and TL0 through TL7, respectively corresponding to the input data. The TABLE 9 shows the relationship between the input data and the output data of the decoders DE11 and DE15.

The counter CO11 of 3 bits is provided for counting the number of pulses output from the terminal CB3 of the counter CO10. The output terminals C50 through C52 of the counter CO11 and the output terminal CB3 of the counter CO10 are connected to the decoder DE12, which generates a "High" signal at any one of the terminals S0 through S14 corresponding to the data of the counter CO3 and the data on the terminal CB3. The relationship between the input data and the output data is shown in the TABLE 10.

It is noted that the timing Si (i=0, 1, . . . ) means the period during which a high signal appears on the terminal Si hereinafter.

A shift register SR10 of 8 bits has its input terminals Ba1, Ba2 and Ba3 connected with the three output terminals of the counter CO12 and the other terminals Ba4 through Ba7 and Ba0 are grounded. When the terminal SP of the shift register SR10 is "High", the data on the terminals Ba0 through Ba7 are taken in the shift register in parallel upon receipt of the positive-going edge of the clock pulse CP and when the terminal SP is "Low", the data in the shift register SR10 is output on the output terminals from the highest bit in a bit-by-bit manner upon receipt of the positive-going edge of the clock pulses CL.

AND gates AN31 and AN32 have therein one respective input terminal connected with the oscillator OSC to receive the clock pulses CP with the other input terminal of the AND gate AN31 connected with the terminal TB6. Another input terminal of the AND gate AN32 is connected with the terminal TB7 of the decoder DE11. The output terminal of the AND gate AN31 is connected with the set input terminal of a flip-flop FF33 and the output terminal of the AND gate AN32 is connected with the reset input terminal of the flip-flop FF33. The Q output of the flip-flop FF33 is connected with the terminal SP of the shift register SR10. By that arrangement, the flip-flop FF33 is set by the negative-going edge of the clock pulse CP generated at the timing during which the TB6 of the decoder DE11 becomes "High" (the timing is referred to as time TB6) and is reset by the negative-going edge of the clock pulse CP generated on the timing TB7. The shift register SR10 takes the data therein as the positive going edge of the pulse appears on the terminal TB7 and outputs the data in series by the negative-going edge of the signals of the respective terminals TB0 through TB7.

And gates AN49 and AN50, a flip-flop FF48 and a shift register SR13 in the lens circuit LEC are arranged in a similar manner as described above with respect to shift register SR10.

In order to operate the shift registers SR10 and SR13 as described above, the shift registers are arranged in such a manner that eight flip-flops are provided for each bit for receiving the parallel inputs with the output terminal of each flip-flop connected with the input terminal of the flip-flop situated at a one bit higher position so that the data stored in the respective flip-flops can be transferred to the other flip-flop situated at the one bit higher position. Furthermore, the output of the flip-flop for storing the highest bit is connected with the input terminal of an additional flip-flop i.e., ninth flip-flop, the output terminal of which is used as the output terminal of the shift register. Thus, the ninth flip-flop takes the output of the flip-flop for storing the highest bit in synchronism with the clock pulse, whereby the shift register produces output data delayed by one clock pulse.

When the content of the counter CO12 is "001" in the timing TB6 in the step S0, the content of the counter CO12 is transferred to the shift register SR10 in the timing TB7. The data "00000010" of the shift register SR10 is transferred to the terminal JB3 of the interface IF through the switch SC1 by one bit in series in the respective timings TB0 through TB7 in the step S1. The data is further transferred to the terminal JL3 of the lens circuit LEC. As the switch SC2 is opened, the data is input in the shift register SR12 in the order in synchronism with the negative-going edge of the clock pulses CP. Further, the data stored in the shift register SR12 is transferred to the address terminals r0 through r6 of the ROM RO through the data selector MP3, whereby the ROM RO outputs the stored data accessed by the address data.

The output terminals La0 through La6 of the shift register SR12 are "0000001" by the negative-going edge of the clock pulse CP in the timing TL6, so that the address "00000001" is accessed to output the checking data "11100" from the ROM RO. The checking data is taken in the shift register SR13 at the positive-going edge of the signal on the terminal TL7 i.e., at the rising period of the timing TL7. Since the output terminal CL3 of the counter CO15 becomes "Low", at the respective timings TL0 through TL7 in the step S2, each of the data stored in the shift register SR13 is output at the respective rising times of the timings TL0 through TL7 and the output data is transferred to the terminal JB3 of the interface IF through the switch SC4 and the terminal JL3.

In the step S2 during which the data is transferred to the interface IF from the lens circuit LEC, the switch SC2 is OFF by the output CB3 of the counter CO10, therefore the checking data "11100" is taken in a shift register SR11 through the switch SC2 at the positive-going edge of the clock pulse CP. The data in the shift register SR11 is transferred to a latch LA at the positive-going edge of the respective output pulses of the AND gate AN35 in the timing TB6. The data in the latch LA is further transferred to a register RG1.

The content of the counter CO12 becomes "010" upon receipt of the output pulse from the AND gate AN33 at the timing of TB6 in the step S2. Then, the data "00000100" is taken in the shift register SR10 at the timing TB7.

In the next step S3, the switch SC1 is ON by the "High" output on the terminal CB3 of the counter CO10 which is applied to the switch SC1 through an AND gate AN34. When the output CL3 of the counter CO15 becomes "High", this "High" signal is applied to a switch SC3 through an AND gate AN46 so that the switch SC3 conducts to pass the address data from the shift register SR10 to the terminal JB3. The address data is further transferred to the shift register SR12 through the terminal JL3. The address data in the data selector MP3 is further transferred to the address terminals r0 through r6 of the ROM RO, then the data representing the opened aperture value Avo stored in the address "00000010" of the ROM RO is transferred to the shift register SR13.

In the step S4, the output terminal CB3 of th counter CO10 and the terminal CL3 of the counter CO15 become "Low" respectively, whereby the switches SC2 and SC4 are conductive so that the data "00111" is transferred to the shift register SR11 from the shift register SR13 in the lens circuit LEC through the terminals JL3 and JB3 and the switch SC2. The data in the shift register SR11 is latched in the latch LA at the timing TB5. The opened aperture data Avo latched in the latch LA is taken in a shift register RG2 upon receipt of the pulse from an AND gate AN37 at the timing TB6.

In the step S5, the address data "00000110" is transferred to the lens circuit LEC, whereby the maximum aperture data Avm is taken in a register RG3 through the interface IF at the timing TB6 in the step S6. In the step S7, the address data "00001000" is transferred to the lens circuit LEC, whereby the shortest focal length data fw is taken in a register RG4 through the interface IF at the timing TB6 in the step S8. In the step S9, the address data "00001010" is transferred to the lens circuit LEC, whereby the longest focal length data ft is taken in a register RG5 at the timing TB6 in the step S10. In the step S11, the address data "00001100" is transferred to the lens circuit LEC, whereby the longest photographing distance data $Dv_\infty$ is taken in a register RG6 at the timing TB6 in the step S12. Thus, the transfer of the various fixed data is completed.

The output terminals La2, La1 and La0 of the shift register SR12 are "110" when the clock pulse CPL rises to the high level at the timing TB6 in the step S11. While the flip-flop FF35 is set to produce a "High" signal at the Q output (designated FD) thereof when the output of the AND gate AN47 rises to the high level at the timing TL7. Also the $\overline{Q}$ terminal (designated $\overline{FD}$) of the flip-flop FF35 becomes "Low". Therefore regardless of the state of the terminal CL3 of the counter CO15, the output of an AND gate AN46 becomes "Low" and the output of an OR gate OR35 is "High", so that switch SC3 is made non-conductive with the switch SC4 made conductive. Accordingly, only the data relating to the lens can be transferred to the camera in the subsequent steps.

In the step S12, the longest photographing distance data $Dv_\infty$ is transferred to the CPU 1, the data $Dv_\infty$ is stored in a register RG6 by the output of an AND gate AN41. A flip-flop FF32 is also set by the output of the AND gate AN41. Thus, the switch SC1 is made non-conductive by the "Low" output of the AND gate AN34 and the switch SC2 is made conductive by the "High" output of the OR gate OR32.

The content of the counter CO16 becomes "01" by counting the pulse fed from an AND gate AN48 at the timing TL6 in the step S12. The output of the counter CO16 is applied to the input terminal of a data selector MP3, which transfers the input data to the ROM RO as the address data. The higher 4 bits of the address data correspond to the output of the counter CO16 and the lower 4 bits of the address data correspond to the output data of the distance information unit DS. The photographing distance data Dv read out from the ROM RO is transferred to the shift register SR13 at the timing TL7 and in turn, the photographing distance data Dv is further transferred to the interface IF in synchronism with the negative-going edge of the respective clock pulses appearing at the timings TB0 through TB4 in the step S11. The photographing distance data Dv is taken in the shift register SR11 and latched in the latch LA at the timing TB5, thereby further being taken in the register RG7 by the output of an AND gate AN42 at the timing TB6.

After the longest photographing distance data is transferred to the register RG6, regardless of the state of the output terminal CB3 of the counter CO10, the output of the AND gate AN34 is "Low", and the output of the OR gate OR32 is "High", so that the switch SC1 is non-conductive and the switch SC2 is conductive to allow transfer of only the lens data.

The content of the counter CO16 becomes "10" upon receipt of the output pulse of an AND gate AN48 at the timing of TL6 in the step S13. The data "10" is applied to the data selector MP3 to transfer the data to the ROM RO as the address data. The lower 4 bits of the address data represent the focal length output from the focal length information unit FS. The focal length data fs is taken in the shift register SR13 at the timing TL7 in the step S13 and further transferred to the interface IF. The focal length data fs is taken in the latch LA at the timing TB5 in the step S14 and further taken in a register RG8. On the other hand, the output ENZ of an AND gate AN43 is applied to the set input terminal of a flip-flop FF31, which is set to produce a "High" signal at the Q output. The "high" signal is applied to the input terminal i3, whereby the CPU 1 determines that the data transfer of the lens data is completed, causing the output terminal 06 to be "Low". Then the transistor BT2 (FIG. 4) is made non-conductive to stop the power supply to the lens circuit LEC.

The data transfer operation between the interface IF and the CPU 1 through the data bus DB will be described hereinafter.

If the data on the output terminal OP3 of the CPU 1 is $6_H$, the terminal d0 of the decoder DE10 becomes "High", whereby the checking data is read in the CPU 1 from the register RG1 through the data selector MP1 (FIG. 4) and the data bus DB.

If the data on the output terminal OP3 is $7_H$, the output terminal d1 of the decoder DE10 is "High" whereby the aperture data Avo in the register RG2 is read in the CPU 1 through the data bus DB.

In similar manner as described above, each of the data Avm, fw, ft, Dv and fs stored in the registers RG3 through RG8 is read in the CPU 1 through the data bus DB in order. After the data transfer is completed, the operation shown in the flow chart in FIG. 16 is executed.

It is noted that the circuit arrangement shown in FIG. 17 should be reset by the power ON reset signal PR1, since it must be reset when the battery BB is mounted in the camera.

Although in the embodiment described above, the aperture value which is not related to the ambient light level is set by either the aperture value corresponding to the focal distance or the set aperture value, other aperture values defined by the maximum light value $Iv_{max}$ of the flash device, or a further aperture value defined by the maximum photographing distance Dv and the mean light emission value $Iv_{mean}$ defined by the maximum light emission value $Iv_{max}$ and the minimum light emission value $Iv_{min}$ can be used.

In addition, in the above embodiment, the diaphragm aperture size can be decreased up to the minimum value if the photographing object is bright, if the interchangeable lens is not provided with the lens data output circuit, as the CPU can not detect the flash available range, the minimum aperture value may be limited to a suitable value such as the aperture value F8 to prevent failure of photographing.

TABLE 1

| FORCAL DISTANCE | JUDGE CIRCUIT(DJ) | | | | DATA SELECTOR($MP_{10}$) | | | |
|---|---|---|---|---|---|---|---|---|
| | $d_1$ | $d_2$ | $d_3$ | $d_4$ | Av | FNO. | Tv | sec. |
| 30 mm | H | L | L | L | 6 | 8 | 5 | 1/30 |
| 31 mm–55 mm | L | H | L | L | 5 | 5.6 | 6 | 1/60 |
| 56 mm–120 mm | L | L | H | L | 4 | 4 | 7 | 1/125 |

TABLE 1-continued

| FORCAL DISTANCE | JUDGE CIRCUIT(DJ) | | | | DATA SELECTOR($MP_{10}$) | | | |
|---|---|---|---|---|---|---|---|---|
| | $d_1$ | $d_2$ | $d_3$ | $d_4$ | Av | FNO. | Tv | sec. |
| 121 mm | L | L | L | H | 3 | 2.8 | 8 | 1/250 |

TABLE 2

| DATA SELECTOR($MP_1$) | | | |
|---|---|---|---|
| SELECTION TERMINAL(SL) | | | |
| BINARY NUMBER | 16 SYSTEM NUMBER | INPUT TERMINAL | OUTPUT(DB) |
| 0 0 0 0 | $0_H$ | $IP_4$ | Tvs |
| 0 0 0 1 | $1_H$ | $IP_5$ | Sv |
| 0 0 1 0 | $2_H$ | $IP_6$ | MODE |
| 0 0 1 1 | $3_H$ | $IP_2$ | MEASURED VALUE (Bv + Sv − Avo) |
| 0 1 0 0 | $4_H$ | $IP_7$ | DATA |
| 0 1 0 1 | $5_H$ | $IP_3$ | Avs - Avo |
| 0 1 1 0 | $6_H$ | | CHECK DATA |
| 0 1 1 1 | $7_H$ | | Avo |
| 1 0 0 0 | $8_H$ | | Avm |
| 1 0 0 1 | $9_H$ | $IP_1$ | fw |
| 1 0 1 0 | $A_H$ | | ft |
| 1 0 1 1 | $B_H$ | | Dv |
| 1 1 0 0 | $C_H$ | | Dv |
| 1 1 0 1 | $D_H$ | | fs |

TABLE 3

| INPUT | | | | OUTPUT | | | | | | | | |
|---|---|---|---|---|---|---|---|---|---|---|---|---|
| $CF_3$ | $CF_2$ | $CF_1$ | $CF_0$ | $b_0$ | $b_1$ | $b_2$ | $b_3$ | $b_4$ | $b_5$ | $b_6$ | $b_7$ | $b_8$ |
| 0 | 0 | 0 | 0 | L | L | L | L | L | L | L | L | L |
| 0 | 0 | 0 | 1 | H | L | L | L | L | L | L | L | L |
| 0 | 0 | 1 | 0 | L | H | L | L | L | L | L | L | L |
| 0 | 0 | 1 | 1 | L | L | H | L | L | L | L | L | L |
| 0 | 1 | 0 | 0 | L | L | L | H | L | L | L | L | L |
| 0 | 1 | 0 | 1 | L | L | L | L | H | L | L | L | L |
| 0 | 1 | 1 | 0 | L | L | L | L | L | H | L | L | L |
| 0 | 1 | 1 | 1 | L | L | L | L | L | L | H | L | L |
| 1 | 0 | 0 | 0 | L | L | L | L | L | L | L | H | L |
| 1 | 0 | 0 | 1 | L | L | L | L | L | L | L | L | H |

TABLE 4

| $G_3$ | $G_2$ | $G_1$ | $G_0$ | Ivmax | GNO.max |
|---|---|---|---|---|---|
| 0 | 0 | 0 | 1 | 1 | 8 |
| 0 | 0 | 1 | 0 | 1.5 | 9.5 |
| 0 | 0 | 1 | 1 | 2 | 11 |
| 0 | 1 | 0 | 0 | 2.5 | 13 |
| 0 | 1 | 0 | 1 | 3 | 16 |
| 0 | 1 | 1 | 0 | 3.5 | 19 |
| 0 | 1 | 1 | 1 | 4 | 22 |
| 1 | 0 | 0 | 0 | 4.5 | 27 |
| 1 | 0 | 0 | 1 | 5 | 32 |
| 1 | 0 | 1 | 0 | 5.5 | 38 |
| 1 | 0 | 1 | 1 | 6 | 45 |
| 1 | 1 | 0 | 0 | 6.5 | 54 |
| 1 | 1 | 0 | 1 | 7 | 64 |
| 1 | 1 | 1 | 0 | 7.5 | 77 |

TABLE 5

| $F_2$ | $F_1$ | $F_0$ | Av | FNO. |
|---|---|---|---|---|
| 0 | 0 | 1 | 2 | 2 |
| 0 | 1 | 0 | 3 | 2.8 |
| 0 | 1 | 1 | 4 | 4 |
| 1 | 0 | 0 | 5 | 5.6 |
| 1 | 0 | 1 | 6 | 8 |
| 1 | 1 | 0 | 7 | 11 |

TABLE 6

| DATA | | | | | APERTURE | | FOCAL DISTANCE | DISTANCE | |
|---|---|---|---|---|---|---|---|---|---|
| $d_4$ | $d_3$ | $d_2$ | $d_1$ | $d_0$ | FNo. | Av | mm | m | Dv |
| 0 | 0 | 0 | 0 | 0 | 1 | 0 | less than 5 | less than 0.25 | less than −4 |
| 0 | 0 | 0 | 0 | 1 | 1.2 | 0.5 | 6–10 | 0.26–0.30 | −3.9 − −3.5 |
| 0 | 0 | 0 | 1 | 0 | 1.4 | 1.0 | 11–15 | 0.31–0.35 | −3.4 − −3.0 |
| 0 | 0 | 0 | 1 | 1 | 1.7 | 1.5 | 16–20 | 0.37–0.42 | −2.9 − −2.5 |
| 0 | 0 | 1 | 0 | 0 | 2 | 2.0 | 21–25 | 0.44–0.50 | −2.4 − −2.0 |
| 0 | 0 | 1 | 0 | 1 | 2.4 | 2.5 | 26–30 | 0.52–0.59 | −1.9 − −1.5 |
| 0 | 0 | 1 | 1 | 0 | 2.8 | 3.0 | 31–35 | 0.62–0.71 | −1.4 − −1.0 |
| 0 | 0 | 1 | 1 | 1 | 3.4 | 3.5 | 36–40 | 0.73–0.84 | −0.9 − −0.5 |
| 0 | 1 | 0 | 0 | 0 | 4 | 4.0 | 41–45 | 0.87–1.0 | −0.4 − −0.0 |
| 0 | 1 | 0 | 0 | 1 | 4.7 | 4.5 | 46–50 | 1.0–1.2 | 0.1–0.5 |
| 0 | 1 | 0 | 1 | 0 | 5.6 | 5.0 | 51–55 | 1.2–1.4 | 0.6–1.0 |
| 0 | 1 | 0 | 1 | 1 | 6.7 | 5.5 | 56–60 | 1.5–1.7 | 1.1–1.5 |
| 0 | 1 | 1 | 0 | 0 | 8 | 6.0 | 61–70 | 1.7–2.0 | 1.6–2.0 |
| 0 | 1 | 1 | 0 | 1 | 9.5 | 6.5 | 71–80 | 2.1–2.4 | 2.1–2.5 |
| 0 | 1 | 1 | 1 | 0 | 11 | 7.0 | 81–90 | 2.5–2.8 | 2.6–3.0 |
| 0 | 1 | 1 | 1 | 1 | 13 | 7.5 | 91–100 | 2.9–3.4 | 3.1–3.5 |
| 1 | 0 | 0 | 0 | 0 | 16 | 8.0 | 101–110 | 3.5–4.0 | 3.6–4.0 |
| 1 | 0 | 0 | 0 | 1 | 19 | 8.5 | 111–120 | 4.1–4.8 | 4.1–4.5 |
| 1 | 0 | 0 | 1 | 0 | 22 | 9.0 | 121–140 | 4.9–5.7 | 4.6–5.0 |
| 1 | 0 | 0 | 1 | 1 | 27 | 9.5 | 141–160 | 5.9–6.7 | 5.1–5.5 |
| 1 | 0 | 1 | 0 | 0 | 32 | 10.0 | 161–180 | 7.0–8.0 | 5.6–6.0 |
| 1 | 0 | 1 | 0 | 1 | 38 | 10.5 | 181–200 | 8.3–9.5 | 6.1–6.5 |
| 1 | 0 | 1 | 1 | 0 | 45 | 11.0 | 201–250 | 9.8–11.3 | 6.6–7.0 |
| 1 | 0 | 1 | 1 | 1 | | | 251–300 | 11.7–13.5 | 7.1–7.5 |
| 1 | 1 | 0 | 0 | 0 | | | 301–350 | 13.9–16.0 | 7.6–8.0 |
| 1 | 1 | 0 | 0 | 1 | | | 351–400 | 16.6–19.0 | 8.1–8.5 |
| 1 | 1 | 0 | 1 | 0 | | | 401–500 | 19.7–23 | 8.6–9.0 |
| 1 | 1 | 0 | 1 | 1 | | | 501–600 | 23–27 | 9.1–9.5 |
| 1 | 1 | 1 | 0 | 0 | | | 601–800 | 28–32 | 9.6–10.0 |
| 1 | 1 | 1 | 0 | 1 | | | 801–1000 | 33–38 | 10.1–10.5 |
| 1 | 1 | 1 | 1 | 0 | | | more than 1001 | 39–45 | 10.6–11.0 |
| 1 | 1 | 1 | 1 | 1 | | | Fixed Focal | more than 47 | more than 11.1 |

TABLE 7

| ADDRESS DATA | | | | | | | | APPENDIX A |
|---|---|---|---|---|---|---|---|---|
| $r_7$ | $r_6$ | $r_5$ | $r_4$ | $r_3$ | $r_2$ | $r_1$ | $r_0$ | CONTENT OF LENS DATA |
| 0 | 0 | 0 | 0 | 0 | 0 | 0 | 1 | CHECK DATA(11100) |
| 0 | 0 | 0 | 0 | 0 | 0 | 1 | 0 | RELEASED APERTURE Avo |
| 0 | 0 | 0 | 0 | 0 | 0 | 1 | 1 | MINIMUM APERTURE Avm |
| 0 | 0 | 0 | 0 | 0 | 1 | 0 | 0 | MINIMUM FOCAL DISTANCE fw |
| 0 | 0 | 0 | 0 | 0 | 1 | 0 | 1 | MAXIMUM FOCAL DISTANCE ft |
| 0 | 0 | 0 | 0 | 0 | 1 | 1 | 0 | MAXIMUM ALLOWABLE DISTANCE Dv |
| 0 | 0 | 0 | 1 | 0 ~ | 0 | 0 | 0 | ⎫ SET DISTANCE Dv |
| 0 | 0 | 0 | 1 | 1 | 1 | 1 | 1 | ⎭ |
| 0 | 0 | 1 | 0 | 0 ~ | 0 | 0 | 0 | ⎫ SET FOCAL DISTANCE fs |
| 0 | 0 | 1 | 0 | 1 | 1 | 1 | 1 | ⎭ |

TABLE 8

| DS OUTPUT | | | | m | DATA | Dv |
|---|---|---|---|---|---|---|
| 0 | 0 | 0 | 0 | more than 17 | 11001 | 8.5 |
| 0 | 0 | 0 | 1 | 14–16 | 11000 | 8.0 |
| 0 | 0 | 1 | 0 | 12–13 | 10111 | 7.5 |
| 0 | 0 | 1 | 1 | 9.6–11 | 10110 | 7.0 |
| 0 | 1 | 0 | 0 | 8.1–9.5 | 10101 | 6.5 |
| 0 | 1 | 0 | 1 | 6.8–8 | 10100 | 6.0 |
| 0 | 1 | 1 | 0 | 5.7–6.7 | 10011 | 5.5 |
| 0 | 1 | 1 | 1 | 4.8–5.6 | 10010 | 5.0 |
| 1 | 0 | 0 | 0 | 4.1–4.7 | 10001 | 4.5 |
| 1 | 0 | 0 | 1 | 3.5–4.0 | 10000 | 4.0 |
| 1 | 0 | 1 | 0 | 2.9–3.4 | 01111 | 3.5 |
| 1 | 0 | 1 | 1 | 2.5–2.8 | 01110 | 3.0 |
| 1 | 1 | 0 | 0 | 2.1–2.4 | 01101 | 2.5 |
| 1 | 1 | 0 | 1 | 1.8–2.0 | 01100 | 2.0 |
| 1 | 1 | 1 | 0 | 1.5–1.7 | 01011 | 1.5 |
| 1 | 1 | 1 | 1 | less than 1.4 | 01010 | 1.0 |

TABLE 9

| COUNTER $CO_{10}(CO_{15})$ | | | DECODER $DE_{11}(DE_{15})$ | | | | | | | |
|---|---|---|---|---|---|---|---|---|---|---|
| $CB_2$ ($CL_2$) | $CB_1$ ($CL_1$) | $CB_0$ ($CL_0$) | $TB_0$ ($TL_0$) | $TB_1$ ($TL_1$) | $TB_2$ ($TL_2$) | $TB_3$ ($TL_3$) | $TB_4$ ($TL_4$) | $TB_5$ ($TL_5$) | $TB_6$ ($TL_6$) | $TB_7$ ($TL_7$) |
| 0 | 0 | 0 | 1 | 0 | 0 | 0 | 0 | 0 | 0 | 0 |

TABLE 9-continued

| COUNTER $CO_{10}(CO_{15})$ | | | DECODER $DE_{11}(DE_{15})$ | | | | | | | |
|---|---|---|---|---|---|---|---|---|---|---|
| $CB_2$ ($CL_2$) | $CB_1$ ($CL_1$) | $CB_0$ ($CL_0$) | $TB_0$ ($TL_0$) | $TB_1$ ($TL_1$) | $TB_2$ ($TL_2$) | $TB_3$ ($TL_3$) | $TB_4$ ($TL_4$) | $TB_5$ ($TL_5$) | $TB_6$ ($TL_6$) | $TB_7$ ($TL_7$) |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

TABLE 10

| INPUT | | | | DECODER $DE_{12}$ OUTPUT | | | | | | | | | | | | | | | |
|---|---|---|---|---|---|---|---|---|---|---|---|---|---|---|---|---|---|---|---|
| $CB_3$ | $CS_2$ | $CS_1$ | $CS_0$ | $S_0$ | $S_1$ | $S_2$ | $S_3$ | $S_4$ | $S_5$ | $S_6$ | $S_7$ | $S_8$ | $S_9$ | $S_{10}$ | $S_{11}$ | $S_{12}$ | $S_{13}$ | $S_{14}$ | |
| 0 | 0 | 0 | 0 | 1 | 0 | 0 | 0 | 0 | 0 | 0 | 0 | 0 | 0 | 0 | 0 | 0 | 0 | 0 | |
| 0 | 0 | 0 | 1 | 1 | 0 | 0 | 0 | 0 | 0 | 0 | 0 | 0 | 0 | 0 | 0 | 0 | 0 | 0 | |
| 0 | 0 | 1 | 0 | 0 | 1 | 0 | 0 | 0 | 0 | 0 | 0 | 0 | 0 | 0 | 0 | 0 | 0 | 0 | |
| 0 | 0 | 1 | 1 | 0 | 0 | 1 | 0 | 0 | 0 | 0 | 0 | 0 | 0 | 0 | 0 | 0 | 0 | 0 | |
| 0 | 1 | 0 | 0 | 0 | 0 | 0 | 1 | 0 | 0 | 0 | 0 | 0 | 0 | 0 | 0 | 0 | 0 | 0 | |
| 0 | 1 | 0 | 1 | 0 | 0 | 0 | 0 | 1 | 0 | 0 | 0 | 0 | 0 | 0 | 0 | 0 | 0 | 0 | |
| 0 | 1 | 1 | 0 | 0 | 0 | 0 | 0 | 0 | 1 | 0 | 0 | 0 | 0 | 0 | 0 | 0 | 0 | 0 | |
| 0 | 1 | 1 | 1 | 0 | 0 | 0 | 0 | 0 | 0 | 1 | 0 | 0 | 0 | 0 | 0 | 0 | 0 | 0 | |
| 1 | 0 | 0 | 0 | 0 | 0 | 0 | 0 | 0 | 0 | 0 | 1 | 0 | 0 | 0 | 0 | 0 | 0 | 0 | |
| 1 | 0 | 0 | 1 | 0 | 0 | 0 | 0 | 0 | 0 | 0 | 0 | 1 | 0 | 0 | 0 | 0 | 0 | 0 | |
| 1 | 0 | 1 | 0 | 0 | 0 | 0 | 0 | 0 | 0 | 0 | 0 | 0 | 1 | 0 | 0 | 0 | 0 | 0 | |
| 1 | 0 | 1 | 1 | 0 | 0 | 0 | 0 | 0 | 0 | 0 | 0 | 0 | 0 | 1 | 0 | 0 | 0 | 0 | |
| 1 | 1 | 0 | 0 | 0 | 0 | 0 | 0 | 0 | 0 | 0 | 0 | 0 | 0 | 0 | 1 | 0 | 0 | 0 | |
| 1 | 1 | 0 | 1 | 0 | 0 | 0 | 0 | 0 | 0 | 0 | 0 | 0 | 0 | 0 | 0 | 1 | 0 | 0 | |
| 1 | 1 | 1 | 0 | 0 | 0 | 0 | 0 | 0 | 0 | 0 | 0 | 0 | 0 | 0 | 0 | 0 | 1 | 0 | |
| 1 | 1 | 1 | 1 | 0 | 0 | 0 | 0 | 0 | 0 | 0 | 0 | 0 | 0 | 0 | 0 | 0 | 0 | 1 | |

What is claimed is:

1. An electronic flash device comprising:
   means for supplying power;
   a DC-DC converter connected to said power supplying means;
   means for storing an electric charge derived from said DC-DC converter;
   means for emitting flash light enabled by the charge of said storing means;
   means for generating data representative of the condition of the electronic flash device in synchronism with a clock pulse train fed from a photographic camera;
   a first terminal for receiving a flash synchronizing signal;
   means, responsive to the flash synchronizing signal, for starting emission of flash light from said flash light emitting means;
   means for producing a light measurement starting signal for light measurement by the photographic camera in response to the receipt of the flash synchronizing signal at said first terminal;
   a second terminal for transmitting the data from said generating means and the light measurement starting signal to the photographic camera;
   means for stopping emission of flash light in response to a flash light stopping signal derived from the photographic camera; and
   a third terminal for receiving the clock pulse train and the flash light stopping signal.

2. In a photographic camera capable of being used with an electronic flash device, apparatus comprising:
   means for effecting an exposure operation;
   means for providing a flash synchronizing signal for starting emission of flash light from the electronic flash device in synchronization with the exposure operation;
   a first terminal for transmitting the flash synchronizing signal to the electronic flash device;
   means for generating a clock pulse train;
   a second terminal for receiving data derived from the electronic flash device in synchronism with said clock pulse train;
   means responsive to data at said second terminal for reading said data in synchronism with said clock pulse train;
   means for controlling photography of the camera in accordance with the data read by said reading means;
   means for measuring light to provide a flash light stopping signal; and
   a third terminal for transmitting said clock pulse train and said flash light stopping signal to the electronic flash device.

3. Camera apparatus according to claim 2, further comprising means for inhibiting said clock pulse train from being transmitted through said third terminal during the exposure operation of the camera.

4. In a photographic camera capable of being used with an electronic flash device, apparatus comprising:
   means for effecting an exposure operation;
   means for generating a clock pulse train;
   a first terminal for receiving data derived from the electronic flash device in synchronism with said clock pulse train;
   means for measuring light to provide a flash light stopping signal;
   a second terminal for transmitting said clock pulse train and said flash light stopping signal; and
   means for inhibiting said clock pulse train from being transmitted through said second terminal during the exposure operation of the photographic camera.

5. An electronic flash device comprising:

means for supplying power;
a DC-DC converter connected to said power supplying means;
means for storing an electric charge derived from said DC-DC converter;
means for emitting flash light enabled by the charge of said storing means;
a first terminal for receiving a flash synchronizing signal;
means, responsive to the flash synchronizing signal, for starting emission of flash light from said flash light emitting means;
means for detecting condition of the charge on said storing means;
a second terminal for transmitting a signal representative of condition of the electronic flash device to a photographic camera;
means, responsive to said detecting means and a clock pulse train fed from the photographic camera, for generating the signal to be transmitted through said second terminal; and
a third terminal for receiving the clock pulse train.

6. An electronic flash device according to claim 5, further comprising means for providing said second terminal with a light measurement starting signal for light measurement by the photographic camera in response to the receipt of the flash synchronizing signal at said first terminal, and means for stopping emission of flash light in response to a flash light stopping signal derived from the photographic camera and received at said third terminal.

7. An electronic flash device according to claim 5, further comprising means for setting an aperture value data to be utilized in the photographic camera, wherein said generating means is further responsive to said setting means.

8. An electronic flash device according to claim 5, further comprising means for providing data representative of the amount of flash light capable of being emitted by said emitting means, and means, responsive to said providing means and said clock pulse train, for generating another signal to be transmitted through said second terminal, the two signals being serially transmitted through said second terminal in synchronism with said clock pulse train.

9. An electronic flash device comprising:
means for supplying power;
a DC-DC converter connected to said power supplying means;
means for storing an electric charge derived from said DC-DC converter;
means for emitting flash light enabled by the charge of said storing means;
a first terminal for receiving a flash synchronizing signal;
means, responsive to the flash synchronizing signal, for starting emission of flash light from said flash light emitting means;
means for detecting conditions of the charge on said storing means to generate a charge completion signal;
means for setting aperture value data to be utilized in a photographic camera;
a second terminal;
means for serially forwarding the charge completion signal and the aperture value data through said second terminal to the photographic camera in synchronism with a clock pulse train fed from the photographic camera; and
a third terminal for receiving the clock pulse train.

10. An electronic flash device according to claim 9, further comprising means for stopping emission of flash light in response to a flash light stopping signal derived from the photographic camera and received at said third terminal, means for counting a predetermined time period and resettable by the clock pulse train, and means for disabling said DC-DC converter when the predetermined time period lapses without the reset of said counting means by the clock pulse train.

11. An electronic flash device comprising:
means for supplying power;
a DC-DC converter connected to said power supplying means;
means for storing an electric charge derived from said DC-DC converter;
means for emitting flash light enabled by the charge of said storing means;
a first terminal for receiving a flash synchronizing signal;
means, responsive to the flash synchronizing signal, for starting emission of flash light from said flash light emitting means;
a third terminal for receiving a periodic digital signal from a photographic camera prior to an exposure operation, and also receiving a flash light stopping signal derived from the photographic camera during the exposure operation;
means for stopping emission of flash light in response to the flash light stopping signal;
means for counting a predetermined time period and resettable by the periodic digital signal; and
means for disabling said DC-DC converter when the predetermined time period lapses without the reset of said counting means by the periodic digital signal.

12. An electronic flash device comprising:
means for supplying power;
a DC-DC converter connected to said power supplying means;
means for storing an electric charge derived from said DC-DC converter;
means for emitting flash light enabled by the charge of said storing means;
a first terminal for receiving a flash synchronizing signal;
means, responsive to the flash synchronizing signal, for starting emission of flash light from said flash light emitting means;
means for detecting condition of the charge on said storing means to generate a charge completion signal;
means for generating a signal representative of condition of the electronic flash in response to a digital signal fed from a photographic camera;
a second terminal for use in transmitting the charge completion signal and the signal from said generating means; and
a third terminal for receiving the digital signal.

13. An electronic flash device, comprising:
means for supplying electrical power;
a DC-DC converter connected to said electrical power supplying means;
means for storing an electric charge derived from said DC-DC converter;

means for emitting flash light enabled by the charge of said storing means;

a first terminal for receiving a flash synchronizing signal;

means, responsive to said flash synchronizing signal, for starting emission of flash light from said flash light emitting means;

means for detecting the condition of the charge on said storing means to generate a charge completion signal;

means for providing light quantity data representative of the amount of flash light capable of being emitted by said emitting means;

a second terminal;

means for serially transmitting said charge completion signal and said light quantity data through said second terminal and to the photographic camera in synchronism with a clock pulse train fed from the photographic camera; and a third terminal for receiving said clock pulse train.

14. An electronic flash device according to claim 13, wherein said light quantity data is representative of the maximum amount of flash light capable of being emitted by said emitting means.

* * * * *